(12) United States Patent
Han et al.

(10) Patent No.: US 12,148,572 B2
(45) Date of Patent: Nov. 19, 2024

(54) MULTILAYER ELECTRONIC COMPONENT

(71) Applicant: SAMSUNG ELECTRO-MECHANICS CO., LTD., Suwon-si (KR)

(72) Inventors: Seung Hun Han, Suwon-si (KR); Jae Young Na, Suwon-si (KR); Sung Soo Kim, Suwon-si (KR); Jin Hyung Lim, Suwon-si (KR); Yun Sung Kang, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 61 days.

(21) Appl. No.: 17/960,927

(22) Filed: Oct. 6, 2022

(65) Prior Publication Data

US 2023/0215641 A1 Jul. 6, 2023

(30) Foreign Application Priority Data

Dec. 31, 2021 (KR) .......................... 10-2021-0194178

(51) Int. Cl.
*H01G 4/232* (2006.01)
*H01G 4/30* (2006.01)

(52) U.S. Cl.
CPC .............. *H01G 4/2325* (2013.01); *H01G 4/30* (2013.01)

(58) Field of Classification Search
CPC ........ H01G 4/2325; H01G 4/30; H01G 2/065; H01G 4/008; H01G 4/012; H01G 4/12; H01G 4/232; H01G 4/224
See application file for complete search history.

(56) References Cited

U.S. PATENT DOCUMENTS

2008/0112109 A1* 5/2008 Muto .................... H01G 4/1245
361/301.4
2008/0253954 A1* 10/2008 Moriya ................... C01B 33/22
174/255

(Continued)

FOREIGN PATENT DOCUMENTS

| JP | 2016-178219 A | 10/2016 |
| KR | 10-2016-0064260 A | 6/2016 |
| KR | 10-2020-0022268 A | 3/2020 |

*Primary Examiner* — Michael P McFadden
(74) *Attorney, Agent, or Firm* — Morgan, Lewis & Bockius LLP

(57) ABSTRACT

A multilayer electronic component includes a body having a dielectric layer and first and second internal electrodes alternately disposed with the dielectric layer interposed therebetween. The body has a hexahedral shape. A first external electrode includes a first connection portion disposed on a third surface, and first and third band portions extending from the first connection portion respectively onto a portion of a first and a second surface. A second external electrode includes a second connection portion disposed on a fourth surface, and second and fourth band portions extending from the second connection portion respectively onto a portion of the first and second surfaces. An insulating layer including an oxide containing hafnium is disposed on the first and second connection portions and covers the second surface and the third and fourth band portions. First and second plating layers are disposed respectively on the first and second band portions.

38 Claims, 23 Drawing Sheets

(56) References Cited

U.S. PATENT DOCUMENTS

| | | | |
|---|---|---|---|
| 2013/0020913 A1* | 1/2013 | Shirakawa | H01G 4/232 336/200 |
| 2015/0084487 A1* | 3/2015 | Mori | H01G 4/248 336/200 |
| 2015/0223340 A1* | 8/2015 | Jung | H01G 4/008 156/89.12 |
| 2015/0287532 A1* | 10/2015 | Abe | H05K 3/3436 427/79 |
| 2016/0276104 A1 | 9/2016 | Nishisaka et al. | |
| 2017/0154731 A1* | 6/2017 | Tahara | H01G 4/232 |
| 2017/0250028 A1* | 8/2017 | Makino | H01G 4/248 |
| 2017/0256359 A1* | 9/2017 | Masunari | H01G 4/005 |
| 2019/0096583 A1* | 3/2019 | Sasaki | H01G 4/232 |
| 2019/0103224 A1* | 4/2019 | Han | H01G 4/2325 |
| 2019/0131076 A1* | 5/2019 | Fukumura | H01G 4/232 |
| 2019/0371528 A1* | 12/2019 | Takashima | H01G 4/232 |
| 2020/0066444 A1 | 2/2020 | Yang et al. | |

* cited by examiner

MULTILAYER ELECTRONIC COMPONENT

CROSS-REFERENCE TO RELATED APPLICATION(S)

This application claims the benefit of priority to Korean Patent Application No. 10-2021-0194178 filed on Dec. 31, 2021 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, is a chip-type capacitor that charges or discharges electricity while mounted on the printed circuit board of various electronic products, such as imaging devices including Liquid Crystal Display (LCD) and Plasma Display Panel (PDP), computers, smartphones mobile phones, and the like.

Such a multilayer ceramic capacitor may be used as a component of various electronic devices due to a small size, high capacitance, and ease of mounting thereof. As various electronic devices such as computers and mobile devices are miniaturized and have high output, demand for miniaturization and high capacitance multilayer ceramic capacitors is increasing.

In addition, as industry interest in automotive electronic components has recently increased, multilayer ceramic capacitors are also required to have high reliability characteristics to be used in automobiles or infotainment systems.

To miniaturize and increase the capacitance of a multilayer ceramic capacitor, it is necessary to increase the number of layers thereof by forming thin internal electrodes and dielectric layers, and it is necessary to increase the effective volume fraction required for capacitance implementation by significantly reducing the volume of the portion that does not affect capacitance formation.

In addition, to mount as many components as possible within the limited area of the board, it is necessary to significantly reduce the mounting space.

In addition, as the thickness of the margin decreases with miniaturization and high capacitance of the multilayer ceramic capacitor, external moisture penetration or penetration of a plating solution may be facilitated, and thus reliability may be weakened. Accordingly, there is a need for a method capable of protecting the multilayer ceramic capacitor from the penetration of external moisture or the penetration of a plating solution.

SUMMARY

An aspect of the present disclosure is to provide a multilayer electronic component having improved capacitance per unit volume.

An aspect of the present disclosure is to provide a multilayer electronic component having improved reliability.

An aspect of the present disclosure is to provide a multilayer electronic component in which a mounting space may be significantly reduced.

According to an aspect of the present disclosure, a multilayer electronic component includes a body having a dielectric layer and a first internal electrode and a second internal electrode alternately disposed with the dielectric layer interposed therebetween, the body having a first surface and a second surface opposing each other in a first direction, a third surface and a fourth surface connected to the first and second surfaces and opposing each other in a second direction, and a fifth surface and a sixth surface connected to the first to fourth surfaces and opposing each other in a third direction; a first external electrode including a first connection portion disposed on the third surface, a first band portion extending from the first connection portion onto a portion of the first surface, and a third band portion extending from the first connection portion onto a portion of the second surface; a second external electrode including a second connection portion disposed on the fourth surface, a second band portion extending from the second connection portion onto a portion of the first surface, and a fourth band portion extending from the second connection portion onto a portion of the second surface; an insulating layer disposed on the first and second connection portions and covering the second surface and the third and fourth band portions; a first plating layer disposed on the first band portion; and a second plating layer disposed on the second band portion. The insulating layer includes an oxide containing hafnium (Hf).

According to an aspect of the present disclosure, a multilayer electronic component includes a body having a dielectric layer and first and second internal electrodes alternately disposed with the dielectric layer interposed therebetween, the body having a first surface and a second surface opposing each other in a first direction, a third surface and a fourth surface connected to the first and second surfaces and opposing each other in a second direction, and a fifth surface and a sixth surface connected to the first to fourth surfaces and opposing each other in a third direction; a first external electrode including a first connection portion disposed on the third surface, and a first band portion extending from the first connection portion onto a portion of the first surface; a second external electrode including a second connection portion disposed on the fourth surface, and a second band portion extending from the second connection portion onto a portion of the first surface; an insulating layer disposed on the second surface and extending over the first and second connection portions; a first plating layer disposed on the first band portion; and a second plating layer disposed on the second band portion. The insulating layer includes an oxide containing hafnium (Hf).

According to an aspect of the present disclosure, a multilayer electronic component includes a body having g a dielectric layer, and a first internal electrode and a second internal electrode alternately disposed with the dielectric layer interposed therebetween, the body having a first surface and a second surface opposing each other in a first direction, a third surface and a fourth surface connected to the first and second surfaces and opposing each other in a second direction, and a fifth surface and a sixth surface connected to the first to fourth surfaces and opposing each other in a third direction; a first external electrode including a first connection portion disposed on the third surface, a first band portion extending from the first connection portion onto a portion of the first surface, and a first edge portion extending from the first connection portion to an edge connecting the second and third surfaces; a second external electrode including a second connection portion disposed on the fourth surface, a second band portion extending from the second connection portion onto a portion of the first surface, and a second edge portion extending from the second connection portion to an edge connecting the second and fourth surfaces; an insulating layer disposed on the first and second connection portions and disposed to cover the second surface and the first and second edge portions; a first plating layer disposed on the first band portion; and a second plating layer disposed on the second band portion. When an average distance in the second direction from an extension line of the third surface to an end of the first edge portion is B3, an average distance in the second direction from an extension line of the fourth surface to an end of the second edge portion is B4, an average size of a region in which the third surface and the second internal electrode are spaced apart, in the second direction, is G1, and an average size of a region in which the fourth surface and the first internal electrode are spaced apart, in the second direction, is G2; B3≤G1 and B4≤G2 are satisfied, and the insulating layer includes an oxide containing hafnium (Hf).

According to an aspect of the present disclosure, a multilayer electronic component includes a body having a dielectric layer, and a first internal electrode and a second internal electrode alternately disposed with the dielectric layer interposed therebetween, the body having a first surface and a second surface opposing each other in a first direction, a third surface and a fourth surface connected to the first and second surfaces and opposing each other in a second direction, and a fifth surface and a sixth surface connected to the first to fourth surfaces and opposing each other in a third direction; a first external electrode including a first connection electrode disposed on the third surface, and a first band electrode disposed on the first surface and connected to the first connection electrode; a second external electrode including a second connection electrode disposed on the fourth surface, and a second band electrode disposed on the first surface and connected to the second connection electrode; a first insulating layer disposed on the first connection electrode; a second insulating layer disposed on the second connection electrode; a first plating layer disposed on the first band electrode; and a second plating layer disposed on the second band electrode. The first and second insulating layers include an oxide containing hafnium (Hf).

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
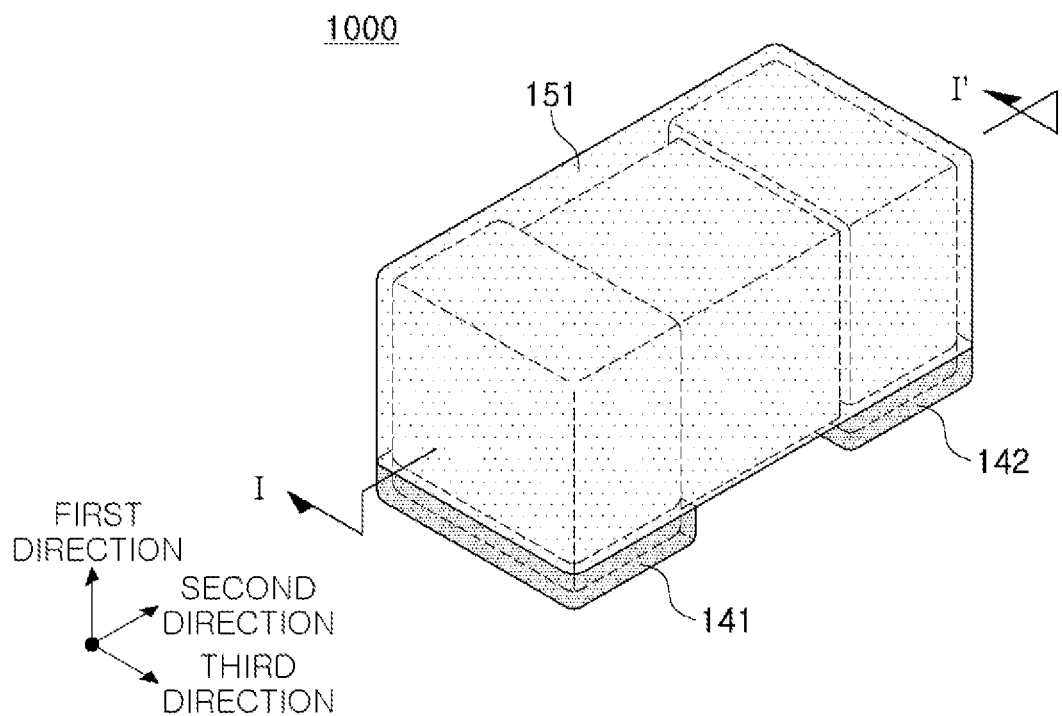
FIG. 1 schematically illustrates a multilayer electronic component according to an embodiment.

Hereinafter, embodiments of the present disclosure will be described with reference to detailed embodiments and the accompanying drawings. However, the embodiment may be modified in various other forms, and the scope of the present disclosure is not limited to the embodiments described below. Further, the embodiments of the present disclosure are provided to describe the present disclosure in more detail to those skilled in the art. Accordingly, the shapes and sizes of elements in the drawings may be exaggerated for a clearer understanding, and elements indicated by the same reference numerals in the drawings are the same elements.

To clearly explain the present disclosure in the drawings, portions irrelevant to the description are omitted, and the size and thickness of respective components illustrated in the drawings are arbitrarily indicated for convenience of description, so the present disclosure is not necessarily limited to the illustration. In addition, components having the same function within the scope of the same concept will be described using the same reference numerals. Furthermore, throughout the specification, when a part "includes" a certain element, it means that other elements may be further included, rather than excluding other elements, unless otherwise stated.

In the drawings, a first direction may be defined as a lamination direction or a thickness (T) direction, a second direction may be defined as a length (L) direction, and a third direction may be defined as a width (W) direction.

FIG. 1 schematically illustrates a multilayer electronic component according to an embodiment.

Figure 2:
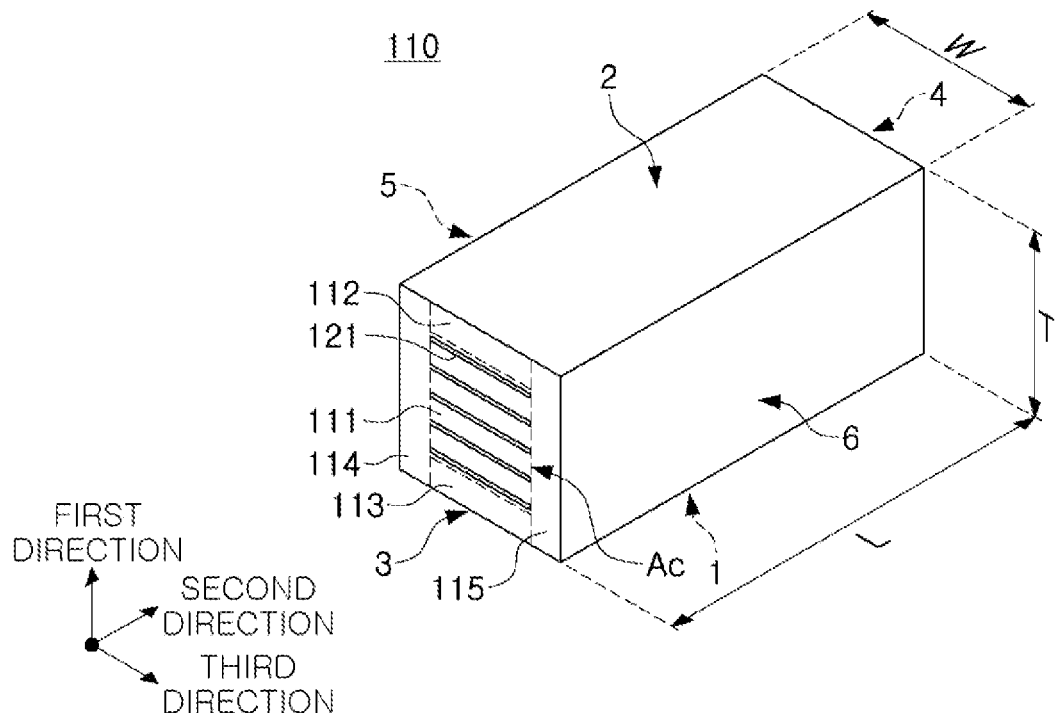
FIG. 2 schematically illustrates a body of the multilayer electronic component of FIG. 1.

FIG. 2 schematically illustrates a body of the multilayer electronic component of FIG. 1.

Figure 3:
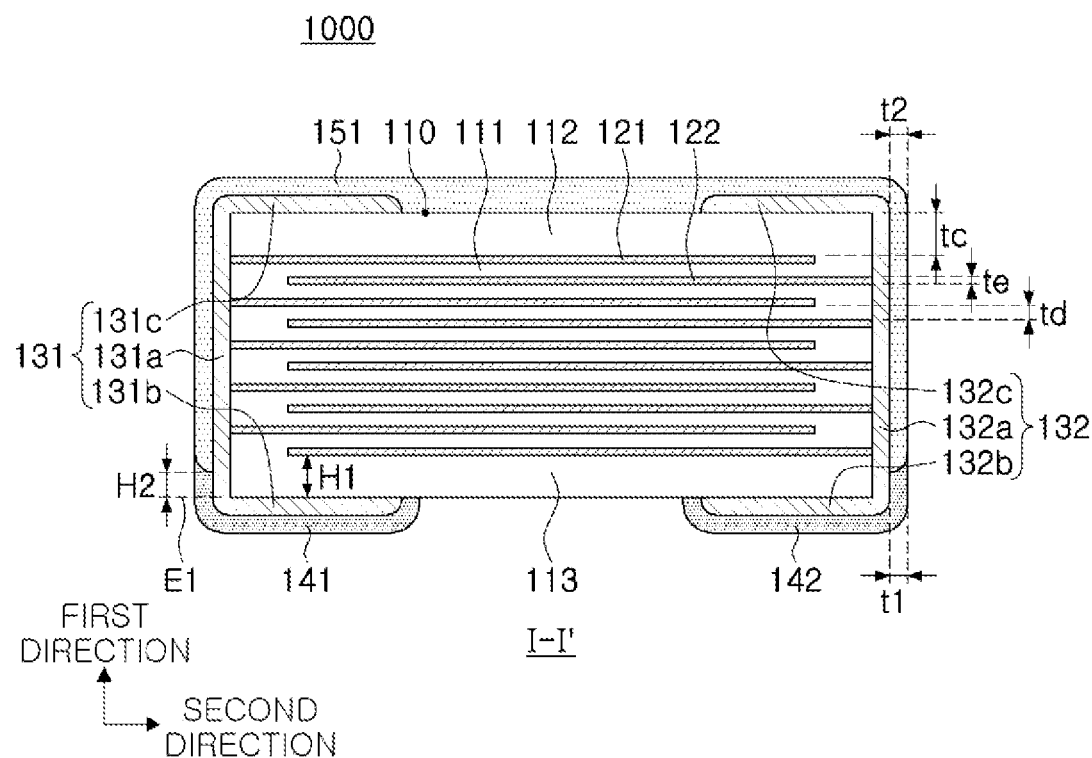
FIG. 3 is a cross-sectional view taken along line I-I' of FIG. 1.

FIG. 3 is a cross-sectional view taken along line I-I' of FIG. 1.

Figure 4:
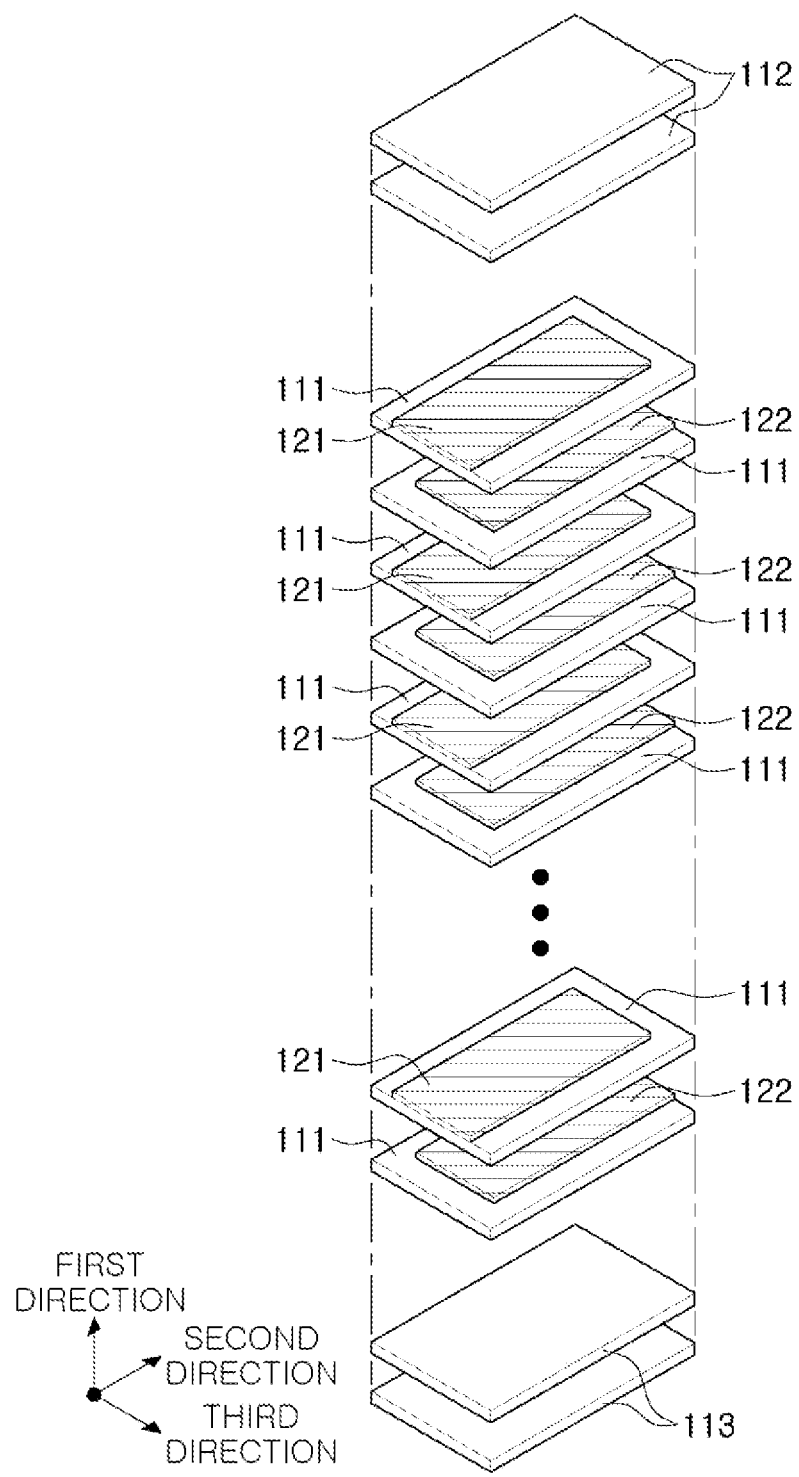
FIG. 4 is an exploded perspective view schematically illustrating an exploded body of FIG. 2.

FIG. 4 is an exploded perspective view schematically illustrating an exploded body of FIG. 2.

Figure 5:
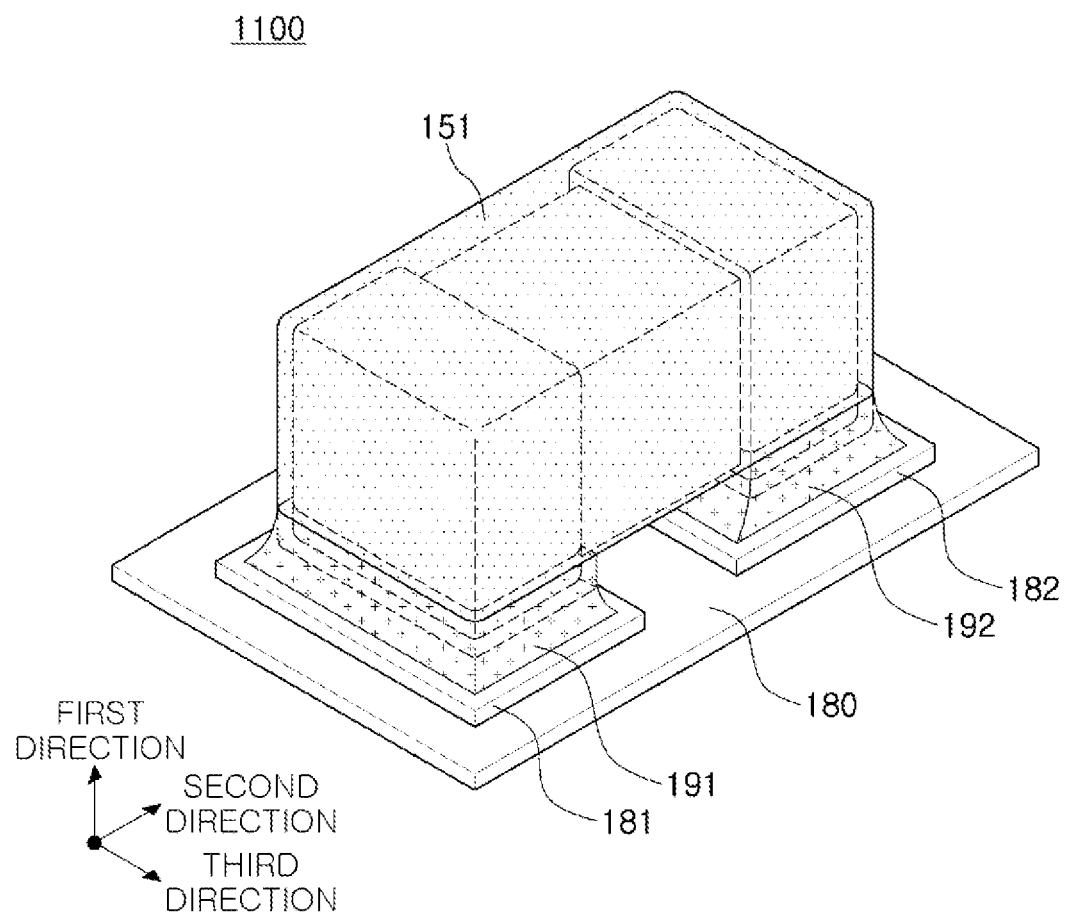
FIG. 5 is a schematic perspective view of a board on which the multilayer electronic component of FIG. 1 is mounted.

FIG. 5 is a schematic perspective view of a board on which the multilayer electronic component of FIG. 1 is mounted.

Hereinafter, a multilayer electronic component 1000 according to an embodiment will be described with reference to FIGS. 1 to 5.

A multilayer electronic component 1000 according to an embodiment may include a body 110 including a dielectric layer 111, and first and second internal electrodes 121 and 122 alternately disposed with the dielectric layer interposed therebetween, and having first and second surfaces 1 and 2 opposing each other in a first direction, third and fourth surfaces 3 and 4 connected to the first and second surfaces and opposing each other in a second direction, and fifth and sixth surfaces 5 and 6 connected to the first to fourth surfaces and opposing each other in a third direction; a first external electrode 131 including a first connection portion 131*a* disposed on the third surface, a first band portion 131*b* extending from the first connection portion onto a portion of the first surface, and a third band portion 131*c* extending from the first connection portion onto a portion of the second surface; a second external electrode 132 including a second connection portion 132*a* disposed on the fourth surface, a second band portion 132*b* extending from the second connection portion onto a portion of the first surface, and a fourth band portion 132*c* extending from the second connection portion onto a portion of the second surface; an insulating layer 151 disposed on the first and second connection portions, and disposed to cover the second surface and the third and fourth band portions 131*c* and 132*c*; a first plating layer 141 disposed on the first band portion 131*b*; and a second plating layer 142 disposed on the second band portion 132*b*. The insulating layer 151 may include an oxide including hafnium (Hf).

In the body 110, the dielectric layer 111 and the internal electrodes 121 and 122 are alternately stacked.

A detailed shape of the body 110 is not particularly limited, but as illustrated, the body 110 may have a hexahedral shape or a similar shape. Due to the shrinkage of the ceramic powder included in the body 110 during the firing process, the body 110 may not have a perfectly straight hexahedral shape, but may have a substantially hexahedral shape.

The body 110 may have the first and second surfaces 1 and 2 opposing each other in the first direction, the third and fourth surfaces 3 and 4 connected to the first and second surfaces 1 and 2 and opposing each other in the second direction, and the fifth and sixth surfaces 5 and 6 connected to the first and second surfaces 1 and 2, connected to the third and fourth surfaces 3 and 4, and opposing each other in the third direction.

In an embodiment, the body 110 may include a 1-3 edge connecting the first and third surfaces, a 1-4 edge connecting the first and fourth surfaces, a 2-3 edge connecting the second and third surfaces, and a 2-4 edge connecting the second and fourth surfaces. The 1-3 edge and the 2-3 edge have a form contracted toward the center of the body in the first direction as they approach the third surface, and the 1-4 edge and the 2-4 edge may have a form contracted toward the center of the body in the first direction as they approach the fourth surface.

As a margin region in which the internal electrodes 121 and 122 are not disposed is overlapped on the dielectric layer 111, a step difference occurs due to the thickness of the internal electrodes 121 and 122, and an edge connecting the first surface and the third to fifth surfaces and/or an edge connecting the second surface and the third to the fifth surfaces may have a shape that is contracted toward the center of the body 110 in the first direction, when viewed from the first surface or the second surface. Alternatively, due to the shrinkage behavior in the sintering process of the body, an edge connecting the first surface 1 and the third to sixth surfaces 3, 4, 5, and 6 and/or an edge connecting the second surface 2 and the third to sixth surfaces 3, 4, 5 and 6 may have a shape that is contracted toward the center of the body 110 in the first direction when viewed from the first surface or the second surface. Alternatively, to prevent chipping defects and the like, as the edges connecting respective surfaces of the body 110 are rounded by performing a separate process, the edge connecting the first surface and the third to sixth surfaces and/or the edge connecting the second surface and the third to sixth surfaces may have a rounded shape.

The edge may include the 1-3 edge connecting the first surface and the third surface, the 1-4 edge connecting the first surface and the fourth surface, the 2-3 edge connecting the second surface and the third surface, and the 2-4 edge connecting the second and fourth surfaces. Also, the edge may include a 1-5 edge connecting the first surface and the fifth surface, a 1-6 edge connecting the first surface and the sixth surface, a 2-5 edge connecting the second surface and the fifth surface, and a 2-6 edge connecting the second surface and the sixth surface. The first to sixth surfaces of the body 110 may be substantially flat surfaces, and non-flat regions may be regarded as edges. Hereinafter, the extension line of each surface may indicate a line extended based on a flat portion of each surface.

In this case, in the external electrodes 131 and 132, a region disposed on an edge of the body 110 may be referred to as an edge portion, a region disposed on the third and fourth surfaces of the body 110 may be referred to as a connection portion, and a region disposed on the first and second surfaces of the body may be referred to as a band portion.

On the other hand, to suppress the step difference caused by the internal electrodes 121 and 122, in case in which cutting is performed so that the internal electrodes are exposed to the fifth and sixth surfaces 5 and 6 of the body after lamination, and then, in the case of forming margin portions 114 and 115 by stacking a single dielectric layer or two or more dielectric layers on both sides of a capacitance formation portion Ac in the third direction (width direction), a portion connecting the first surface and the fifth and sixth surfaces and a portion connecting the second surface and the fifth and sixth surfaces may not have a contracted shape.

The plurality of dielectric layers 111 forming the body 110 are in a fired state, and the boundary between the adjacent dielectric layers 111 may be integrated to the extent that it is difficult to check without using a scanning electron microscope (SEM).

According to an embodiment, the raw material for forming the dielectric layer 111 is not particularly limited as long as sufficient capacitance may be obtained. For example, a barium titanate-based material, a lead composite perovskite-based material, or a strontium titanate-based material may be used. The barium titanate-based material may include $BaTiO_3$-based ceramic powder. As an example of the ceramic powder, $BaTiO_3$, $(Ba_{1-x}Ca_x)TiO_3$ $(0<x<1)$, $Ba(Ti_{1-y}Ca_y)C_3$ $(0<y<1)$, $(Ba_{1-x}Ca_x)(Ti_{1-y}Zr_y)O_3$ $(0<x<1, 0<y<1)$ or $Ba(Ti_{1-y}Zr_y)O_3$ $(0<y<1)$ in which Ca (calcium), zirconium (Zr) or the like is partially solid-solubilized in $BaTiO_3$, or the like may be used.

In addition, as a raw material for forming the dielectric layer 111, according to the usage of the present disclosure, various ceramic additives, organic solvents, binders, dispersants, and the like may be added to the powder such as barium titanate ($BaTiO_3$).

On the other hand, an average thickness td of the dielectric layer 111 does not need to be particularly limited.

However, in general, in the case in which the dielectric layer is formed thinly with a thickness of less than 0.6 μm, in detail, the thickness of the dielectric layer is 0.35 μm or less, there is a concern that the reliability may be lowered.

According to an embodiment of the present disclosure, by disposing an insulating layer on the connection portion of the external electrode, and disposing the plating layer on the band portion of the external electrode, reliability may be improved by preventing penetration of external moisture, a plating solution, and the like. Therefore, even when the average thickness of the dielectric layer 111 is 0.35 μm or less, excellent reliability may be secured.

Therefore, when the average thickness of the dielectric layer 111 is 0.35 μm or less, the reliability improvement effect according to an embodiment of the present disclosure may be more significant.

The average thickness td of the dielectric layer 111 may indicate an average thickness of the dielectric layer 111 disposed between the first and second internal electrodes 121 and 122.

The average thickness of the dielectric layer 111 may be measured by scanning an image of the length and thickness direction (L-T) cross-section of the body 110 with a scanning electron microscope (SEM) having a magnification of 10,000. In detail, the average value may be measured by measuring the thickness of one dielectric layer at 30 equally spaced points in the length direction in the scanned image. The 30 points at equal intervals may be designated in the capacitance formation portion Ac. In addition, by expanding this average measurement to 10 dielectric layers and measuring the average value, the average thickness of the dielectric layers may be more generalized.

The body 110 may include the capacitance formation portion Ac that includes the first internal electrode 121 and the second internal electrode 122 disposed to face each other with the dielectric layer 111 interposed therebetween, to form capacitance, and cover portions 112 and 113 formed on upper and lower portions of the capacitance formation portion Ac in the first direction. The capacitance formation portion Ac and the cover portions 112 and 113 are disposed inside the body 110.

In addition, the capacitance formation portion (Ac) may be a part that contributes to the capacitance formation of the capacitor, and may be formed by repeatedly stacking the plurality of first and second internal electrodes 121 and 122 with the dielectric layer 111 interposed therebetween.

The cover portions 112 and 113 may include an upper cover portion 112 disposed on the capacitance formation portion Ac in the first direction, and a lower cover portion 113 disposed below the capacitance formation portion Ac in the first direction.

The upper cover portion 112 and the lower cover portion 113 may be formed by stacking a single dielectric layer or two or more dielectric layers on the upper and lower surfaces of the capacitance formation portion Ac in the thickness direction, respectively, and may basically serve to prevent damage to the internal electrode due to physical or chemical stress.

The upper cover portion 112 and the lower cover portion 113 do not include an internal electrode and may include the same material as the dielectric layer 111.

For example, the upper cover portion 112 and the lower cover portion 113 may include a ceramic material, for example, include a barium titanate ($BaTiO_3$)-based ceramic material.

On the other hand, the average thickness of the cover portions 112 and 113 does not need to be particularly limited. However, to more easily obtain miniaturization and high capacitance of the multilayer electronic component, an average thickness tc of the cover portions 112 and 113 may be 15 μm or less. Further, according to an embodiment, by disposing the insulating layer on the connection portion of the external electrode and disposing the plating layer on the band portion of the external electrode, reliability may be improved by preventing penetration of external moisture and a plating solution. Therefore, even when the average thickness tc of the cover portions 112 and 113 is 15 μm or less, excellent reliability may be secured.

The average thickness tc of the cover portions 112 and 113 may indicate a size in the first direction, and may be a value obtained by averaging the sizes of the cover portions 112 and 113 in the first direction measured at five points spaced apart at equal intervals on the upper or lower portion of the capacitance formation portion Ac. For example, the measurements may be taken by scanning the cross-section of the body 110 using a scanning electron microscope (SEM). Other methods and/or tools appreciated by one of ordinary skill in the art, even if not described in the present disclosure, may also be used.

In addition, margin portions 114 and 115 may be disposed on a side surface of the capacitance formation portion Ac.

The margin portions 114 and 115 may include a first margin 114 disposed on the fifth surface 5 of the body 110 and a second margin 115 disposed on the sixth surface 6 of the body 110. For example, the margin portions 114 and 115 may be disposed on both end surfaces of the body 110 in the width direction.

As illustrated in FIG. 3, the margin portions 114 and 115 may refer to regions between both ends of the first and second internal electrodes 121 and 122 and the boundary surface of the body 110 in the cross-section of the body 110 in the width-thickness (W-T) direction.

The margin portions 114 and 115 may basically serve to prevent damage to the internal electrode due to physical or chemical stress.

The margin portions 114 and 115 may be formed by forming internal electrodes by applying a conductive paste on the ceramic green sheet except where the margin portion is to be formed.

In addition, to suppress the step difference due to the internal electrodes 121 and 122, after cutting so that the internal electrode is exposed to the fifth and sixth surfaces 5 and 6 of the body after lamination, by laminating a single dielectric layer or two or more dielectric layers on both sides of the capacitance formation portion Ac in the third direction (width direction), the margin portions 114 and 115 may be formed.

On the other hand, the widths of the margin portions 114 and 115 do not need to be particularly limited. However, to more easily obtain miniaturization and high capacitance of the multilayer electronic component, the average width of the margin portions 114 and 115 may be 15 μm or less. In addition, according to an embodiment, an insulating layer is disposed on the connection portion of the external electrode, and the plating layer is disposed on the band portion of the external electrode, thereby improving reliability by preventing penetration of external moisture, a plating solution, and the like. Therefore, even when the average width of the margin portions 114 and 115 is 15 μm or less, excellent reliability may be secured.

The average width of the margin portions 114 and 115 may indicate an average size of the margin portions 114 and 115 in the third direction, and may be a value obtained by averaging the sizes of the margin portions 114 and 115 in the third direction, measured at five equally spaced points on the side surface of the capacitance formation portion Ac. For example, the measurements may be taken by scanning the cross-section of the body 110 using a scanning electron microscope (SEM). Other methods and/or tools appreciated by one of ordinary skill in the art, even if not described in the present disclosure, may also be used.

The internal electrodes 121 and 122 are alternately stacked with the dielectric layer 111.

The internal electrodes 121 and 122 may include first and second internal electrodes 121 and 122. The first and second internal electrodes 121 and 122 are alternately disposed to face each other with the dielectric layer 111 constituting the body 110 and interposed therebetween, and the first and second internal electrodes 121 and 122 may be exposed to the third and fourth surfaces 3 and 4 of the body 110, respectively.

Referring to FIG. 3, the first internal electrode 121 may be spaced apart from the fourth surface 4 and exposed through the third surface 3, and the second internal electrode 122 may be spaced apart from the third surface 3 and be exposed through the fourth surface 4. The first external electrode 131 is disposed on the third surface 3 of the body and is connected to the first internal electrode 121, and a second external electrode 132 may be disposed on the fourth surface 4 of the body to be connected to the second internal electrode 122.

For example, the first internal electrode 121 is not connected to the second external electrode 132, but is connected to the first external electrode 131, and the second internal electrode 122 is not connected to the first external electrode 131, but is connected to the second external electrode 132. Accordingly, the first internal electrode 121 is formed to be spaced apart from the fourth surface 4 by a predetermined distance, and the second internal electrode 122 may be formed to be spaced apart from the third surface 3 by a predetermined distance.

In this case, the first and second internal electrodes 121 and 122 may be electrically separated from each other by the dielectric layer 111 disposed therebetween.

The body 110 may be formed by alternately stacking a ceramic green sheet on which the first internal electrode 121 is printed and a ceramic green sheet on which the second internal electrode 122 is printed, followed by firing.

The material for forming the internal electrodes 121 and 122 is not particularly limited, and a material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing the conductive paste for internal electrodes, containing at least one of nickel (Ni), copper (Cu), palladium (Pd), silver (Ag), gold (Au), platinum (Pt), tin (Sn), tungsten (W), titanium (Ti), and alloys thereof, on a ceramic green sheet. The printing method of the conductive paste for the internal electrode may use a screen printing method, a gravure printing method, or the like, but the present disclosure is not limited thereto.

On the other hand, the average thickness to of the internal electrodes 121 and 122 does not need to be particularly limited.

However, in general, in the case in which the internal electrode is formed thinly with a thickness of less than 0.6 in detail, the thickness of the internal electrode is 0.35 μm or less, there is a concern that the reliability may be lowered.

According to an embodiment of the present disclosure, an insulating layer is disposed on the connection portion of the external electrode, and a plating layer is disposed on the band portion of the external electrode. Therefore, reliability may be improved by preventing penetration of external moisture, a plating solution, and the like. Thus, even when the average thickness of the internal electrodes 121 and 122 is 0.35 μm or less, excellent reliability may be secured.

Therefore, when the average thickness of the internal electrodes 121 and 122 is 0.35 μm or less, the effect according to the present disclosure may be more significant, and miniaturization and high capacitance of the multilayer electronic component may be more easily obtained.

The average thickness to of the internal electrodes 121 and 122 may indicate an average thickness of the internal electrodes 121 and 122.

The average thickness of the internal electrodes 121 and 122 may be measured by scanning an image of the length and thickness direction (L-T) cross-section of the body 110 with a scanning electron microscope (SEM) with a magnification of 10,000. In detail, the average value may be measured by measuring the thickness of one internal electrode at 30 equal intervals in the length direction in the scanned image. The 30 points spaced apart at equal intervals may be designated in the capacitance formation portion Ac. In addition, when the average value is measured by expanding this average value measurement to 10 internal electrodes, the average thickness of the internal electrode may be further generalized.

The external electrodes 131 and 132 may be disposed on the third surface 3 and the fourth surface 4 of the body 110. The external electrodes 131 and 132 may include first and second external electrodes 131 and 132 respectively disposed on the third and fourth surfaces 3 and 4 of the body 110 and connected to the first and second internal electrodes 121 and 122, respectively.

The external electrodes 131 and 132 may include a first external electrode 131 including a first connection portion 131a disposed on the third surface and a first band portion 131b extending from the first connection portion onto a portion of the first surface, and a second external electrode 132 including a second connection portion 132a disposed on the fourth surface and a second band portion 132b extending from the second connection portion onto a portion of the first surface. The first connection portion 131a may be connected to the first internal electrode 121 on the third surface, and the second connection portion 132a may be connected to the second internal electrode 122 on the fourth surface.

In addition, the first external electrode 131 may include a third band portion 131c extending from the first connection portion 131a onto a portion of the second surface, and the second external electrode 132 may include a fourth band portion 132c extending from the second connection portion 132a onto a portion of the second surface. Furthermore, the first external electrode 131 may include a first side band portion extending from the first connection portion 131a onto portions of the fifth and sixth surfaces, and the second external electrode 132 may include a second side band portion extending from the second connection portion 132a onto portions of the fifth and sixth surfaces.

However, the third band portion, the fourth band portion, the first side band portion and the second side band portion may not be essential components of the present disclosure. The first and second external electrodes 131 and 132 may not be disposed on the second surface or may not be disposed on the fifth and sixth surfaces. As the first and second external electrodes 131 and 132 are not disposed on the second surface, the first and second external electrodes 131 and 132 may be disposed below an extension line of the second surface of the body. In addition, the first and second connection portions 131a and 132a may be disposed to be spaced apart from the fifth and sixth surfaces, and the first and second connection portions 131a and 132a may be disposed to be spaced apart from the second surface. In addition, the first and second band portions 131b and 132b may also be disposed to be spaced apart from the fifth and sixth surfaces.

On the other hand, when the first and second external electrodes 131 and 132 include third and fourth band portions 131c and 132c, although the insulating layer is illustrated as being disposed on the third and fourth band portions 131c and 132c, the present disclosure is not limited thereto. To improve mounting convenience, a plating layer may be disposed on the third and fourth band portions 131c and 132c. In addition, the first and second external electrodes 131 and 132 may include the third and fourth band portions 131c and 132c, but may not include the side band portions, and in this case, the first and second connection portions 131a and 132a, and the first to fourth band portions 131a, 132b, 131c, and 132c may have a form spaced apart from the fifth and sixth surfaces.

In this embodiment, the structure in which the multilayer electronic component 1000 has two external electrodes 131 and 132 is described, but the number or shape of the external electrodes 131 and 132 may be changed according to the shape of the internal electrodes 121 and 122 or other uses.

On the other hand, the external electrodes 131 and 132 may be formed of any material as long as they have electrical conductivity, such as metal. A detailed material may be determined in consideration of electrical characteristics, structural stability, and the like, and further, the external electrodes 131 and 132 may have a multilayer structure.

The external electrodes 131 and 132 may be firing electrodes including a conductive metal and glass, or resin-based electrodes including a conductive metal and a resin.

In an embodiment, the external electrodes 131 and 132 may include glass. The insulating layer 151 of the present disclosure includes an oxide containing hafnium (Hf), and since the oxide containing hafnium (Hf) suppresses the occurrence of diffusion in the portion in contact with the glass, thereby preventing deterioration of the continuity of the insulating layer. Therefore, when the external electrodes 131 and 132 include glass, the effect according to an embodiment of the present disclosure may be more significant.

In addition, the external electrodes 131 and 132 may have a shape in which a fired electrode and a resin-based electrode are sequentially formed on a body. In addition, the external electrodes 131 and 132 are formed by transferring a sheet including a conductive metal on the body, or may be formed by transferring a sheet including a conductive metal onto the firing electrode.

As the conductive metal included in the external electrodes 131 and 132, a material having excellent electrical conductivity may be used, but is not particularly limited. For example, the conductive metal may be at least one of Cu, Ni, Pd, Ag, Sn, Cr, and alloys thereof. In detail, the external electrodes 131 and 132 may include at least one of Ni and a Ni alloy, and accordingly, connectivity with the internal electrodes 121 and 122 including Ni may be further improved.

The insulating layer 151 may be disposed on the first and second connection portions 131a and 132a.

The first and second connection portions 131a and 132a are portions connected to the internal electrodes 121 and 122, in the plating process, and may thus be the path of penetration of the plating solution or moisture penetration during actual use. Therefore, in an embodiment of the present disclosure, since the insulating layer 151 is disposed on the connection portions 131a and 132a, penetration of external moisture or a plating solution may be prevented.

The insulating layer 151 may be disposed to contact the first and second plating layers 141 and 142. In this case, the insulating layer 151 may be formed in the form partially covering the ends of the first and second plating layers 141 and 142 while being in contact therewith, or the first and second plating layers 141 and 142 may be formed in the form partially covering the ends of the insulating layer 151 while being in contact therewith.

The insulating layer 151 may be disposed on the first and second connection portions 131a and 132a and may be disposed to cover the second surface and the third and fourth band portions 131c and 132c. In this case, the insulating layer 151 may be disposed to cover a region in which the third and fourth band portions 131c and 132c are not disposed on the second surface, for example, cover the third and fourth band portions 131c and 132c. Accordingly, the insulating layer 151 covers the region in which the ends of the third and fourth band portions 131c and 132c and the body 110 come into contact, to block the moisture penetration path, thereby improving moisture-resistance reliability.

The insulating layer 151 may be disposed on the second surface to extend to the first and second connection portions 131a and 132a. Also, when the external electrodes 131 and 132 are not disposed on the second surface, the insulating layer may be disposed to completely cover the second surface. On the other hand, the insulating layer 151 is not necessarily disposed on the second surface, and the insulating layer may not be disposed on some or the entirety of the second surface, and the insulating layer may be separated into two and disposed on the first and second connection portions 131a and 132a, respectively. When the insulating layer is not disposed on the entirety of the second surface, the insulating layer may be disposed below an extension line of the second surface. In addition, although the insulating layer is not disposed on the second surface, the insulating layer may extend from the first and second connection portions 131a and 132a to the fifth and sixth surfaces to form one insulating layer.

Furthermore, the insulating layer 151 may be disposed to cover portions of the first and second side band portions, the fifth surface, and the sixth surface. In this case, portions of the fifth and sixth surfaces that are not covered by the insulating layer 151 may be exposed externally.

In addition, the insulating layer 151 may be disposed to cover the entirety of the first and second side band portions, the fifth surface and the sixth surface, and in this case, since the fifth and sixth surfaces are not exposed externally, the moisture resistance reliability may be improved, and the connection portions 131a and 132a are also not directly exposed externally, so that the reliability of the multilayer electronic component 1000 may be improved. In detail, the insulating layer may cover both the first and second side band portions, and cover all areas of the fifth and sixth surfaces except for the area in which the first and second side band portions are formed.

The insulating layer 151 may serve to prevent the plating layers 141 and 142 from being formed on the external electrodes 131 and 132 on which the insulating layer 151 is disposed, and may play a role in significantly reducing penetration of moisture or plating solution from the outside by improving the sealing characteristics.

The insulating layer 151 may include an oxide containing hafnium (Hf).

In the related art, a glass-based material is generally used for the insulating layer, but due to the nature of the glass-based material, it is difficult to form a uniform film due to severe agglomeration during sintering. Because heat is required during the sintering process, stress may occur in the body and cracks or delaminations may be caused. In addition, when an insulating layer including a glass-based material is used, a method of firing an insulating layer including a glass-based material after firing the external electrode is used, but in the process of firing the insulating layer, the metal material of the external electrode may diffuse into the internal electrode, which may cause radiation cracks. Furthermore, since the glass-based material generally has a hard characteristic, there is a concern that the glass-based material may be broken even by a small impact.

In the present disclosure, by applying an oxide containing hafnium (Hf) instead of a glass-based material to the insulating layer, an attempt is made to prevent the problem of the glass-based insulating layer. The oxide containing hafnium (Hf) not only has insulating properties, but also has significantly low moisture permeability, and therefore, sufficient moisture resistance reliability and acid resistance to a plating solution may be secured even with a relatively thin thickness. In addition, the oxide containing hafnium (Hf) suppresses diffusion in a portion in contact with glass, thereby preventing deterioration of the continuity of the insulating layer. Therefore, by applying an oxide containing hafnium (Hf) to the insulating layer instead of a glass-based material, moisture resistance reliability and acid resistance to the plating solution may be further improved, deterioration of the continuity of the insulating layer may be prevented, and cracks due to heat shrinkage and radiation cracks due to metal diffusion may be suppressed.

On the other hand, the method of forming the insulating layer 151 does not need to be particularly limited.

For example, after the external electrodes 131 and 132 may be formed on the body 100, the insulating layer 151 including an oxide containing hafnium (Hf) may be formed using an atomic layer deposition (ALD). The atomic layer deposition is a technology that deposits a thin film or a protective film on the surface of a substrate during a semiconductor process, and is a technology that grows a thin film by stacking atomic layers one by one unlike the existing deposition technology that chemically coats a thin film. The atomic layer deposition has advantages of excellent step-coverage, easy thin film thickness control, and uniform thin film formation. Accordingly, the insulating layer 151 may be formed by an atomic layer deposition method, thereby forming a thin and uniform insulating layer 151.

In addition, the type of oxide containing hafnium (Hf) included in the insulating layer 151 is not particularly limited, but may be, for example, $HfO_2$.

In an embodiment, in the insulating layer 151, the number of moles of hafnium (Hf) atoms relative to the total number of moles of elements other than oxygen atoms may be 0.95 or more. For example, except for elements detected as impurities, the insulating layer 151 may be substantially formed of an oxide containing hafnium (Hf). In this case, the oxide containing hafnium (Hf) may be $HfO_2$. Accordingly, the effect of suppressing cracks due to heat shrinkage, radiation cracks caused by metal diffusion, and the like and the effect of improving moisture resistance reliability may be further improved.

In this case, the component of the insulating layer 151 may be calculated from an image observed using Scanning Electron Microscope-Energy Dispersive X-ray Spectroscopy (SEM-EDS). In detail, after exposing the length and thickness direction cross-sections (L-T cross-section) by grinding the multilayer electronic component to the central position in the width direction (third direction), the number of moles of respective elements included in the insulating layer may be measured using EDS in the central region among regions in which the insulating layer is divided into 5 equal parts in the thickness direction, and the number of moles of hafnium (Hf) atoms relative to the total number of moles of elements other than oxygen atoms may be calculated.

In an embodiment, an average thickness t2 of the insulating layer 151 may be 15 nm or more and 1000 nm or less. When the average thickness t2 of the insulating layer 151 is 15 nm or more, the moisture transmittance of the insulating layer may be 0 mg/[m$^2$ day], and thereby, moisture resistance reliability may be improved.

If the average thickness of the insulating layer 151 is less than 15 nm, there is a concern that the effect of suppressing cracks due to heat shrinkage and radiation cracking due to metal diffusion and the effect of improving moisture resistance reliability may not be sufficiently secured. The moisture permeability of the insulating layer may exceed 0 mg/[m² day]. On the other hand, if the average thickness of the insulating layer 151 is greater than 1000 nm, there is a risk of cracking in the insulating layer, insulation layer formation time may be too long, and as the overall size of the multilayer electronic component increases, the capacitance per unit volume may decrease.

The average thickness t2 of the insulating layer 151 may be an average of thicknesses measured at five points at equal intervals on the insulating layer 151 disposed on the first and second connection portions 131*a* and 132*a*. As a more detailed example, the average thickness t2 may be a value obtained by averaging the thickness values of the insulating layer measured at locations corresponding to a central point of the first and second connection portions 131*a* and 132*a* in the first direction, two points spaced apart by 5 µm in the first direction with respect to the central point in the first direction, and two points spaced apart by 10 µm in the first direction. For example, the measurements may be taken by scanning the cross-section of the body 110 using a scanning electron microscope (SEM). Other methods and/or tools appreciated by one of ordinary skill in the art, even if not described in the present disclosure, may also be used.

In an embodiment, a cover layer disposed on the insulating layer 151 and including an oxide including aluminum (Al) may be further included. A more detailed description thereof will be given later.

In an embodiment, the insulating layer 151 is disposed to be in direct contact with the first and second external electrodes 131 and 132, and the first and second external electrodes 131 and 132 may include conductive metal and glass. Accordingly, since the plating layers 141 and 142 may not be disposed in the region in which the insulating layer 151 is disposed among the external surfaces of the first and second external electrodes 131 and 132, external electrode erosion by the plating solution may be effectively prevented.

In this case, the first plating layer 141 may be disposed to cover the end of the insulating layer 151 disposed on the first external electrode 131, and the second plating layer 142 may be disposed to cover an end of the insulating layer 151 disposed on the second external electrode 132. By first forming the insulating layer 151 before forming the plating layers 141 and 142 on the external electrodes 131 and 132, penetration of the plating solution in the process of forming the plating layer may be more reliably suppressed. As the insulating layer is formed before the plating layer, the plating layers 141 and 142 may have a form covering the ends of the insulating layer 151.

In an embodiment, the insulating layer 151 may be disposed to be in direct contact with the first and second external electrodes 131 and 132, and the first and second external electrodes 131 and 132 may include a conductive metal and a resin. Accordingly, since the plating layers 141 and 142 may not be disposed in the region in which the insulating layer 151 is disposed in the external surfaces of the first and second external electrodes 131 and 132, external electrode erosion by the plating solution may be effectively suppressed.

In this case, the first plating layer 141 may be disposed to cover the end of the insulating layer 151 disposed on the first external electrode 131, and the second plating layer 142 may be disposed to cover an end of the insulating layer 151 disposed on the second external electrode 132. By first forming the insulating layer 151 before forming the plating layers 141 and 142 on the external electrodes 131 and 132, penetration of the plating solution in the process of forming the plating layer may be more reliably suppressed. As the insulating layer is formed before the plating layer, the plating layers 141 and 142 may have a shape covering the end of the insulating layer 151.

The first and second plating layers 141 and 142 may be disposed on the first and second band portions 131*b* and 132*b*, respectively. The plating layers 141 and 142 may serve to improve the mounting characteristics, and as the plating layers 141 and 142 are disposed on the band portions 131*b* and 132*b*, the mounting space may be significantly reduced, and reliability may be improved by significantly reducing penetration of the plating solution into the internal electrode. One end of the first and second plating layers 141 and 142 may contact the first surface, and the other end may contact the insulating layer 151.

The type of the plating layers 141 and 142 is not particularly limited, and may be a plating layer including at least one of Cu, Ni, Sn, Ag, Au, Pd and alloys thereof, and the plating layers may be formed in a plurality of layers.

For a more detailed example of the plating layer (141, 142), the plating layers 141 and 142 may be a Ni plating layer or a Sn plating layer, and the Ni plating layer and the Sn plating layer may be sequentially formed on the first and second band portions 131*b* and 132*b*.

In an embodiment, the first and second plating layers 141 and 142 may be extended to partially cover the first and second connection portions 131*a* and 132*a*, respectively. Among the first and second internal electrodes 121 and 122, when the average distance in the first direction up to the internal electrode disposed closest to the first surface 1 is referred to as H1 and the average distance in the first direction from the extension line of the first surface 1 to the ends of the first and second plating layers 141 and 142 disposed on the first and second connection portions 131*a* and 132*a* is referred to as H2; H1>H2 may be satisfied. Accordingly, the penetration of the plating solution into the internal electrode during the plating process may be suppressed, thereby improving reliability.

H1 and H2 may be values obtained by averaging values measured at a cross-section (L-T cross-section) obtained by cutting the body 110 in the first and second directions at five points having equal intervals therebetween in the third direction. H1 may be an average value of values measured at a point where the internal electrode disposed closest to the first surface 1 in each cross-section is connected to the external electrode, and H2 may be an average value of values measured based on the tip of the plating layer in contact with the external electrode, and in measuring H1 and H2, the extension line of the first surface serving as a reference may be the same. For example, the measurements may be taken by scanning the cross-section of the body 110 using a scanning electron microscope (SEM). Other methods and/or tools appreciated by one of ordinary skill in the art, even if not described in the present disclosure, may also be used.

In an embodiment, the first plating layer 141 may be disposed to cover the end of the insulating layer 151 disposed on the first external electrode 131, and the second plating layer 142 may be disposed to cover an end of the insulating layer 151 disposed on the second external electrode 132. Accordingly, the reliability of the multilayer electronic component 1000 may be improved by strengthening the bonding force between the insulating layer 151 and the plating layers 141 and 142.

In an embodiment, the insulating layer 151 may be disposed to cover the end of the first plating layer 141 disposed on the first external electrode 131, and the insulating layer 151 may be disposed to cover an end of the second plating layer 142 disposed on the second external electrode 132. Accordingly, the reliability of the multilayer electronic component 1000 may be improved by strengthening the bonding force between the insulating layer 151 and the plating layers 141 and 142.

In an embodiment, when the second direction average size of the body 110 is L, the second direction average distance from the extension line of the third surface to the end of the first band portion is B1, and the average distance in the second direction from the extension line of the fourth surface to the end of the second band portion is B2; $0.2 \leq B1/L \leq 0.4$ and $0.2 \leq B2/L \leq 0.4$ may be satisfied.

If B1/L and B2/L are less than 0.2, it may be difficult to secure sufficient fixing strength. On the other hand, if B2/L is greater than 0.4, there is a risk that a leakage current may be generated between the first band portion 131b and the second band portion 132b under a high voltage current, and during the plating process, there is a concern that the first band portion 131b and the second band portion 132b may be electrically connected to each other due to plating spread.

B1, B2 and L may be the average value of the values measured in the section (L-T section) cut in the first and second directions at five points having equal intervals therebetween in the third direction of the body 110. For example, the measurements may be taken by scanning the cross-section of the body 110 using a scanning electron microscope (SEM). Other methods and/or tools appreciated by one of ordinary skill in the art, even if not described in the present disclosure, may also be used.

Referring to FIG. 5 illustrating a mounting board 1100 on which the multilayer electronic component 1000 is mounted, the plating layers 141 and 142 of the multilayer electronic component 1000 may be bonded to the electrode pads 181 and 182 disposed on a substrate 180 by solders 191 and 192.

On the other hand, when the internal electrodes 121 and 122 are stacked in the first direction, the multilayer electronic component 1000 may be horizontally mounted on the substrate 180 such that the internal electrodes 121 and 122 are parallel to the mounting surface. However, the present disclosure is not limited to the case of horizontal mounting, and when the internal electrodes 121 and 122 are stacked in the third direction, the multilayer electronic component may be vertically mounted on the substrate so that the internal electrodes 121 and 122 are perpendicular to the mounting surface.

The size of the multilayer electronic component 1000 does not need to be particularly limited.

However, to obtain miniaturization and high capacitance simultaneously, since the thickness of the dielectric layer and the internal electrode should be thinned to increase the number of layers, in the multilayer electronic component 1000 having a size of 1005 (length×width, 1.0 mm×0.5 mm) or less, the effect of improving reliability and capacitance per unit volume according to an embodiment of the present disclosure may become more significant.

Therefore, considering manufacturing errors and external electrode sizes, when the length of the multilayer electronic component 1000 is 1.1 mm or less and the width is 0.55 mm or less, the reliability improvement effect according to the present disclosure may be more significant. In this case, the length of the multilayer electronic component 1000 means a maximum size of the multilayer electronic component 1000 in the second direction, and the width of the multilayer electronic component 1000 may indicate a maximum size of the multilayer electronic component 1000 in the third direction. For example, the measurements may be taken by scanning the cross-section of the body 110 using a scanning electron microscope (SEM). Other methods and/or tools appreciated by one of ordinary skill in the art, even if not described in the present disclosure, may also be used.

EXAMPLE

Table 1 below illustrates evaluation of moisture resistance reliability and crack occurrence according to the average thickness of the insulating layer including the oxide containing hafnium (Hf).

In detail, an insulating layer having a different average thickness is formed on the Polyimide (PI) film for each test number by atomic layer deposition, and then the moisture transmittance was measured at 100% relative humidity and 41.8° C. In this case, the moisture permeability measurement equipment is 'AQUATRAN 1(G)' by Mocon.

In addition, the presence or absence of cracks was observed with the naked eye using an optical microscope, and the case in which cracks occurred is marked with '0', and the case in which cracks did not occur is marked with 'X'.

The moisture-resistance reliability evaluation was performed by forming an insulating layer on the PI film, but the effect that may be confirmed from the moisture-resistance reliability evaluation may be understood similarly in the case of the multilayer electronic components 1000, 2000 and 3000 according to various embodiments.

TABLE 1

| Test No. | Insulating Layer Average Thickness(nm) | Moisture permeability (mg/[m$^2$ day]) | Crack occurrence |
|---|---|---|---|
| 1 | 10 | 10,888 | X |
| 2 | 15 | 0 | X |
| 3 | 20 | 0 | X |
| 4 | 30 | 0 | X |
| 5 | 500 | 0 | X |
| 6 | 1000 | 0 | X |
| 7 | 1100 | 0 | O |

Test No. 1 is a case in which the average thickness of the insulating layer is less than 15 nm, and it can be confirmed that the effect of suppressing moisture permeation is insufficient.

In Test Nos. 2 to 7, when the average thickness of the insulating layer is 15 nm or more, it can be confirmed that the moisture permeation is 0 mg/m$^2$ day, and it can be confirmed that the effect of suppressing water permeation is significant.

However, in Test No. 7, the average thickness of the insulating layer exceeded 1000 nm, and cracks occurred in the insulating layer.

Therefore, by setting the average thickness t2 of the insulating layer of the multilayer electronic component according to an embodiment to 15 nm or more and 1000 nm or less, moisture permeation may be blocked to prevent cracks while securing excellent moisture resistance reliability.

Figure 6:
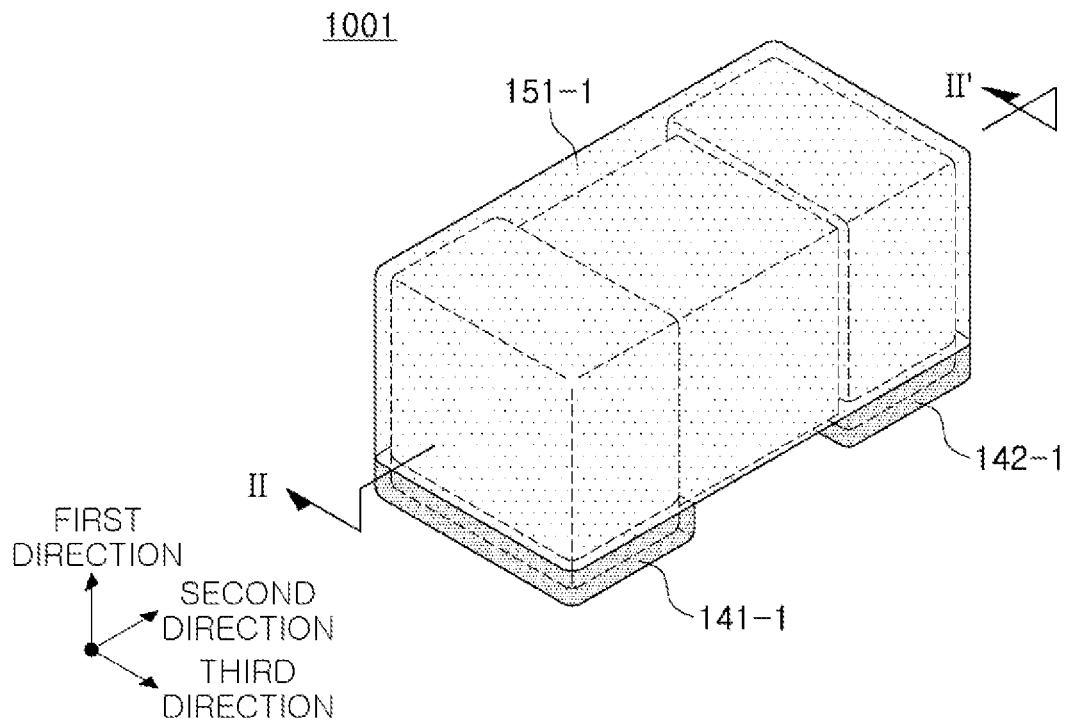
FIG. 6 is a schematic perspective view of a multilayer electronic component according to an embodiment.
Figure 7:
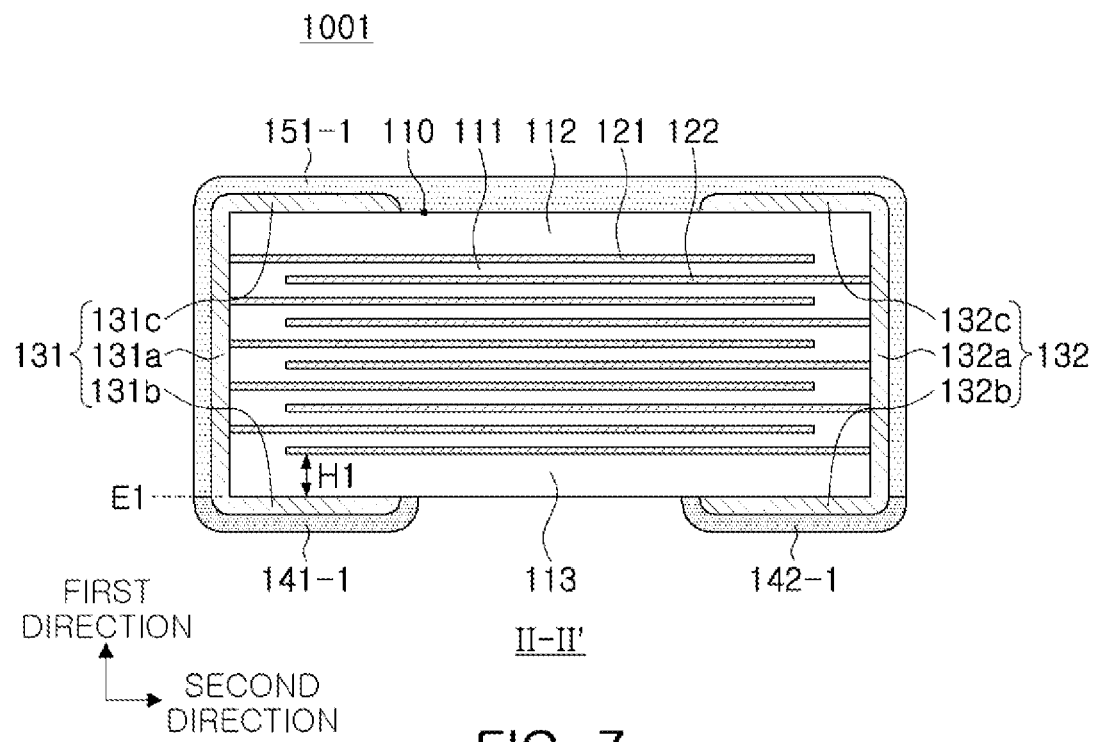
FIG. 7 is a cross-sectional view taken along line II-II' of FIG. 6.

FIG. 6 schematically illustrates a multilayer electronic component 1001 according to an embodiment, and FIG. 7 is a cross-sectional view taken along line II-IF of FIG. 6.

Referring to FIGS. 6 and 7, in the multilayer electronic component 1001 according to an embodiment, first and second plating layers 141-1 and 142-1 may be disposed below an extension line (E1) of the first surface. Accordingly, the height of the solder may be significantly reduced during mounting, and the mounting space may be significantly reduced.

In addition, an insulating layer 151-1 may extend below the extension line of the first surface and may be disposed to contact the first and second plating layers 141-1 and 142-1.

Figure 8:
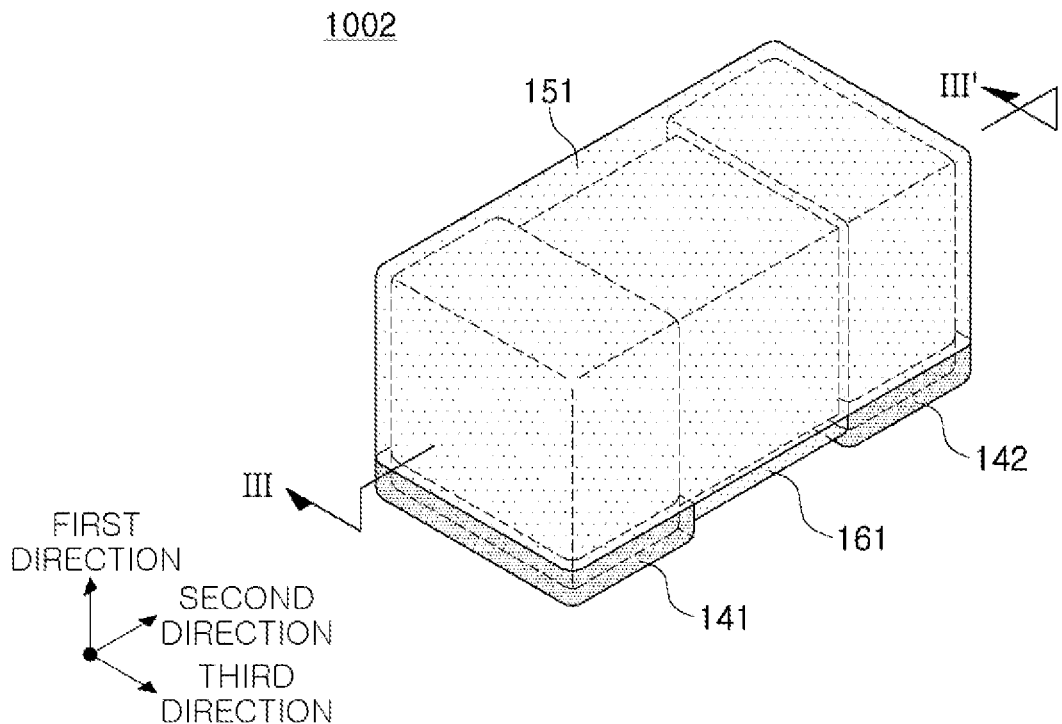
FIG. 8 is a schematic perspective view of a multilayer electronic component according to an embodiment.
Figure 9:
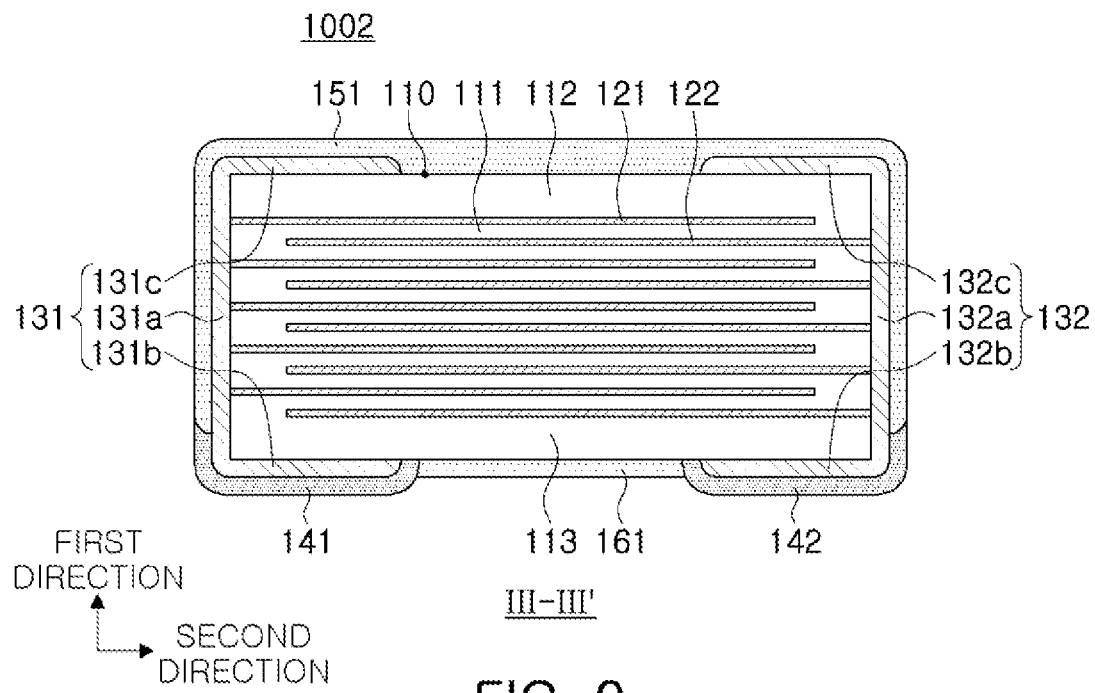
FIG. 9 is a cross-sectional view taken along line III-III' of FIG. 8.

FIG. 8 is a schematic perspective view of a multilayer electronic component 1002 according to an embodiment, and FIG. 9 is a cross-sectional view taken along line of FIG. 8.

Referring to FIGS. 8 and 9, the multilayer electronic component 1002 according to an embodiment may further include an additional insulating layer 161 disposed on the first surface 1 and disposed between the first band portion 131b and the second band portion 132b. Accordingly, leakage current that may occur between the first band portion 131b and the second band portion 132b under a high-voltage current may be prevented.

The type of the additional insulating layer 161 does not need to be particularly limited. For example, the additional insulating layer 161 may include an oxide containing hafnium (Hf) like the insulating layer 151. However, it is not necessary to limit the additional insulating layer 161 and the insulating layer 151 to the same material, and may be formed of different materials. For example, at least one selected from epoxy resin, acrylic resin, ethyl cellulose, and the like may be included, or glass may be included.

Figure 10:
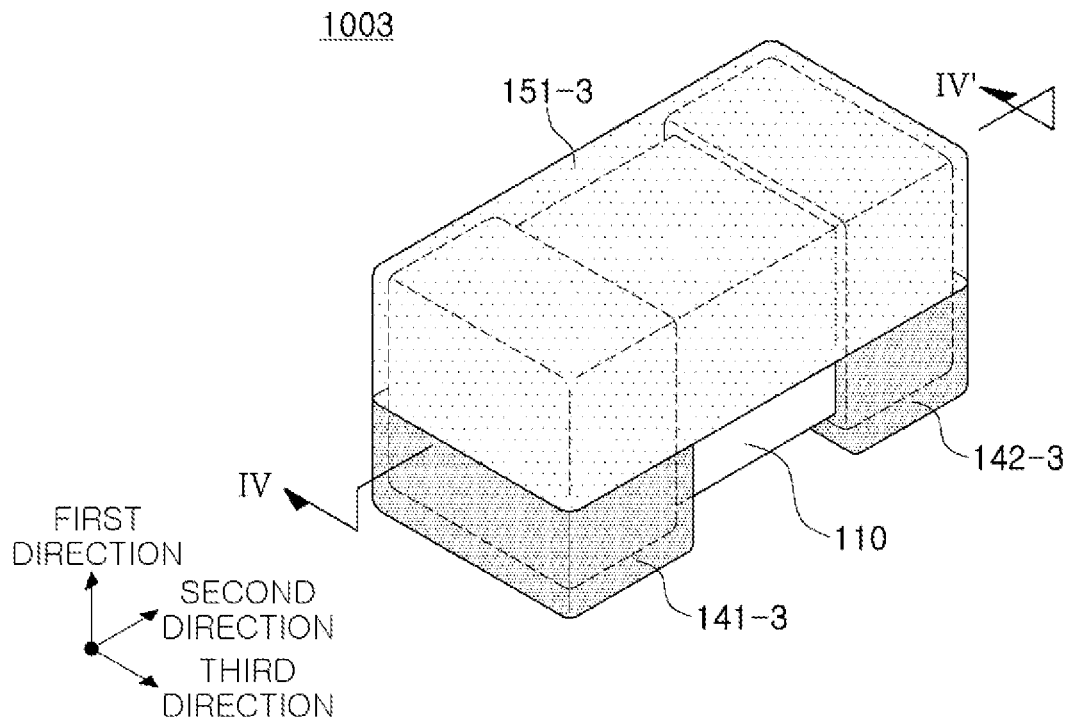
FIG. 10 is a schematic perspective view of a multilayer electronic component according to an embodiment.
Figure 11:
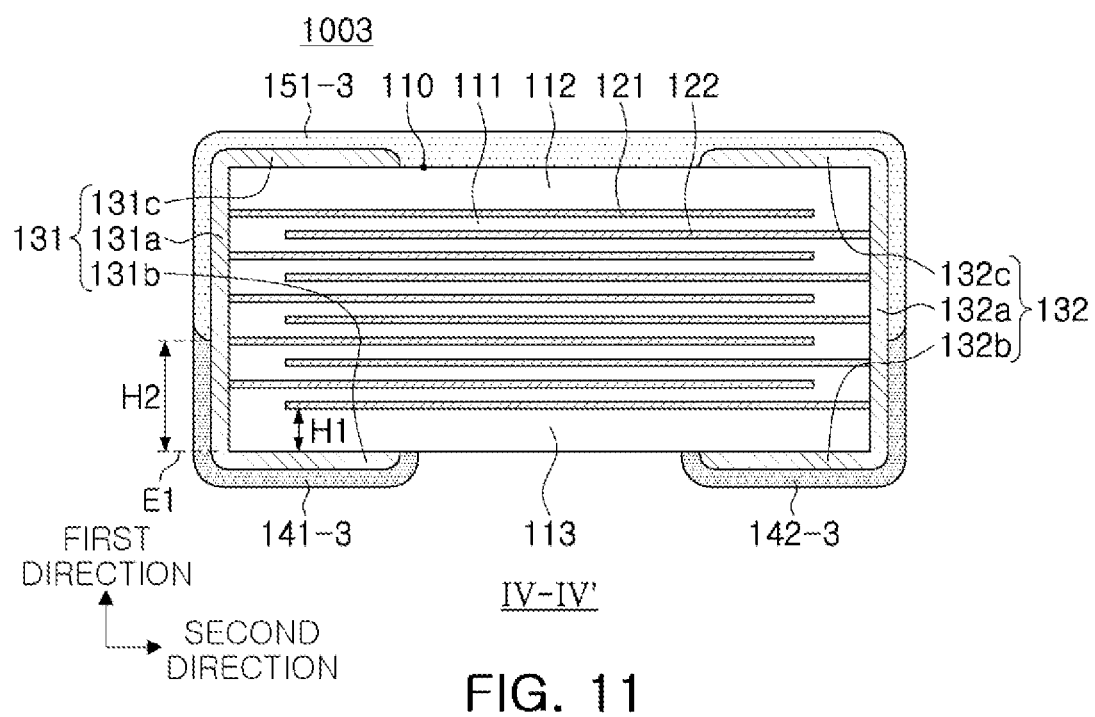
FIG. 11 is a cross-sectional view taken along line IV-IV' of FIG. 10.

FIG. 10 is a schematic perspective view of a multilayer electronic component 1003 according to an embodiment, and FIG. 11 is a cross-sectional view taken along line IV-IV' of FIG. 10.

Referring to FIGS. 10 and 11, in the multilayer electronic component 1003 according to an embodiment, when H1 is the average distance in the first direction from the first surface 1 to the internal electrode disposed closest to the first surface 1 among the first and second internal electrodes 121 and 122, and when the average distance in the first direction from the extension line of the first surface 1 to the ends of the plating layers 141-3 and 142-3 disposed on the first and second connection portions 131a and 132a is H2, H1<H2 may be satisfied. Accordingly, by increasing the area in contact with the solder during mounting, the fixing strength may be improved.

In detail, when the average size of the body 110 in the first direction is T, H2<T/2 may be satisfied. For example, H1<H2<T/2 may be satisfied. If H2 is T/2 or more, there is a possibility that the effect of improving moisture-resistance reliability by the insulating layer may deteriorate.

H1, H2, and T may be values obtained by averaging values measured in cross sections (L-T cross-sections) obtained by cutting the body 110 in the first and second directions at five points having equal intervals therebetween in the third direction. H1 may be an average value of values measured at a point where the internal electrode disposed closest to the first surface 1 in each cross-section is connected to the external electrode, and H2 may be an average value of values measured based on the tip of the plating layer in contact with the external electrode in each section, and in measuring H1 and H2, the extension line of the first surface serving as a reference may be the same. For example, the measurements may be taken by scanning the cross-section of the body 110 using a scanning electron microscope (SEM). Other methods and/or tools appreciated by one of ordinary skill in the art, even if not described in the present disclosure, may also be used. In addition, T may be an average value after measuring a maximum size of the body 110 in the first direction in each cross-section.

Figure 12:
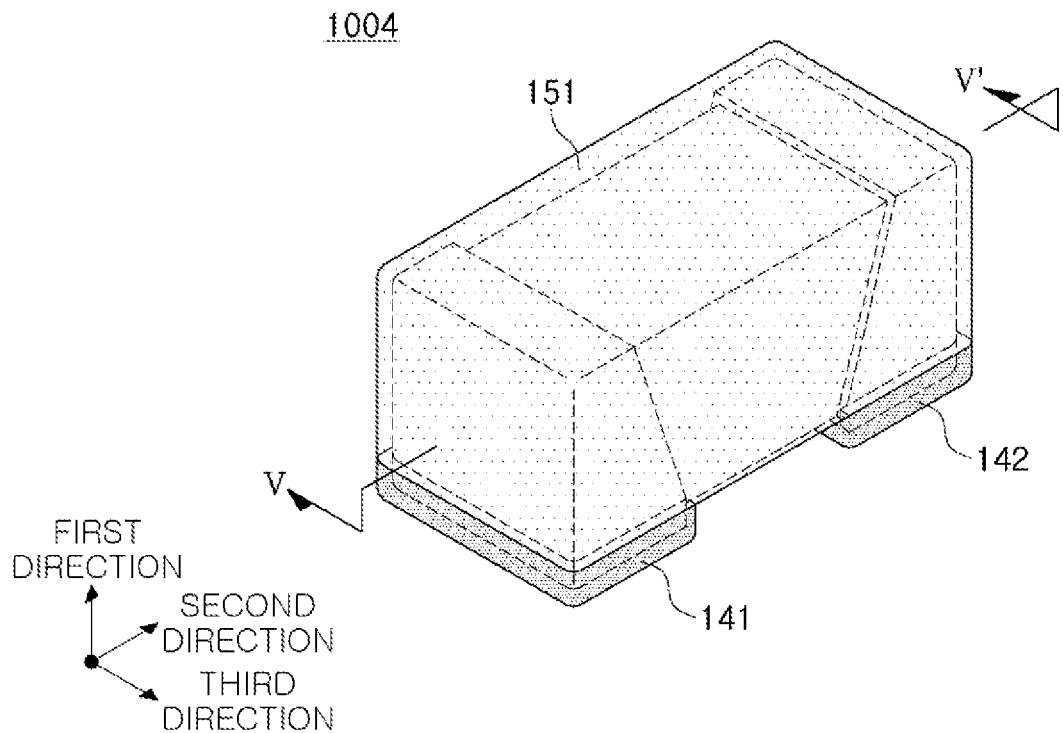
FIG. 12 is a schematic perspective view of a multilayer electronic component according to an embodiment.
Figure 13:
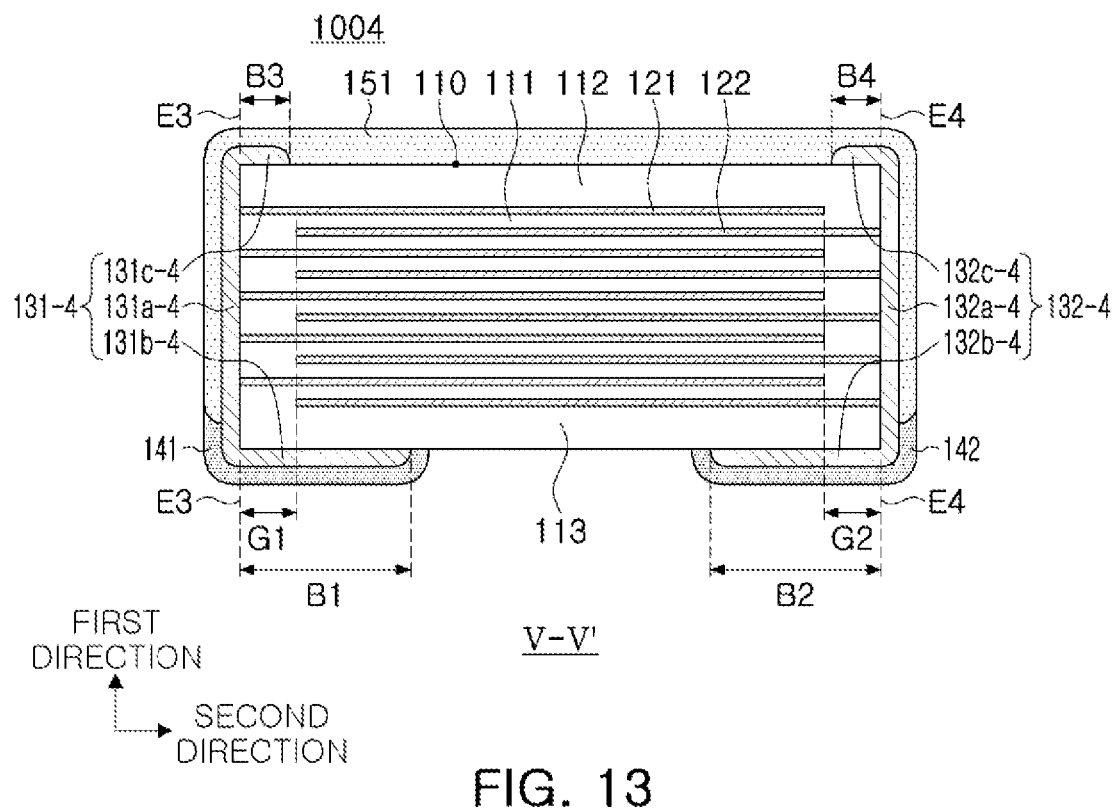
FIG. 13 is a cross-sectional view taken along line V-V' of FIG. 12.

FIG. 12 is a schematic perspective view of a multilayer electronic component 1004 according to an embodiment, and FIG. 13 is a cross-sectional view taken along line V-V' of FIG. 12.

Referring to FIGS. 12 and 13, in the multilayer electronic component 1004 according to an embodiment, an average length B1 of a first band portion 131b-4 may be longer than an average length B3 of a third band portion 131c-4, and the average length of a second band portion 132b-4 may be longer than an average length B4 of a fourth band portion 132c-4. Accordingly, by increasing the area in contact with the solder during mounting, the fixing strength may be improved.

In more detail, when the average distance in the second direction from the extension line of the third surface 3 to the end of the first band portion 131b-4 is B1, the average distance in the second direction from the extension line of the fourth surface 4 to the end of the second band portion 132b-4 is B2, the average distance in the second direction from the extension line of the third surface 3 to the end of the third band portion 131c-4 is B3, and the average distance in the second direction from the extension line of the fourth surface 4 to the end of the fourth band portion 132c-4 is B4; B3<B1 and B4<B2 may be satisfied.

In this case, when the average size of the body 110 in the second direction is L, $0.2 \leq B1/L \leq 0.4$ and $0.2 \leq B2/L \leq 0.4$ may be satisfied.

B1, B2, B3, B4 and L may be a value obtained by averaging values measured in a cross section (L-T cross-section) cut in the first and second directions at five points having equal intervals therebetween in the third direction. For example, the measurements may be taken by scanning the cross-section of the body 110 using a scanning electron microscope (SEM). Other methods and/or tools appreciated by one of ordinary skill in the art, even if not described in the present disclosure, may also be used.

In addition, a first external electrode 131-4 may include a first side band portion extending from the first connection portion 131a-4 onto portions of the fifth and sixth surfaces, and a second external electrode 132-4 may include a second side band portion extending from the second connection portion 132a-4 onto portions of the fifth and sixth surfaces. In this case, the sizes of the first and second side band portions in the second direction may gradually increase as they approach the first surface. For example, the first and second side band portions may be disposed in a tapered shape or a trapezoidal shape.

Further, when the average distance in the second direction from the extension line of the third surface to the end of the third band portion 141c-4 is B3, the average distance in the second direction from the extension line of the fourth surface to the end of the fourth band portion 142c-4 is B4, the second direction average size of the region in which the third surface and the second internal electrode 122 are spaced apart is G1, and the average size in the second direction of the region in which the fourth surface and the first internal electrode 121 are spaced apart is G2; B3<G1 and B4<G2 may be satisfied. Accordingly, the capacitance of the multilayer electronic component 1004 per unit volume may be increased by significantly reducing the volume occupied by the external electrode.

In the G1 and G2 in cross-sections obtained by cutting the body in the first and second directions from the center in the third direction, a value obtained by averaging the sizes in the second direction spaced apart from the third surface measured for five second internal electrodes located in the central portion in the first direction may be defined as G1, and a value obtained by averaging the sizes of the regions spaced apart from the fourth surface measured with respect to five arbitrary first internal electrodes located in the central portion in the first direction may be defined as G2. For example, the measurements may be taken by scanning the cross-section of the body 110 using a scanning electron microscope (SEM). Other methods and/or tools appreciated by one of ordinary skill in the art, even if not described in the present disclosure, may also be used.

Furthermore, the G1 and G2 may be obtained on the cross section (L-T cross-section) cut in the first and second directions at five points having equal intervals therebetween in the third direction, and may then be averaged to be more generalized.

However, it is not intended to limit the present disclosure to B3≤G1 and B4≤G2, and even when B3≥G1 and B4≥G2 are satisfied, this may be included as an embodiment of the present disclosure. Thus, in an embodiment, when the average distance in the second direction from the extension line of the third surface to the end of the third band is B3, the average distance in the second direction from the extension line of the fourth surface to the end of the fourth band portion is B4, the average size in the second direction of the region in which the third surface and the second internal electrode are spaced apart is G1, and the average size in the second direction of the region in which the fourth surface and the first internal electrode are spaced apart is G2; B3≥G1 and B4≥G2 may be satisfied.

In an embodiment, when the average distance in the second direction from the extension line of the third surface E3 to the end of the first band portion is B1, and the average distance in the second direction from the extension line of the fourth surface to the end of the second band portion is B2; B1≥G1 and B2≥G2 may be satisfied. Accordingly, the bonding strength of the multilayer electronic component 1004 to the substrate 180 may be improved.

Figure 14:
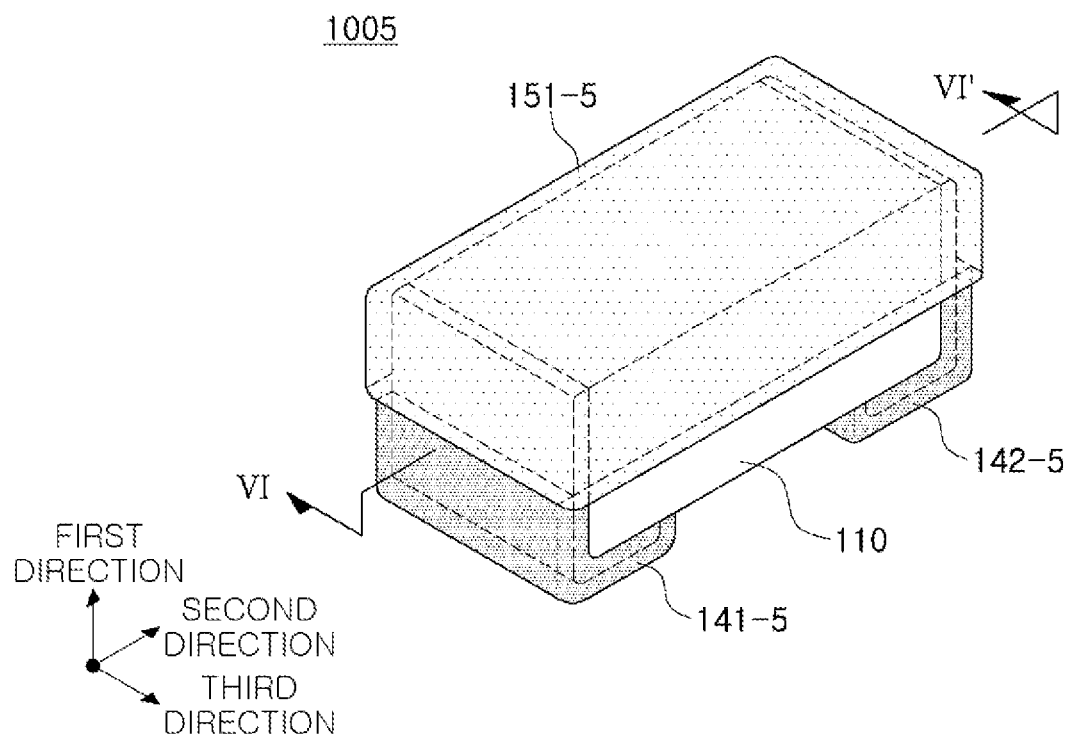
FIG. 14 is a schematic perspective view of a multilayer electronic component according to an embodiment.
Figure 15:
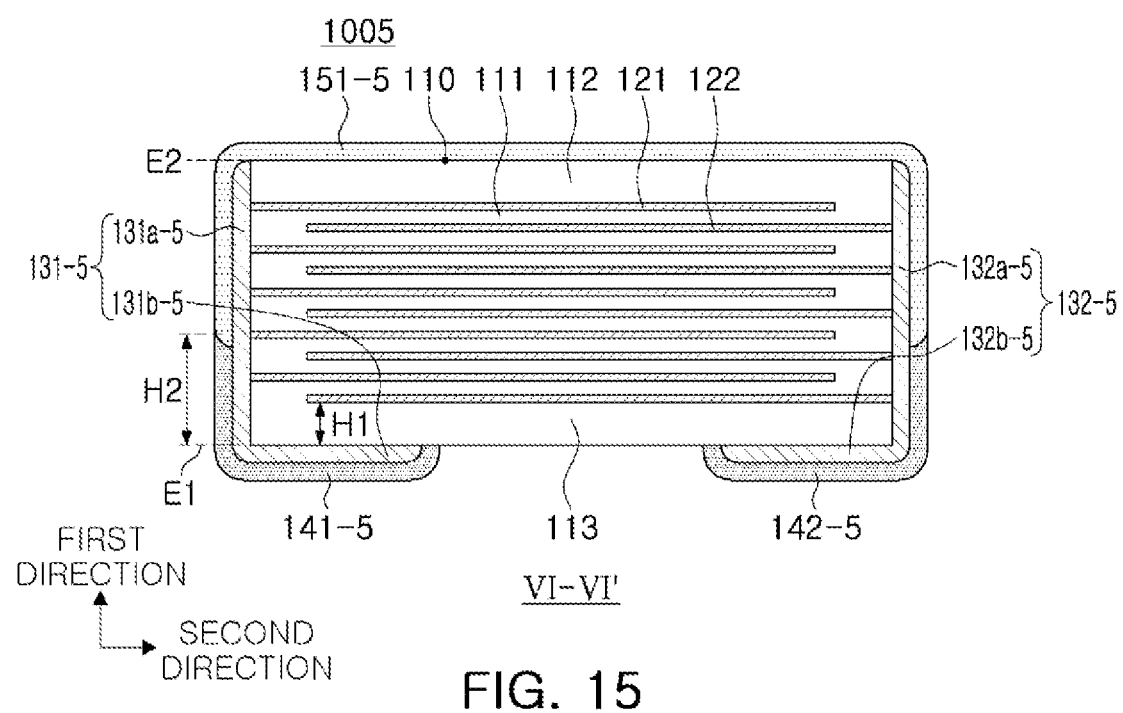
FIG. 15 is a cross-sectional view taken along line VI-VI' of FIG. 14.

FIG. 14 is a schematic perspective view of a multilayer electronic component 1005 according to an embodiment, and FIG. 15 is a cross-sectional view taken along line VI-VI' of FIG. 14.

Referring to FIGS. 14 and 15, first and second external electrodes 131-5 and 132-5 of the multilayer electronic component 1005 according to an embodiment are not disposed on the second surface, and may be disposed on the third, fourth and first surfaces to have an L-shape. For example, the first and second external electrodes 131-5 and 132-5 may be disposed below the extension line of the second surface.

The first external electrode 131-5 may include a first connection portion 131a-5 disposed on the third surface 3, and a first band portion 131b-5 extending from the first connection portion 131a-5 onto a portion of the first surface 1. The second external electrode 132-5 may include a second connection portion 132a-5 disposed on the fourth surface 4, and a second band portion 132b-5 extending from the second connection portion 132a-5 onto a portion of the first surface 1. Since the external electrodes 131-5 and 132-5 are not disposed on the second surface 2, an insulating layer 151-5 may be disposed to cover the entire second surface 2. Accordingly, the volume occupied by the external electrodes 131-5 and 132-5 may be significantly reduced. The capacitance of the multilayer electronic component 1005 per unit volume may be further improved. However, it is not necessary to limit the insulating layer 151-5 to a form that covers the entirety of the second surface 2, and the insulating layer may have a form in which the insulating layer does not cover a portion or the entirety of the second surface 2, but is separated to cover the first and second connection portions 131a-5 and 132a-5, respectively.

In addition, the insulating layer 151-5 is disposed to cover portions of the fifth and sixth surfaces to further improve reliability. In this case, portions of the fifth and sixth surfaces that are not covered by the insulating layer 151-5 may be exposed externally.

Furthermore, the insulating layer 151-5 may be disposed to cover the entirety of the fifth and sixth surfaces, and in this case, since the fifth and sixth surfaces are not exposed externally, moisture resistance reliability may be further improved.

A first plating layer 141-5 may be disposed on the first band portion 131b-5, a second plating layer 142-5 may be disposed on the second band portion 132b-5, and the first and second plating layers 141-5 and 142-5 may be disposed to extend onto portions of the first and second connection portions 132a-5 and 132b-5.

In this case, the external electrodes 131-5 and 132-5 may not be disposed even on the fifth and sixth surfaces 5 and 6. For example, the external electrodes 131-5 and 132-5 may be disposed only on the third, fourth, and first surfaces.

When the average distance in the first direction from the first surface 1 up to the internal electrode disposed closest to the first surface 1 among the first and second internal electrodes 121 and 122 is H1, and the average distance in the first direction from the extension line of the first surface 1 to the ends of the plating layers 141-5 and 142-5 disposed on the first and second connection portions 131a-5 and 132a-5 is H2; H1<H2 may be satisfied. Accordingly, the fixing strength may be improved by increasing the area in contact with the solder during mounting, and by increasing the contact area between the external electrodes 131-5 and 132-5 and the plating layers 141-5 and 142-5, an increase in Equivalent Series Resistance (ESR) may be suppressed.

In detail, when the average size of the body 110 in the first direction is T, H2<T/2 may be satisfied. For example, H1<H2<T/2 may be satisfied. If H2 is T/2 or more, there exists a possibility that the moisture-resistance reliability improvement effect by an insulating layer may deteriorate.

Also, the first and second plating layers 141-5 and 142-5 may be disposed to cover a portion of the insulating layer 151-1 on the third and fourth surfaces. For example, the plating layers 141-5 and 142-5 may be disposed to cover the end of the insulating layer 151-5 on the third and fourth surfaces. Accordingly, the bonding force between the insulating layer 151-5 and the plating layers 141-5 and 142-5 may be strengthened and the reliability of the multilayer electronic component 1005 may be improved.

Also, the insulating layer 151-5 may be disposed to cover portions of the first and second plating layers 141-5 and 142-5 on the third and fourth surfaces. For example, the insulating layer 151-5 may be disposed to cover the ends of the plating layers 141-5 and 142-5 on the third and fourth surfaces. Accordingly, the reliability of the multilayer electronic component 1005 may be improved by strengthening the bonding force between the insulating layer 151-5 and the plating layers 141-5 and 142-5.

Figure 16:
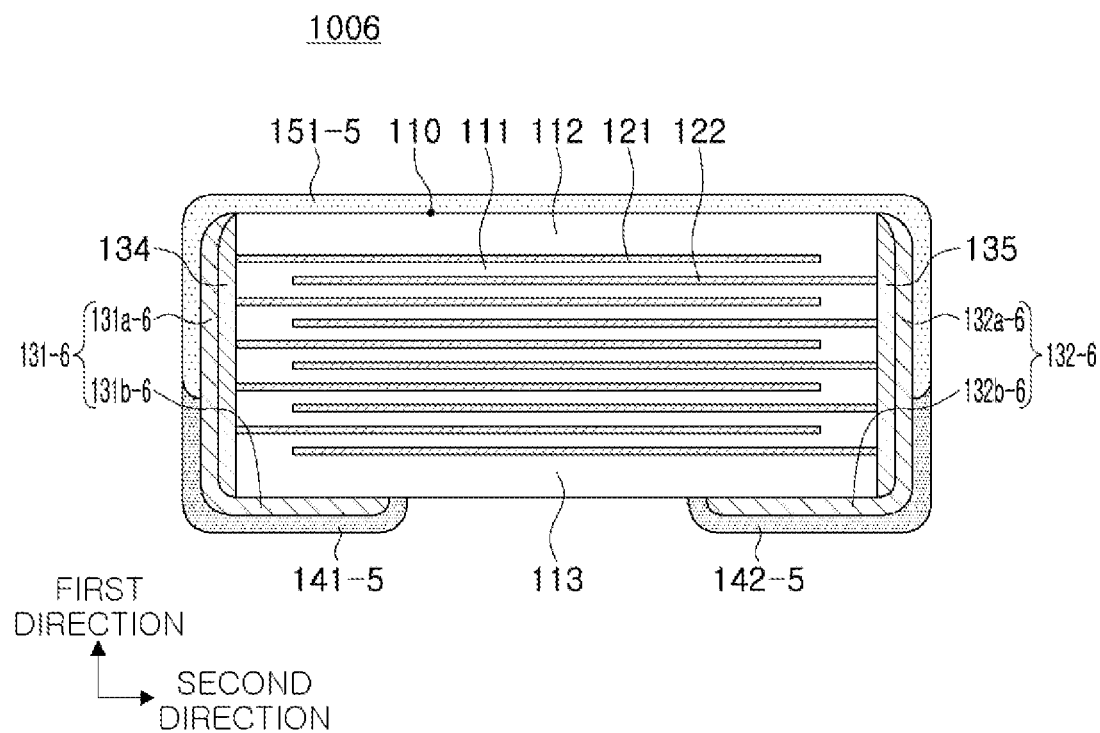
FIG. 16 illustrates a modified example of FIG. 14.

FIG. 16 illustrates a modified example of FIG. 14. Referring to FIG. 16, a modified example (1006) of the multilayer electronic component 1005 according to an embodiment is illustrated. A first additional electrode layer 134 may be disposed between the first connection portion 131a-6 and the third surface, and a second additional electrode layer 135 may be disposed between the second connection portion 132a-6 and the fourth surface. The first additional electrode layer 134 may be disposed within a range that does not deviate from the third surface, and the second additional electrode layer 135 may be disposed within a range that does not deviate from the fourth surface. The first and second additional electrode layers 134 and 135 may improve electrical connectivity between the internal electrodes 121 and 122 and the external electrodes 131-6 and 132-6, and the first and second additional electrode layers 134 and 135 have excellent bonding strength with the external electrodes 131-6 and 132-6, thereby serving to further improve the mechanical bonding force of the external electrodes 131-6 and 132-6.

The first and second external electrodes 131-6 and 132-6 may have an L-shape in which the first and second external electrodes are not disposed on the second surface.

The first external electrode 131-6 may include a first connection portion 131*a*-6 disposed on the first additional electrode layer 134, and a first band portion 131*b*-6 extending from the first connection portion 131*a*-6 onto a portion of the first surface 1. The second external electrode 132-6 may include a second connection portion 132*a*-6 disposed on the second additional electrode layer 135, and a second band portion 132*b*-6 extending from the second connection portion 132*a*-6 onto a portion of the first surface 1.

On the other hand, the first and second additional electrode layers 134 and 135 may be formed of any material as long as they have electrical conductivity, such as metal, and a detailed material may be determined in consideration of electrical characteristics and structural stability. In addition, the first and second additional electrode layers 134 and 135 may be firing electrodes including a conductive metal and glass, or resin-based electrodes including a conductive metal and a resin. In addition, the first and second additional electrode layers 134 and 135 may be formed by transferring a sheet including a conductive metal onto the body.

As the conductive metal included in the first and second additional electrode layers 134 and 135, a material having excellent electrical conductivity may be used, but is not particularly limited. For example, the conductive metal may be at least one of Cu, Ni, Pd, Ag, Sn, Cr, and alloys thereof. In detail, the first and second additional electrode layers 134 and 135 may include at least one of Ni and a Ni alloy, and accordingly, connectivity with the internal electrodes 121 and 122 including Ni may be further improved.

Figure 17:
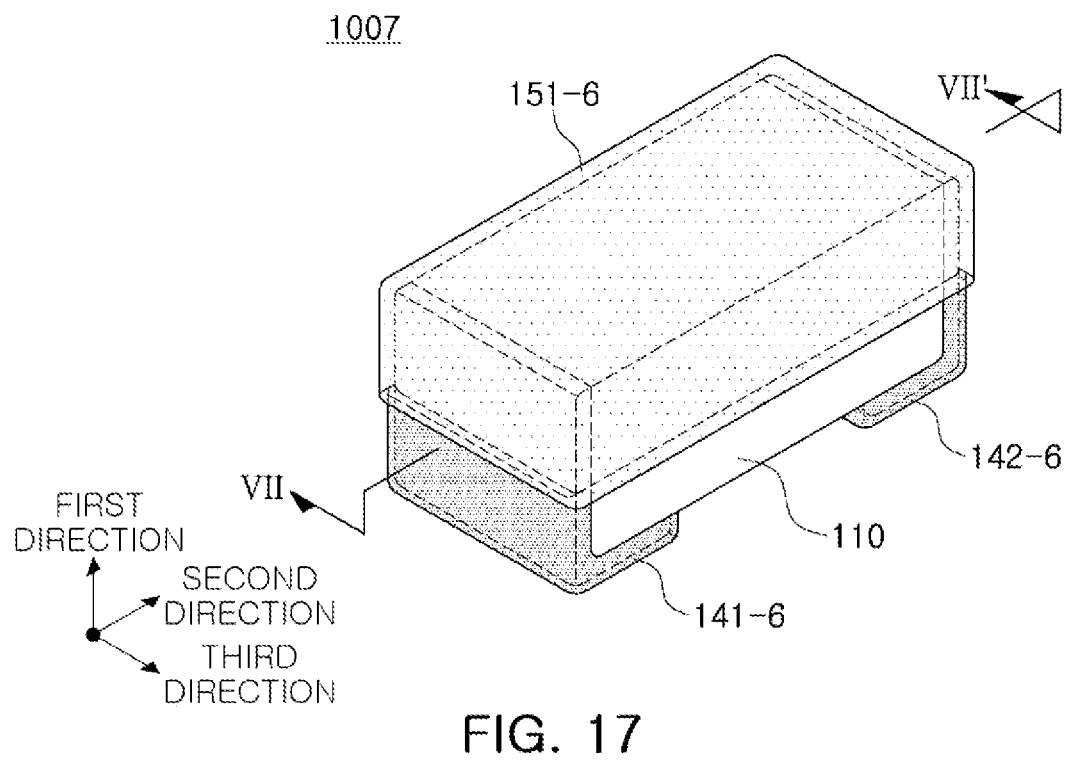
FIG. 17 is a schematic perspective view of a multilayer electronic component according to an embodiment.
Figure 18:
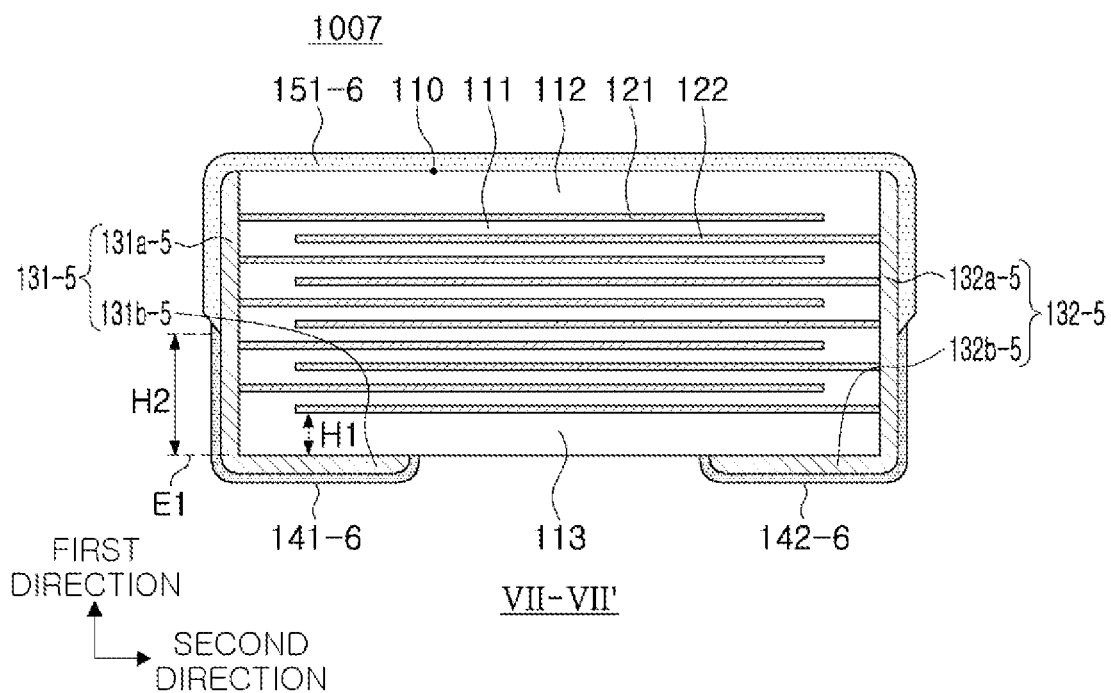
FIG. 18 is a cross-sectional view taken along line VII-VII' of FIG. 17.

FIG. 17 is a schematic perspective view of a multilayer electronic component 1007 according to an embodiment, and FIG. 18 is a cross-sectional view taken along line VII-VII' of FIG. 17.

Referring to FIGS. 17 and 18, an average thickness t1 of first and second plating layers 141-6 and 142-6 of the multilayer electronic component 1007 according to an embodiment may be less than an average thickness t2 of an insulating layer 151-6.

The insulating layer 151-6 serves to prevent penetration of external moisture or penetration of the plating solution, and the poor connectivity with the plating layers 141-6 and 142-6 may cause delamination of the plating layers 141-6 and 142-6. When the plating layer is delaminated, adhesion strength to the substrate 180 may be reduced. In this case, the delamination of the plating layers 141-6 and 142-6 may indicate that the plating layer is partially separated or is physically separated from the external electrodes 131-5 and 132-5. Because the connection between the plating layer and the insulating layer is relatively weak, there is a high possibility that the gap between the insulating layer and the plating layer will widen or foreign substances will penetrate. The possibility of delamination may increase as it becomes vulnerable to external shocks and the like.

According to an embodiment, the average thickness t1 of the plating layer is less than the average thickness t2 of the insulating layer. The contact area between the plating layer and the insulating layer may be reduced. Accordingly, the occurrence of delamination is suppressed and the bonding strength of the multilayer electronic component 1000 to the substrate 180 may be improved.

The average thickness t1 of the first and second plating layers 141-6 and 142-6 may be a value obtained by averaging the thicknesses measured at five equally spaced points on the first and second plating layers 141-6 and 142-6 disposed on the first and second connection portions 131*a*-5 and 132*a*-5 or the first and second band portions 131*b*-5 and 132*b*-5, respectively, and the average thickness t2 of the insulating layer 151-6 may be a value obtained by averaging thicknesses measured at five points at equal intervals on the insulating layer disposed on the first and second connection portions 131*a*-5 and 132*a*-5. For example, the measurements may be taken by scanning the cross-section of the body 110 using a scanning electron microscope (SEM). Other methods and/or tools appreciated by one of ordinary skill in the art, even if not described in the present disclosure, may also be used.

Figure 19:
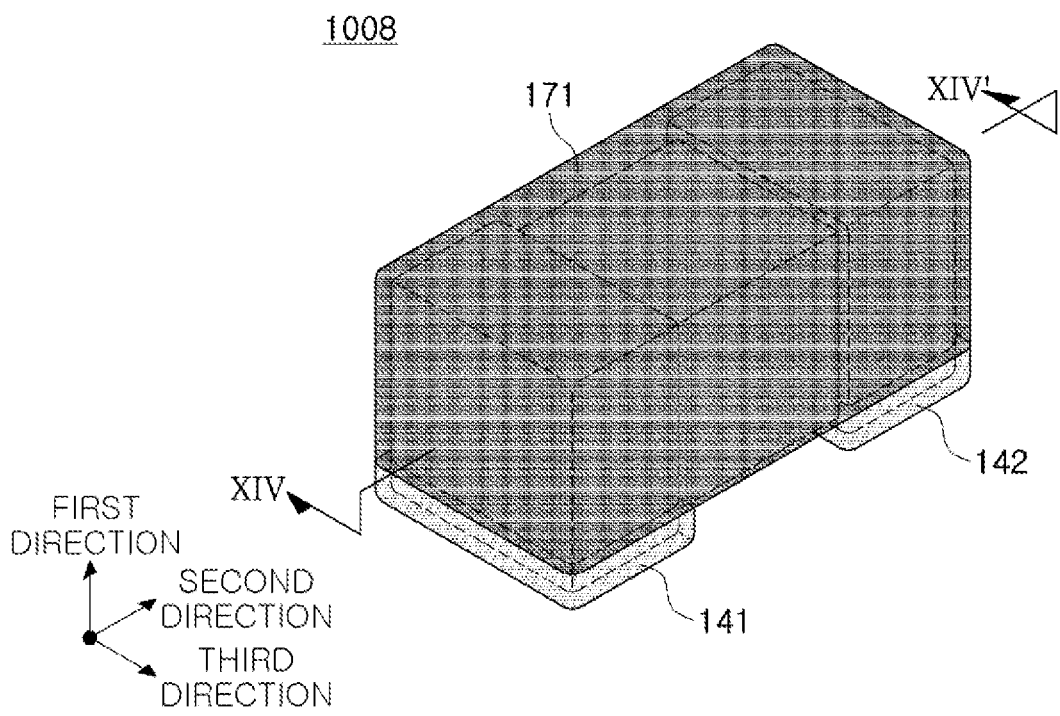
FIG. 19 is a schematic perspective view of a multilayer electronic component according to an embodiment.
Figure 20:
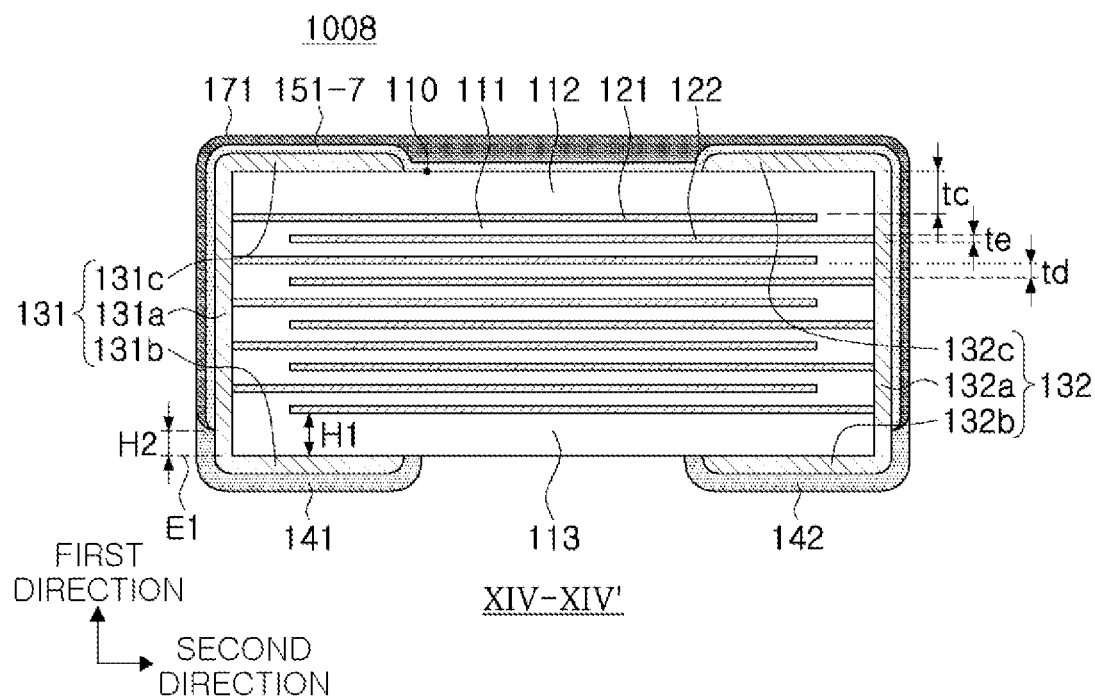
FIG. 20 is a cross-sectional view taken along line XIV-XIV' of FIG. 19.

FIG. 19 is a schematic perspective view of a multilayer electronic component 1008 according to an embodiment. FIG. 20 is a cross-sectional view taken along line XIV-XIV' of FIG. 18.

Referring to FIGS. 19 and 20, a cover layer 171 including an oxide containing aluminum (Al) may be disposed on the insulating layer 151-7 of the multilayer electronic component 1008 according to an embodiment.

Oxide containing aluminum (Al) may cause diffusion in the portion in contact with the glass, and in the case in which an insulating layer is formed of an oxide containing aluminum (Al) on an external electrode containing glass, continuity of the insulating layer may be deteriorated by diffusion. In detail, in the case in which multilayer electronic components are used in high-temperature environments, since diffusion may occur frequently, in the case in which the insulating layer is formed of an oxide containing aluminum (Al), there is a concern that moisture-resistance reliability cannot be guaranteed in a high-temperature environment.

According to an embodiment of the present disclosure, since the cover layer 171 including an oxide including aluminum (Al) is disposed on the insulating layer 151-7 including an oxide including hafnium (Hf), even when the external electrodes 131 and 132 include glass, the continuity of the cover layer 171 may be prevented from being deteriorated, thereby securing excellent moisture-resistance reliability even in high-temperature environments. In addition, even in the case in which a crack occurs in the cover layer 171, the insulating layer 151-7 may serve to prevent cracks from propagating into the first and second external electrodes 131 and 132 and the body 110, thereby suppressing the occurrence of cracks.

In an embodiment, the oxide containing hafnium (Hf) included in the insulating layer 151-7 may be $HfO_2$, and the oxide including aluminum (Al) included in the cover layer 171 may be $Al_2O_3$.

In an embodiment, in the insulating layer 151-7, the number of moles of hafnium (Hf) atoms relative to the total number of moles of elements other than oxygen atoms may be 0.95 or more, and in the cover layer 171, the number of moles of aluminum (Al) atoms relative to the total number of moles of elements other than oxygen atoms may be 0.95 or more. For example, if elements detected as impurities are excluded, the insulating layer 151-7 may be substantially formed of an oxide containing hafnium (Hf), and the cover layer 171 may be substantially formed of aluminum (Al). Accordingly, the effect of suppressing cracks due to heat shrinkage, radiation cracks caused by metal diffusion, and the like, and the effect of improving moisture resistance reliability may be further improved.

In this case, the component of the cover layer 171 may be analyzed in the same manner as the above-described method of analyzing the component of the insulating layer.

Figure 21:
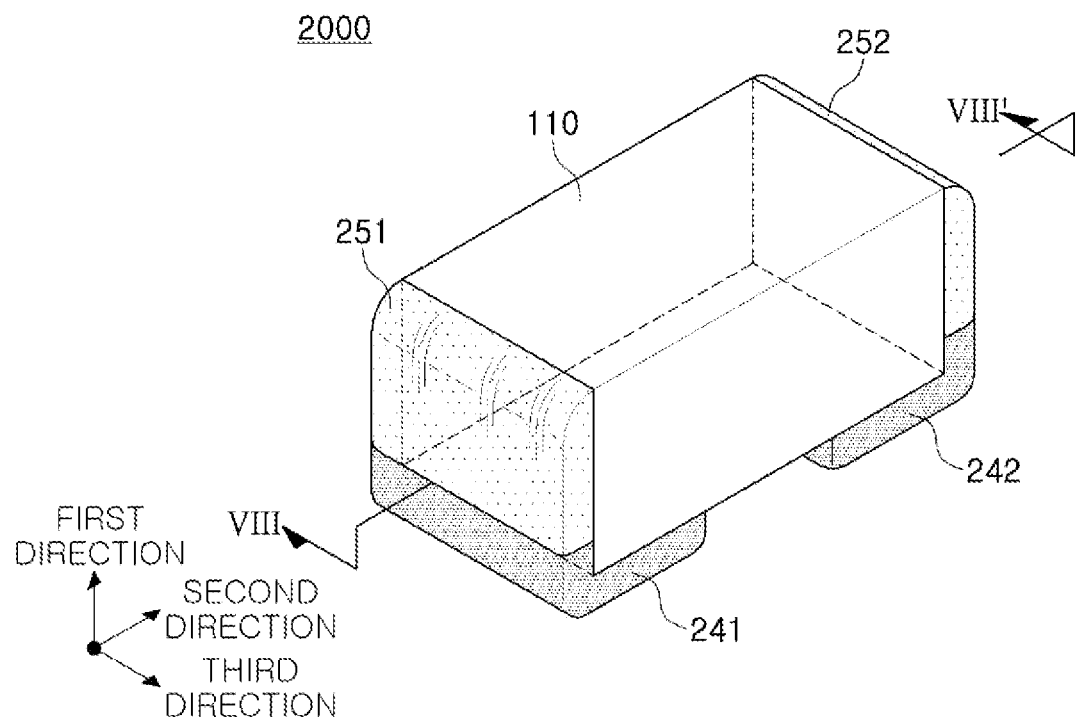
FIG. 21 is a schematic perspective view of a multilayer electronic component according to an embodiment.
Figure 22:
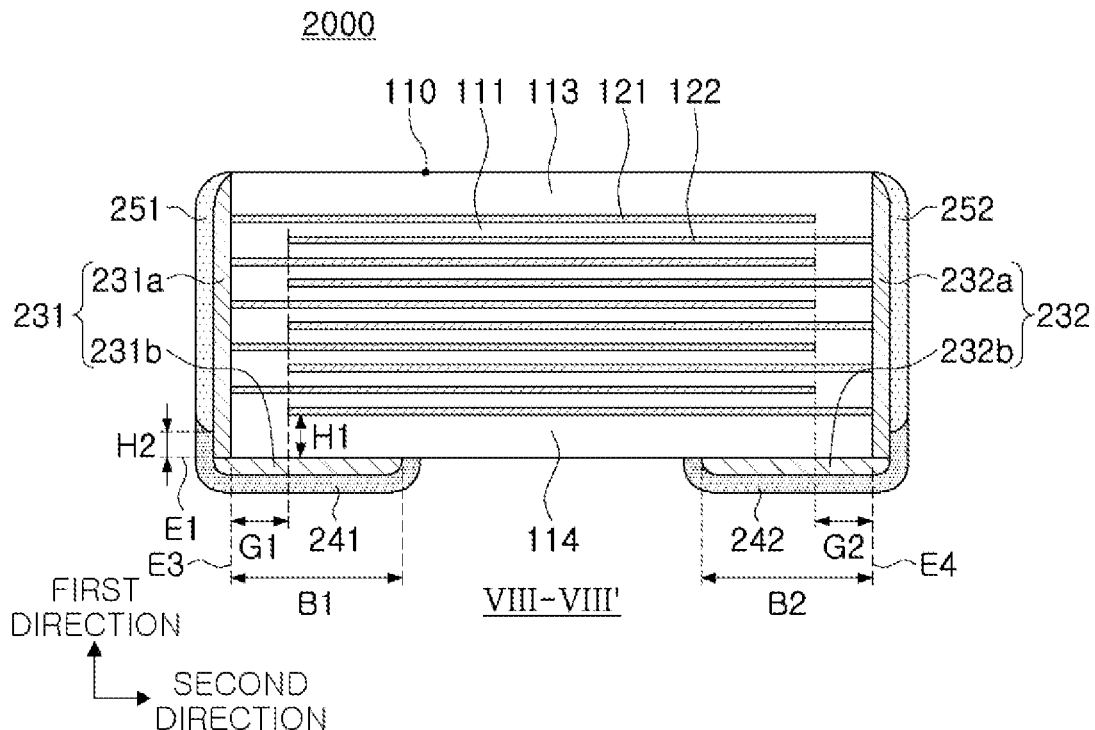
FIG. 22 is a cross-sectional view taken along line VIII-VIII' of FIG. 21.

FIG. 21 is a schematic perspective view of a multilayer electronic component 2000 according to an embodiment. FIG. 22 is a cross-sectional view taken along line VIII-VIII' of FIG. 21.

Hereinafter, the multilayer electronic component 2000 according to an embodiment will be described in detail with reference to FIGS. 21 and 22. However, content overlapping with the above-described content may be omitted to avoid duplicated description.

The multilayer electronic component 2000 according to an embodiment may include a body 110 including a dielectric layer 111, first and second internal electrodes 121 and 122 alternately disposed with the dielectric layer interposed therebetween, and having first and second surfaces 1 and 2 opposing each other in a first direction, third and fourth surfaces 3 and 4 connected to the first and second surfaces and opposing each other in the second direction, and fifth and sixth surfaces 5 and 6 connected to the first to fourth surfaces and opposing each other in the third direction; a first external electrode 231 including a first connection electrode 231a disposed on the third surface and a first band electrode 231b disposed on the first surface and connected to the first connection electrode; a second external electrode 232 including a second connection electrode 232a disposed on the fourth surface and a second band electrode 232b disposed on the first surface and connected to the second connection electrode; a first insulating layer 251 disposed on the first connection electrode; a second insulating layer 252 disposed on the second connection electrode; a first plating layer 241 disposed on the first band electrode; and a second plating layer 242 disposed on the second band electrode. The first and second insulating layers 251 and 252 may include an oxide containing hafnium (Hf).

The first connection electrode 231a may be disposed on the third surface 3 and is connected to the first internal electrode 121, and the second connection electrode 231b may be disposed on the fourth surface 4 to be connected to the second internal electrode 122. In addition, a first insulating layer 251 is disposed on the first connection electrode 231a', and a second insulating layer 252 may be disposed on the second connection electrode 232a.

In the related art, when forming an external electrode, a method of dipping the exposed surface of the internal electrode of the body into the paste using a paste containing a conductive metal is mainly used. However, in the case of the external electrode formed by the dipping method, the thickness of the external electrode in the central portion in the thickness direction may be too thick. In addition, even if it is not a problem of the thickness imbalance of the external electrode according to this dipping method, because the internal electrode is exposed to the third and fourth surfaces of the body, in order to suppress the penetration of moisture and plating solution through the external electrode, the thickness of the external electrodes disposed on the third and fourth surfaces is formed to be a certain level or more.

Meanwhile, in the present disclosure, since the insulating layers 251 and 252 are disposed on the connection electrodes 231a and 232a, even when the thickness of the connection electrodes 231a and 232a on the third and fourth surfaces to which the internal electrodes are exposed is relatively reduced, sufficient reliability may be secured.

The first and second connection electrodes 231a and 232a may have a shape corresponding to the third and fourth surfaces, respectively, and surfaces of the first and second connection electrodes 231a and 232a facing the body 110 may have the same area as the third and fourth surfaces of the body 110, respectively. The first and second connection electrodes 231a and 232a may be disposed within a range that does not deviate from the third and fourth surfaces 3 and 4, respectively. The connection electrodes 231a and 232a may be disposed so as not to extend to the first, second, fifth, and sixth surfaces 1, 2, 5, and 6 of the body 110. In detail, in an embodiment, the first and second connection electrodes 231a and 232a may be disposed to be spaced apart from the fifth and sixth surfaces. Accordingly, while securing sufficient connectivity between the internal electrodes 121 and 122 and the external electrodes 231 and 232, the volume occupied by the external electrodes is significantly reduced. The capacitance of the multilayer electronic component 2000 per unit volume may be increased.

In this regard, the first and second connection electrodes 231a and 232a may be disposed to be spaced apart from the second surface 2. For example, as the external electrodes 231 and 232 are not disposed on the second surface, by further significantly reducing the volume occupied by the external electrodes 231 and 232, the capacitance of the multilayer electronic component 2000 per unit volume may be further increased.

However, the connection electrodes 231a and 232a may extend to an edge of the body 110 and include an edge portion disposed on the edge. For example, in an embodiment, the first connection electrode includes edge portions disposed to extend onto the 1-3 edge and the 2-3 edge, and the second connection electrode may include edge portions extending onto the 1-4 edge and the 2-4 edge.

In addition, the connection electrodes 231a and 232a may have a uniform and thinner thickness than an external electrode formed by a dipping method of the related art.

The method of forming the connection electrodes 231a and 232a does not need to be particularly limited, and for example, the connection electrodes 231a and 232a may be formed by transferring a sheet including a conductive metal and an organic material such as a binder to the third and fourth surfaces, but the present disclosure is not limited thereto. For example, the connection electrodes 231a and 232a may be formed by plating the third and fourth surfaces with a conductive metal. For example, the connection electrodes 231a and 232a may be a firing layer formed by firing a conductive metal or a plating layer.

The thickness of the connection electrodes 231a and 232a is not particularly limited, but may be, for example, 2 to 7 In this case, the thickness of the connection electrodes 231a and 232a may indicate a maximum thickness, and may indicate the size of the connection electrodes 231a and 232a in the second direction.

In an embodiment, the first and second connection electrodes 231a and 232a may include the same metal and glass as those included in the internal electrodes 121 and 122. As the first and second connection electrodes 231a and 232a include the same metal as the metal included in the internal electrodes 121 and 122, electrical connectivity with the internal electrodes 121 and 122 may be more improved, and as the first and second connection electrodes 231a and 232a include glass, bonding force with the body 110 and/or the insulating layers 251 and 252 may be improved. In this case, the same metal as the metal included in the internal electrodes 121 and 122 may be Ni.

The first and second insulating layers 251 and 252 may be disposed on the first and second connection electrodes 231*a* and 232*a*, respectively, and serve to prevent a plating layer from being formed on the first and second connection electrodes 231*a* and 232*a*. In addition, the first and second insulating layers 251 and 252 may serve to significantly reduce penetration of moisture or plating solution from the outside by improving sealing characteristics.

The first and second insulating layers 251 and 252 may include an oxide containing hafnium (Hf). Therefore, the moisture resistance reliability may be further improved, and cracks caused by heat shrinkage and radiation cracks caused by metal diffusion may be suppressed.

The first and second band electrodes 231*b* and 232*b* may be disposed on the first surface 1 of the body 110. The first and second band electrodes 231*b* and 232*b* are in contact with the first and second connection electrodes 231*a* and 232*a*, respectively, to be electrically connected to the first and second internal electrodes 121 and 122.

An external electrode formed by the related art dipping method is thickly formed on the third and fourth surfaces and partially extended to the first, second, fifth and sixth surfaces, thereby causing a problem in that it is difficult to secure a high effective volume ratio.

Meanwhile, according to an embodiment of the present disclosure, the first and second connection electrodes 231*a* and 232*a* are disposed on the surface to which the internal electrodes are exposed, and the first and second band electrodes 231*b* and 232*b* are disposed on the surface to be mounted on the substrate, thereby securing a relatively high effective volume ratio.

On the other hand, when the internal electrodes 121 and 122 are stacked in the first direction, the multilayer electronic component 2000 may be horizontally mounted on a substrate such that the internal electrodes 121 and 122 are parallel to the mounting surface. However, the present disclosure is not limited to the case of horizontal mounting, and when the internal electrodes 121 and 122 are stacked in the third direction, the multilayer electronic component may be vertically mounted on the substrate so that the internal electrodes 121 and 122 are perpendicular to the mounting surface.

The first and second band electrodes 231*b* and 232*b* may be formed of any material as long as they have electrical conductivity, such as metal, and a detailed material may be determined in consideration of electrical characteristics, structural stability, and the like. For example, the first and second band electrodes 231 and 232*b* may be firing electrodes including a conductive metal and glass, and may be formed using a method of applying a paste containing a conductive metal and glass to the first surface of the body, but the present disclosure is not limited thereto. For example, the first and second band electrodes 231 and 232*b* may be plating layers in which a conductive metal is plated on the first surface of the body.

As a conductive metal included in the first and second band electrodes 231*b* and 232*b*, a material having excellent electrical conductivity may be used and is not particularly limited. For example, the conductive metal may be at least one of nickel (Ni), copper (Cu), and alloys thereof, and may include the same metal as the metal included in the internal electrodes 121 and 122.

On the other hand, in an embodiment, the first external electrode 231 further includes a third band electrode (not illustrated) disposed on the second surface 2 and connected to the first connection electrode 231*a*, and the second external electrode 232 may further include a fourth band electrode (not illustrated) disposed on the second surface 2 and connected to the second connection electrode 232*a*.

In an embodiment, when the distance from an extension line E3 of the third surface to the end of the first band electrode 231*b* is B1, the distance from the extension line E4 of the fourth surface to the end of the second band electrode 232*b* is B2, the distance from the extension line of the third surface to the end of the third band electrode (not illustrated) is B3, the distance from the extension line of the fourth surface to the end of the fourth band electrode (not illustrated) is B4, the second direction average size of the region in which the third surface and the second internal electrode 122 are spaced apart is G1, and the average size in the second direction of the region in which the fourth surface and the first internal electrode 121 are spaced apart is G2; B1≥G1, B3<G1, B2≥G2 and B4<G2 may be satisfied. Accordingly, the volume occupied by the external electrode is significantly reduced to increase the capacitance of the multilayer electronic component 2000 per unit volume, and simultaneously, the area in contact with the solder in mounting may be increased, thereby improving the bonding strength.

However, it is not intended to limit the present disclosure to B1≥G1, B3≤G1, B2≥G2 and B4≤G2, and the case in which B1≥G1, B3≥G1, B2≥G2 and B4≥G2 are satisfied may also be included in an embodiment of the present disclosure. Accordingly, in an embodiment, when the distance from the extension line E3 of the third surface to the end of the first band electrode 231*b* is B1, the distance from the extension line E4 of the fourth surface to the end of the second band electrode 232*b* is B2, the distance from the extension line of the third surface to the end of the third band electrode (not illustrated) is B3, the distance from the extension line of the fourth surface to the end of the fourth band electrode (not illustrated) is B4, the second direction average size of the region in which the third surface and the second internal electrode 122 are spaced apart is G1, and the average size in the second direction of the region in which the fourth surface and the first internal electrode 121 are spaced apart is G2; B1≥G1, B3≥G1, B2≥G2 and B4≥G2 may be satisfied. Accordingly, any one of the first and second surfaces may be used as the mounting surface, and thus the mounting convenience may be improved.

The first and second plating layers 241 and 242 may be disposed on the first and second band electrodes 231*b* and 232*b*. The first and second plating layers 241 and 242 serve to improve mounting characteristics. The types of the first and second plating layers 241 and 242 are not particularly limited, and may be a plating layer including at least one of Ni, Sn, Pd, and alloys thereof, and may be formed of a plurality of layers.

For a more detailed example of the first and second plating layers 241 and 242, the first and second plating layers 241 and 242 may be a Ni plating layer or a Sn plating layer, and the Ni plating layer and the Sn plating layer may be sequentially formed on the first and second band electrodes 231*b* and 232*b*.

In an embodiment, the first and second plating layers 241 and 242 may extend to partially cover the first and second connection electrodes 231*a* and 232*a*, respectively.

When the average distance of the first direction from the first surface 1 to the internal electrode disposed closest to the first surface 1 among the first and second internal electrodes 121 and 122 is H1 is, and the average distance in the first direction from the extension line of the first surface 1 to the ends of the first and second plating layers 241 and 242 disposed on the first and second connection electrodes 231*a* and 232*a* is H2; H1>H2 may be satisfied. Accordingly, the penetration of the plating solution into the internal electrode during the plating process may be suppressed, thereby improving reliability.

In an embodiment, the first and second insulating layers 251 and 252 are disposed to be in direct contact with the first and second connection electrodes 231*a* and 232*a*, respectively, and the first and second connection electrodes 231*a* and 232*a* may include a conductive metal and glass. Accordingly, the plating layers 241 and 242 may not be disposed on the regions in which the insulating layers 251 and 252 are disposed among the external surfaces of the first and second connection electrodes 231*a* and 232*a*, and erosion of the external electrode by the plating solution may be effectively prevented.

In an embodiment, the first and second insulating layers 251 and 252 may be disposed to be in direct contact with the first and second connection electrodes 231*a* and 232*a*, respectively, and the first and second connection electrodes 231*a* and 232*a* may include a conductive metal and a resin. Accordingly, in the region in which the insulating layers 251 and 252 are disposed in the external surfaces of the first and second connection electrodes 231*a* and 232*a*, since the plating layers 241 and 242 may not be disposed, external electrode erosion by the plating solution may be effectively suppressed.

In an embodiment, the first plating layer 241 is disposed to cover the end of the first insulating layer 251 disposed on the first external electrode 231, and the second plating layer 242 may be disposed to cover an end of the second insulating layer 252 disposed on the second external electrode 232. Accordingly, the reliability of a multilayer electronic component 3000 may be improved by strengthening the bonding force between the insulating layers 251 and 252 and the plating layers 241 and 242. In addition, by first forming the first and second insulating layers 251 and 252 before forming the plating layers 241 and 242 on the external electrodes 231 and 232, penetration of the plating solution in the process of forming the plating layer may be more reliably suppressed. As the insulating layer is formed before the plating layer, the plating layers 241 and 242 may have a shape covering the ends of the insulating layers 251 and 252.

In an embodiment, the first insulating layer 251 is disposed to cover the end of the first plating layer 241 disposed on the first external electrode 231, and the second insulating layer 252 may be disposed to cover an end of the second plating layer 242 disposed on the second external electrode 232. Accordingly, the reliability of the multilayer electronic component 3000 may be improved by strengthening the bonding force between the insulating layer 251 and the plating layers 241 and 242.

Figure 23:
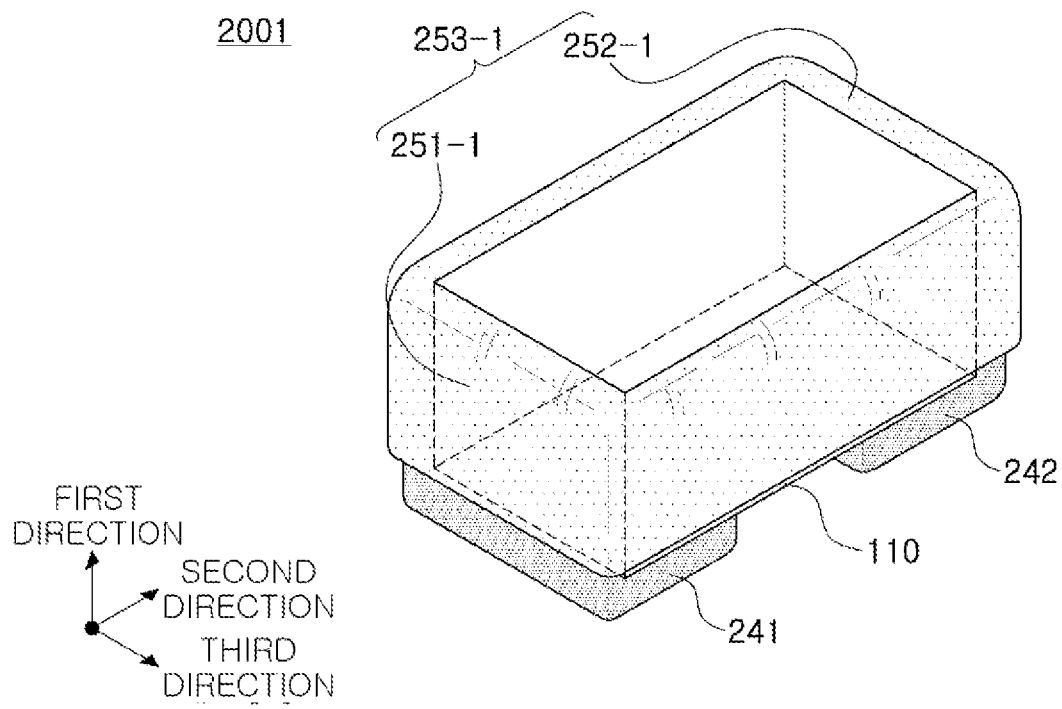
FIG. 23 illustrates a modified example of FIG. 21.

FIG. 23 illustrates a modified example of FIG. 21. Referring to FIG. 23, a modified example (2001) of the multilayer electronic component 2000 according to an embodiment is illustrated. First and second insulating layers 251-1 and 252-1 extend to the fifth and sixth surfaces 5 and 6 and are connected to each other, thereby being connected as one insulating layer 253-1. In this case, the connected first and second insulating layer 253-1 may be disposed to cover portions of the fifth and sixth surfaces.

Figure 24:
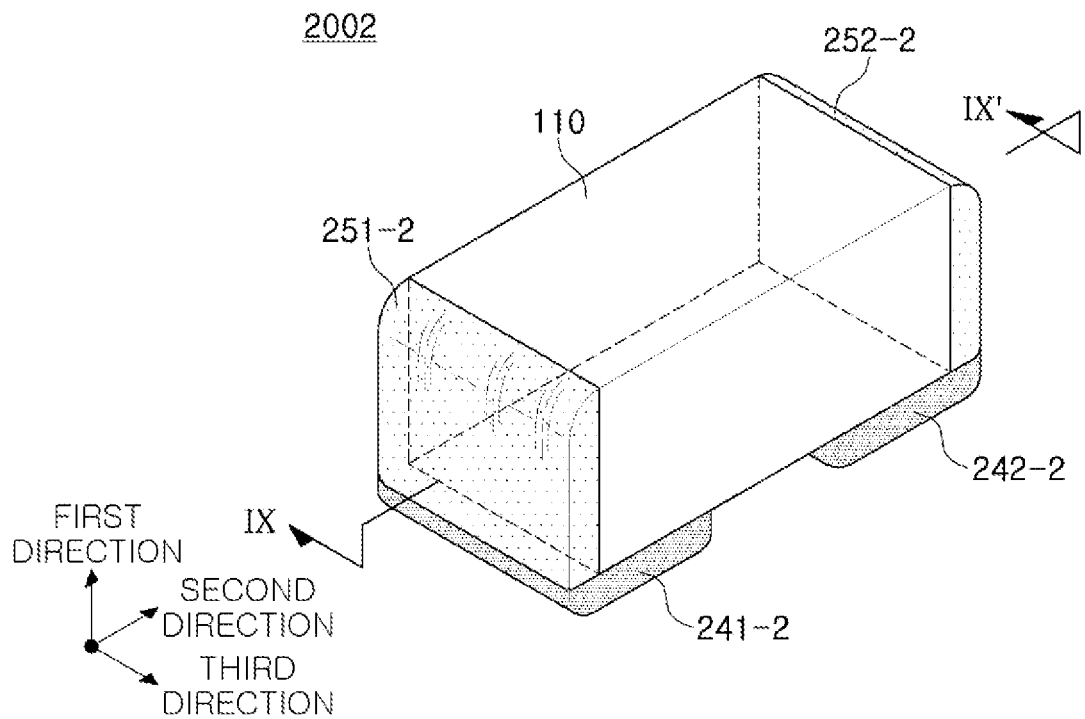
FIG. 24 is a schematic perspective view of a multilayer electronic component according to an embodiment.
Figure 25:
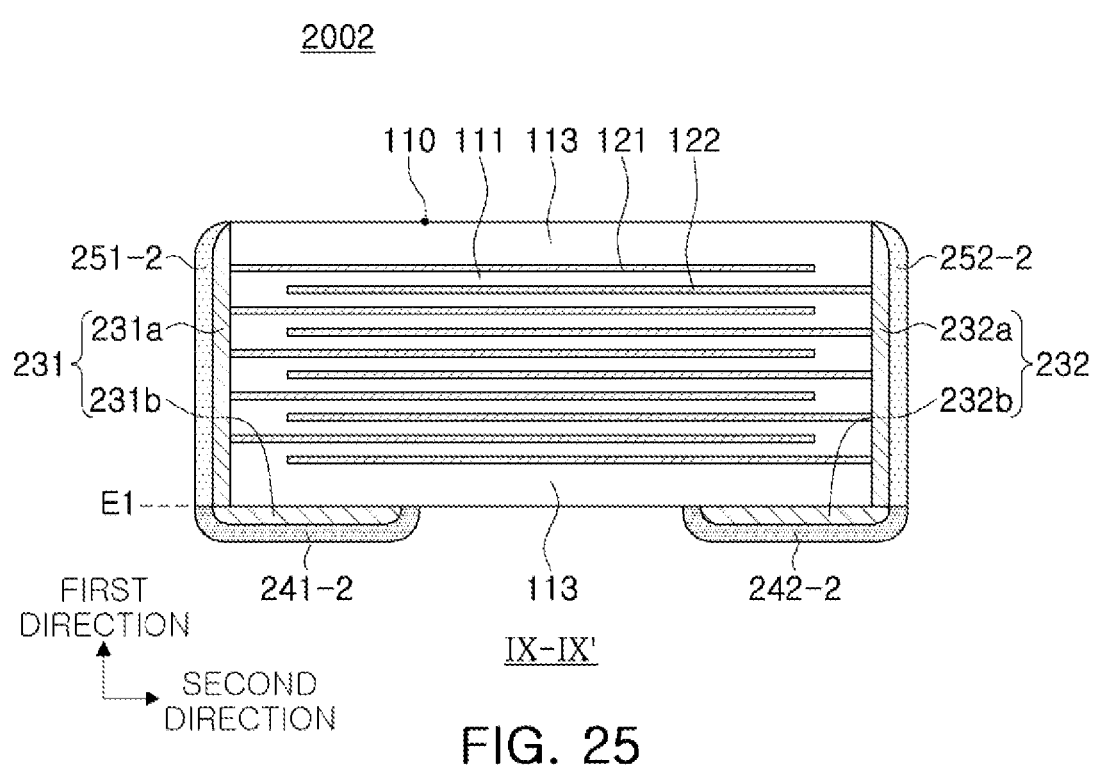
FIG. 25 is a cross-sectional view taken along line IX-IX' of FIG. 24.

FIG. 24 is a schematic perspective view of a multilayer electronic component 2002 according to an embodiment. FIG. 25 is a cross-sectional view taken along line IX-IX' of FIG. 24.

Referring to FIGS. 24 and 25, in a multilayer electronic component 2002 according to an embodiment, first and second plating layers 241-2 and 242-2 may be disposed below an extension line of the first surface. Accordingly, the height of the solder may be significantly reduced during mounting, and the mounting space may be significantly reduced.

In addition, the first and second insulating layers 251-2 and 252-2 may extend below an extension line of the first surface and be disposed to contact the first and second plating layers 241-2 and 242-2.

Figure 26:
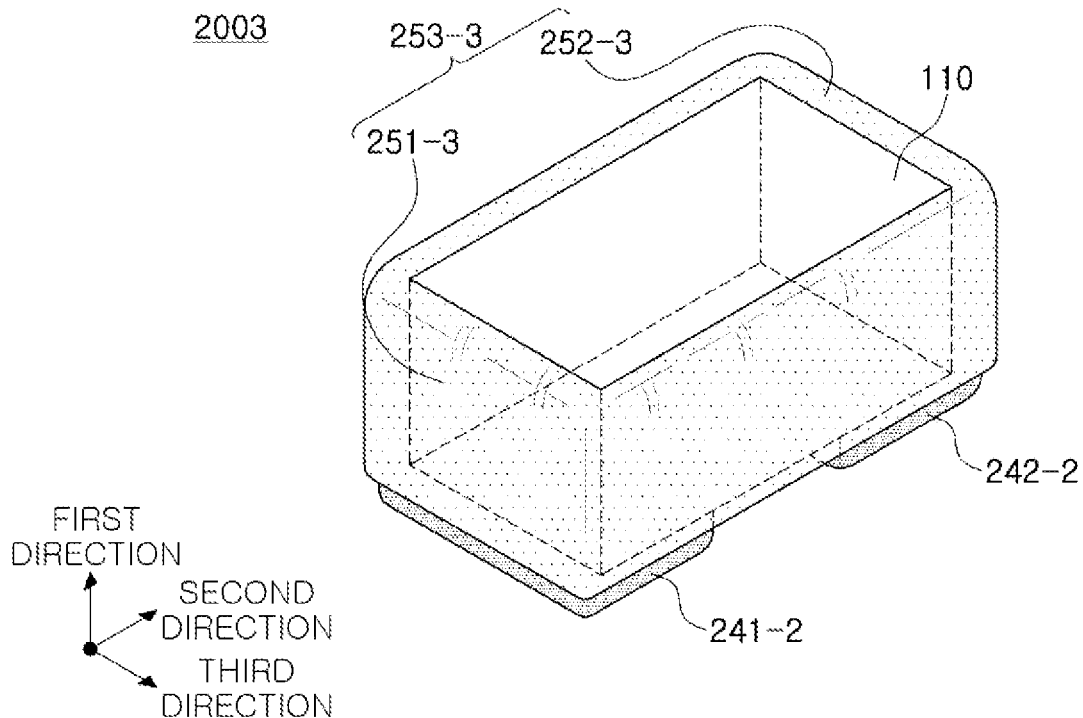
FIG. 26 illustrates a modified example of FIG. 24.

FIG. 26 illustrates a modified example of FIG. 24. Referring to FIG. 26, a modified example (2003) of the multilayer electronic component 2002 according to an embodiment is illustrated. First and second insulating layers 251-3 and 252-3 extend to the fifth and sixth surfaces 5 and 6 and are connected to each other, thereby being connected as one insulating layer 253-3. In this case, the connected first and second insulating layer 253-3 may be disposed to cover the entirety of the fifth and sixth surfaces.

Figure 27:
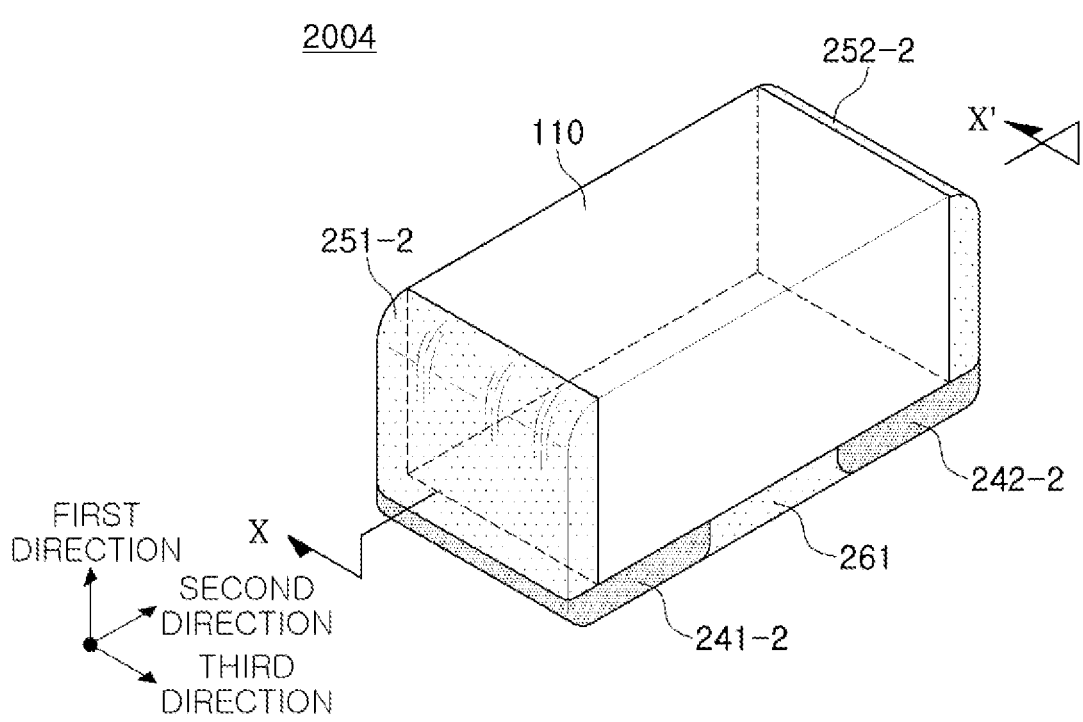
FIG. 27 is a schematic perspective view of a multilayer electronic component according to an embodiment.
Figure 28:
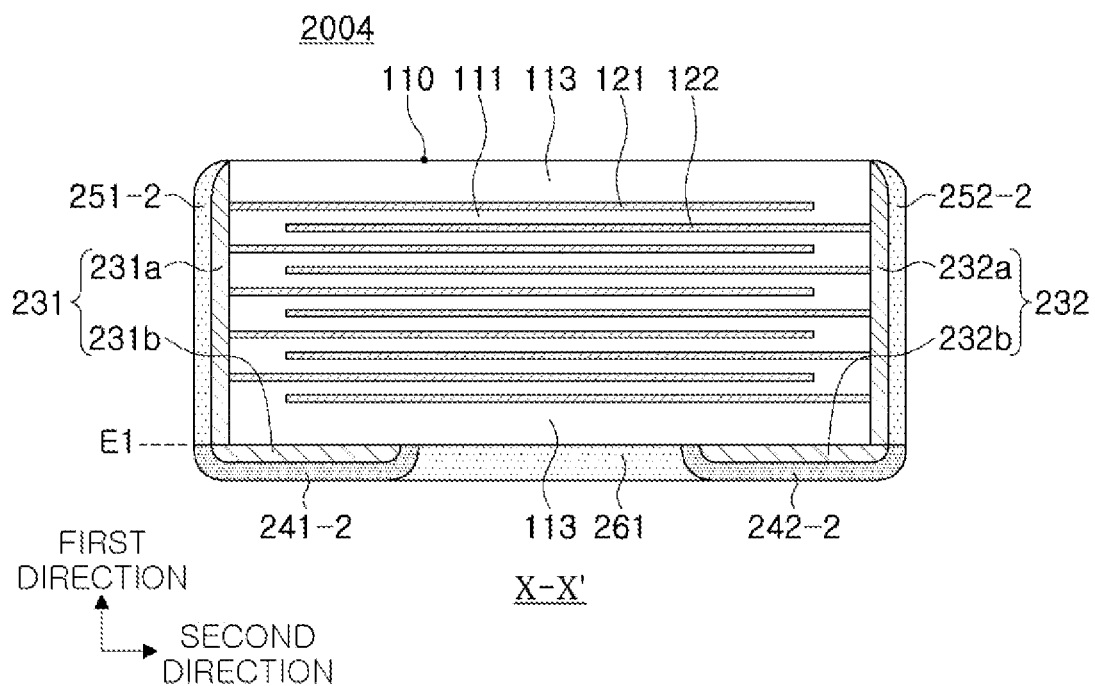
FIG. 28 is a cross-sectional view taken along line X-X' of FIG. 27.

FIG. 27 schematically illustrates a multilayer electronic component 2004 according to an embodiment. FIG. 28 is a cross-sectional view taken along line X-X' of FIG. 27.

Referring to FIGS. 27 and 28, a multilayer electronic component 2004 according to an embodiment may further include an additional insulating layer 261 disposed on the first surface 1 and disposed between the first band electrode 231*b* and the second band electrode 232*b*. Accordingly, leakage current that may occur between the first band electrode 231*b* and the second band electrode 232*b* under a high voltage current may be prevented.

The type of the additional insulating layer 261 does not need to be particularly limited. For example, the additional insulating layer 261 may include an oxide containing hafnium (Hf), like the first and second insulating layers 251-2 and 252-2. However, it is not necessary to limit the additional insulating layer 261 and the first and second insulating layers 251-2 and 252-2 to the same material, and may be formed to have different materials. For example, at least one selected from epoxy resin, acrylic resin, ethyl cellulose, and the like may be included or glass may be included.

Figure 29:
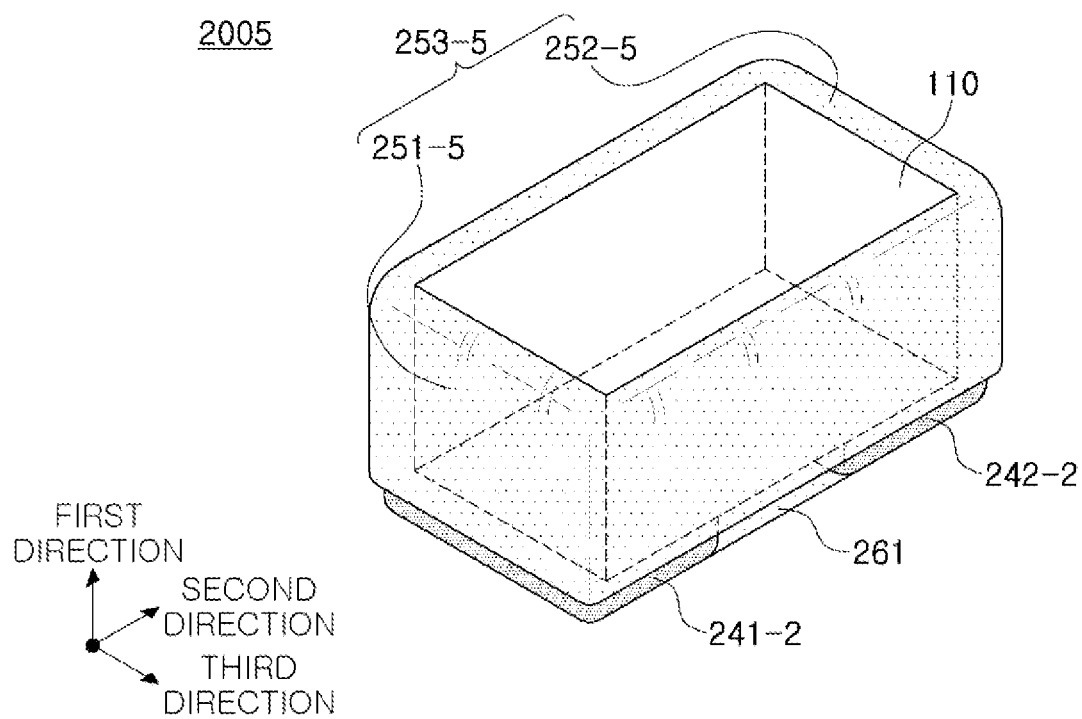
FIG. 29 illustrates a modified example of FIG. 27.

FIG. 29 illustrates a modified example of FIG. 27. Referring to FIG. 29, a modified example (2005) of the multilayer electronic component 2004 according to an embodiment is illustrated. First and second insulating layers 251-5 and 252-5 extend to the fifth and sixth surfaces 5 and 6 and are connected to each other to be connected as one insulating layer 253-5.

Figure 30:
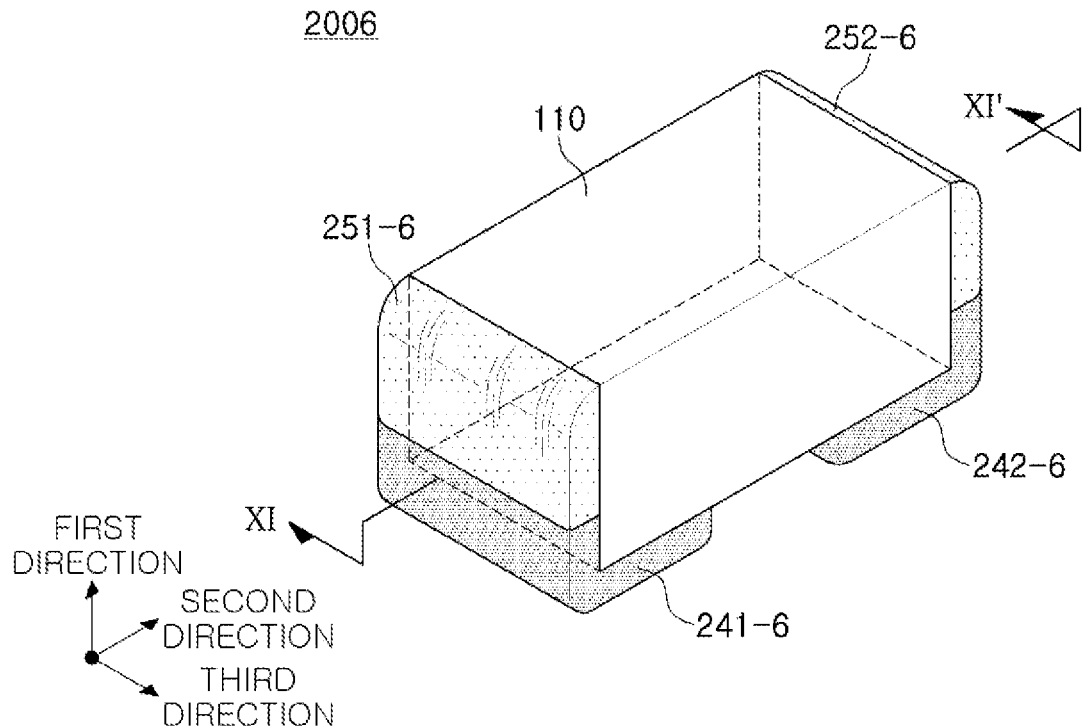
FIG. 30 is a schematic perspective view of a multilayer electronic component according to an embodiment.
Figure 31:
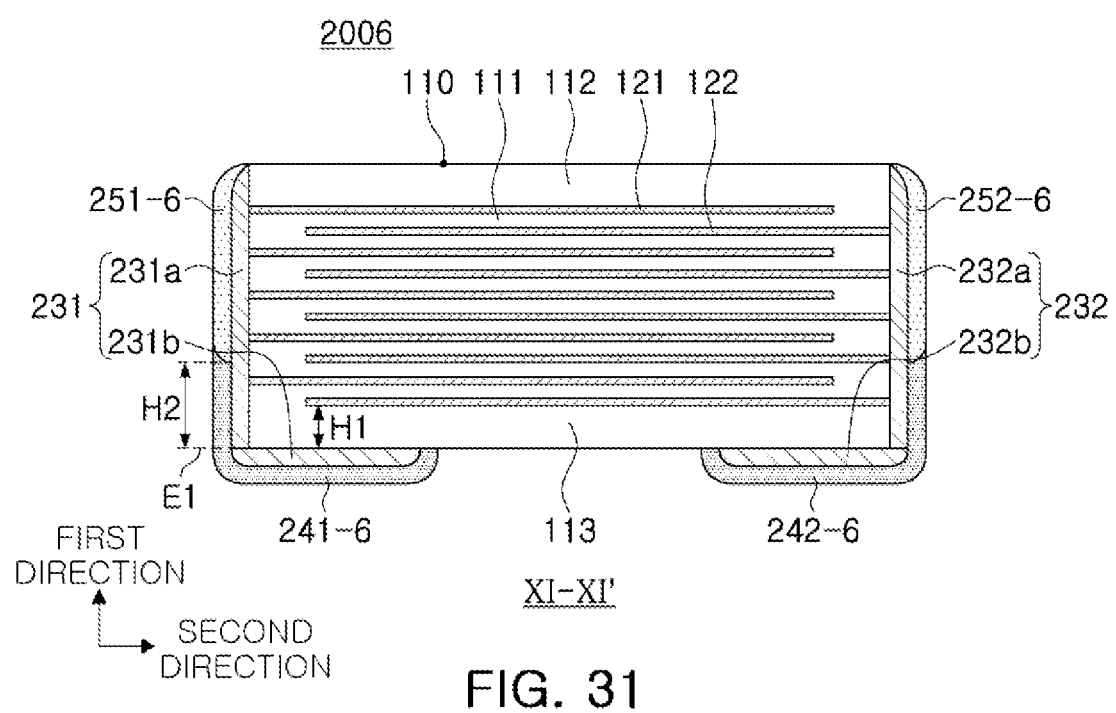
FIG. 31 is a cross-sectional view taken along line XI-XI' of FIG. 30.

FIG. 30 is a schematic perspective view of a multilayer electronic component 2006 according to an embodiment. FIG. 31 is a cross-sectional view taken along line XI-XI' of FIG.

Referring to FIGS. 30 and 31, the multilayer electronic component 2006 according to an embodiment includes a first insulating layer 251-6 disposed on the first connection electrode 231*a*, and a second insulating layer 252-6 disposed on the second connection electrode 232*a*. When H1 is the average distance in the first direction from the first surface 1 to the internal electrode disposed closest to the first surface 1 among the first and second internal electrodes 121 and 122, and an average distance in the first direction from the extension line of the first surface 1 to the ends of the first and second plating layers 241-6 and 242-6 disposed on the first and second connection electrodes 231*a* and 232*a* is H2; H1<H2 may be satisfied. Accordingly, by increasing the area in contact with the solder during mounting, the fixing strength may be improved.

In detail, when the average size of the body 110 in the first direction is T, H2<T/2 may be satisfied. For example, H1<H2<T/2 may be satisfied. If H2 is T/2 or more, there is a possibility that the moisture-resistance reliability improvement effect by an insulating layer may deteriorate.

Figure 32:
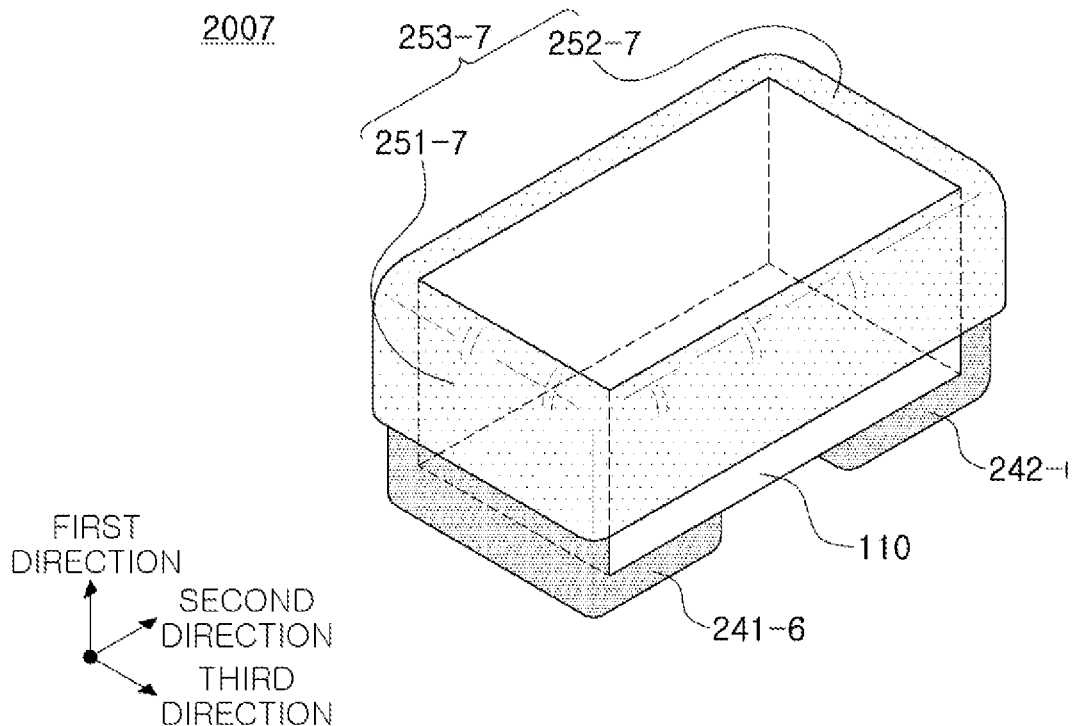
FIG. 32 illustrates a modified example of FIG. 30.

FIG. 32 illustrates a modified example of FIG. 30. Referring to FIG. 32, a modified example 2007 of the multilayer electronic component 2006 according to an embodiment is illustrated. First and second insulating layers 251-7 and 252-7 extend to the fifth and sixth surfaces 5 and 6 and are connected to each other to be connected as one insulating layer 253-7.

Figure 33:
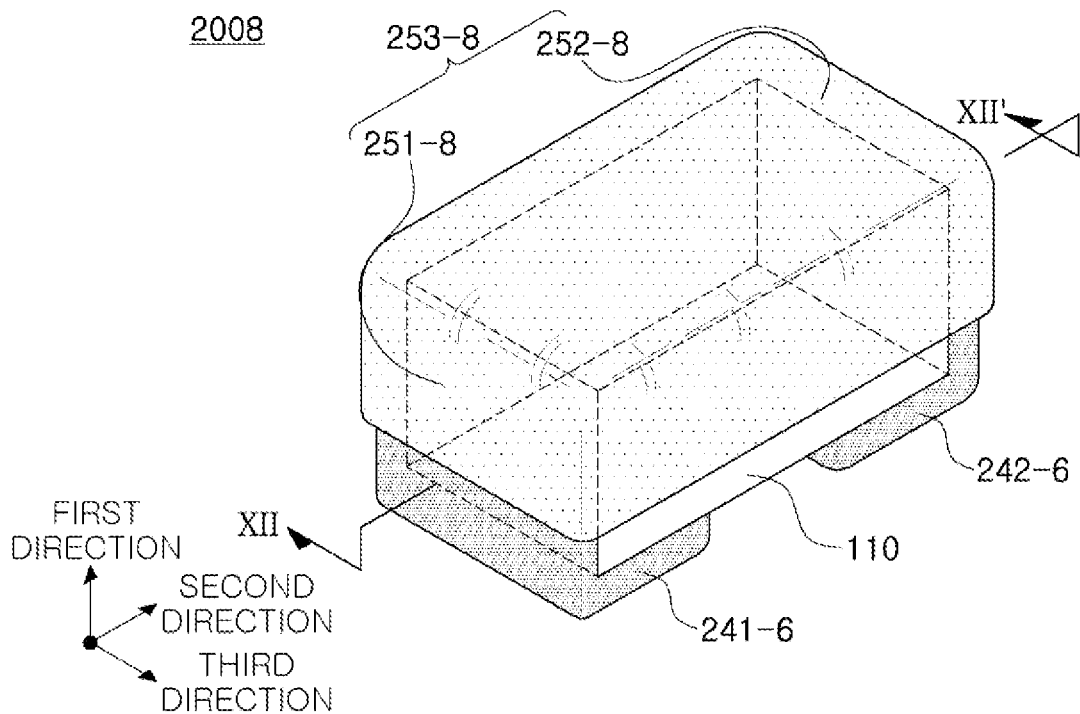
FIG. 33 is a schematic perspective view of a multilayer electronic component according to an embodiment.
Figure 34:
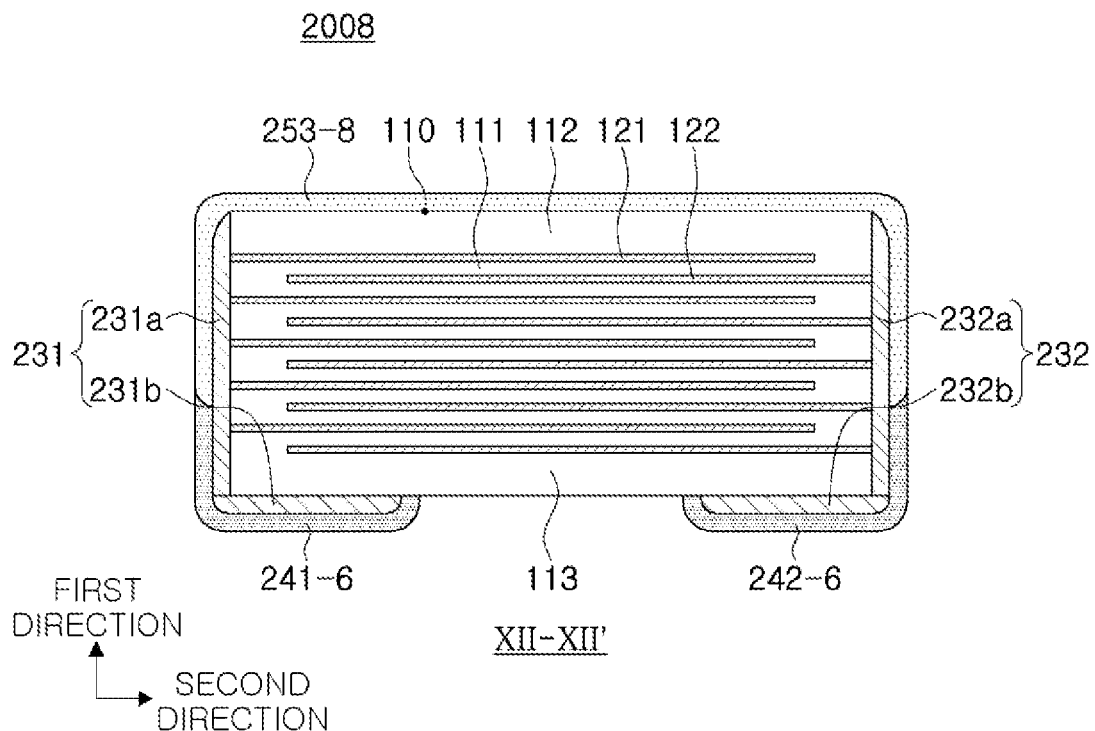
FIG. 34 is a cross-sectional view taken along line XII-XII' of FIG. 33.

FIG. 33 is a schematic perspective view of a multilayer electronic component 2008 according to an embodiment. FIG. 34 is a cross-sectional view taken along line XII-XII' of FIG. 33.

Figure 35:
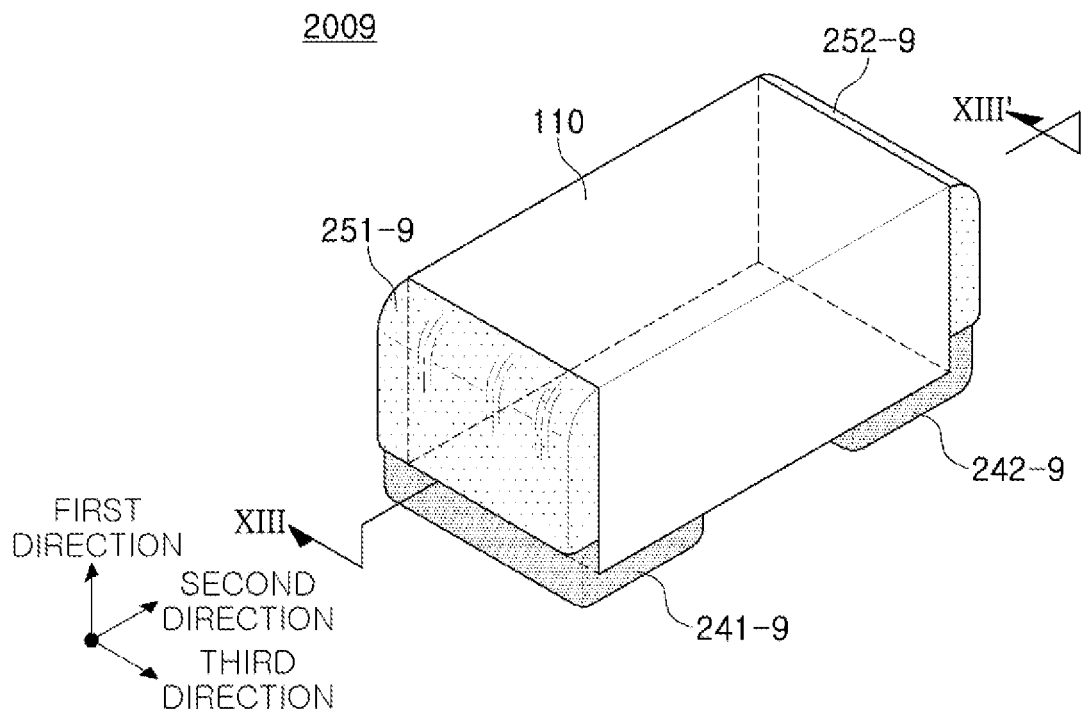
FIG. 35 is a schematic perspective view of a multilayer electronic component according to an embodiment.

Referring to FIGS. 33 and 34, in the multilayer electronic component 2008 according to an embodiment, first and second insulating layers 251-8 and 252-8 may extend to the second, fifth and sixth surfaces 2, 5 and 6 and may be connected to each other to be connected as one insulating layer 253-8. As illustrated in FIG. 35, the multilayer electronic component 2008 may have a form in which the insulating layer 253-8 covers the entirety of the second surface and only partially covers the fifth and sixth surfaces.

Figure 36:
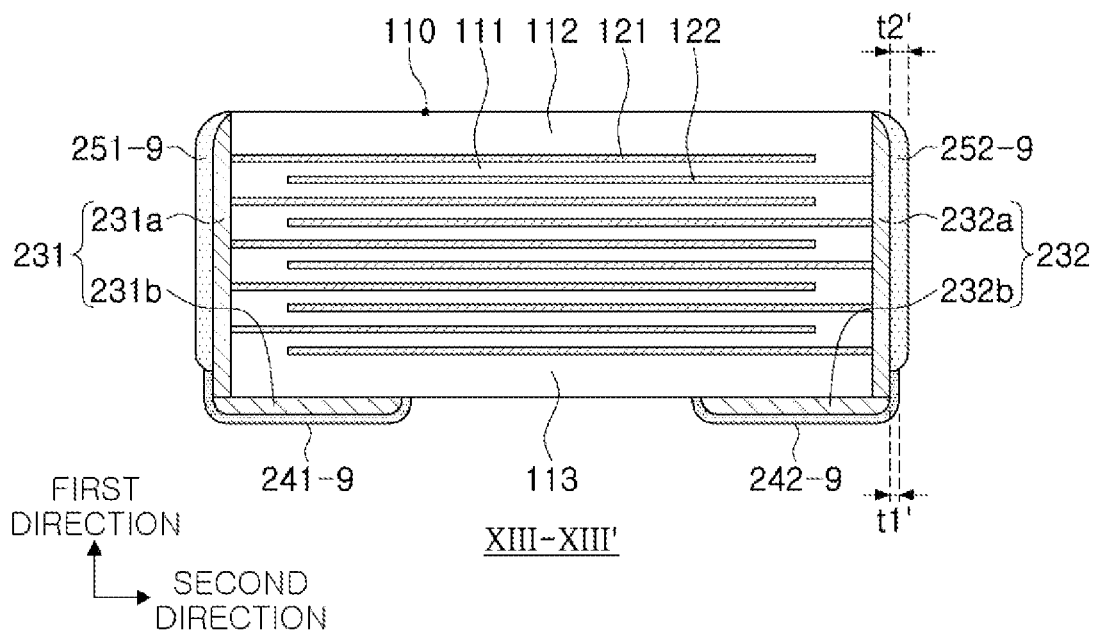
FIG. 36 is a cross-sectional view taken along line XIII-XIII' of FIG. 35.

FIG. 35 is a schematic perspective view of a multilayer electronic component 2009 according to an embodiment. FIG. 36 is a cross-sectional view taken along line XIII-XIII' of FIG. 35.

Figure 37:
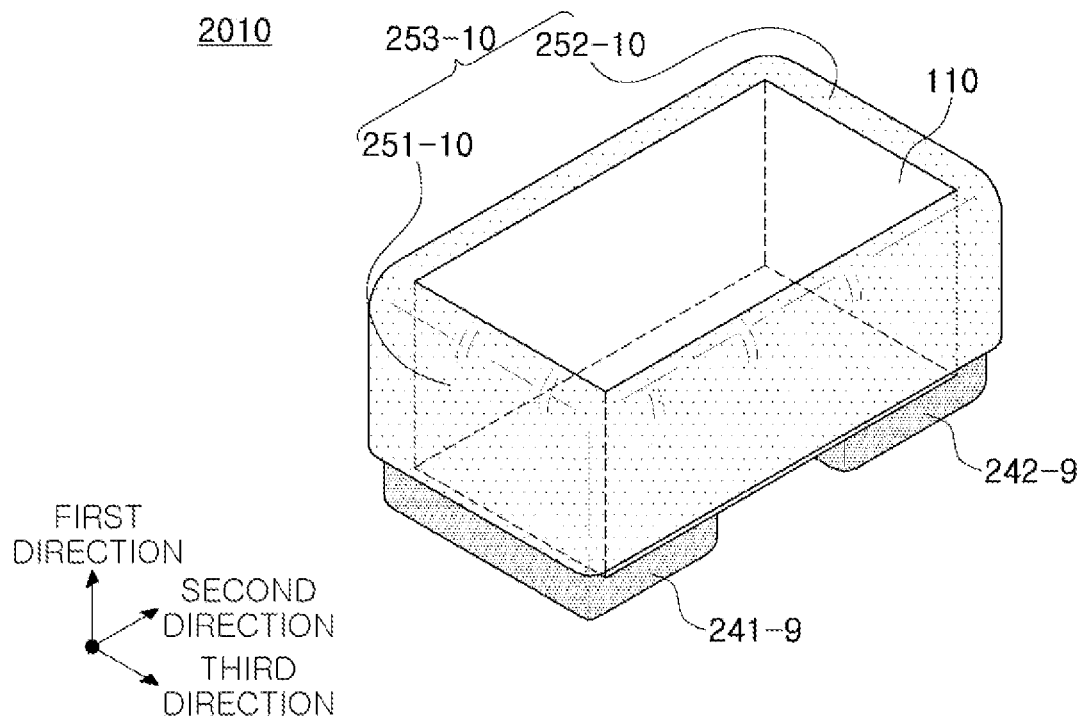
FIG. 37 illustrates a modified example of FIG. 35.
Figure 40:
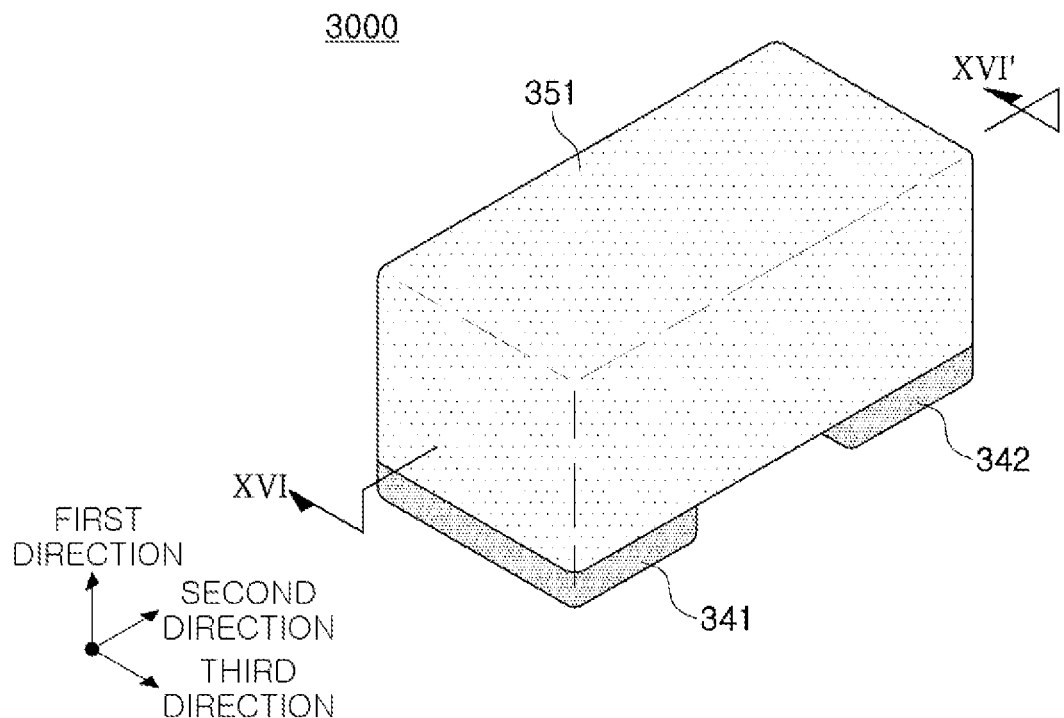
FIG. 40 is a schematic perspective view of a multilayer electronic component according to an embodiment.

Referring to FIGS. 37 and 40, an average thickness t1 of first and second plating layers 241-9 and 242-9 of the multilayer electronic component 2009 according to an embodiment may be less than an average thickness t2 of first and second insulating layers 251-9 and 252-9.

According to an embodiment, as the average thickness t1 of the first and second plating layers 241-9 and 242-9 is less than the average thickness t2 of the first and second insulating layers 251-9 and 252-9, the contact area between the plating layer and the insulating layer may be reduced. Accordingly, the occurrence of delamination is suppressed and the bonding strength of the multilayer electronic component 2009 to the substrate 180 may be improved.

The average thickness t1 of the first and second plating layers 241-9 and 242-9 may be an average value of thicknesses measured at equal intervals at five points on the first and second plating layers 241-9 and 242-9 disposed on the first and second connection electrodes 231a and 232a, respectively, or the first and second band electrodes 231b and 232b, respectively, and the average thickness t2 of the insulating layers 251-9 and 252-9 may be an average of thicknesses measured at five equally spaced points on the insulating layers 251-9 and 252-9 disposed on the first and second connection electrodes 231a and 232a, respectively. For example, the measurements may be taken by scanning the cross-section of the body 110 using a scanning electron microscope (SEM). Other methods and/or tools appreciated by one of ordinary skill in the art, even if not described in the present disclosure, may also be used.

FIG. 37 illustrates a modified example of FIG. 35. Referring to FIG. 37, a modified example 2010 of the multilayer electronic component 2009 according to an embodiment is illustrated. First and second insulating layers 251-10 and 252-10 extend to the fifth and sixth surfaces 5 and 6 and are connected to each other to be connected as one insulating layer 253-10.

Figure 38:
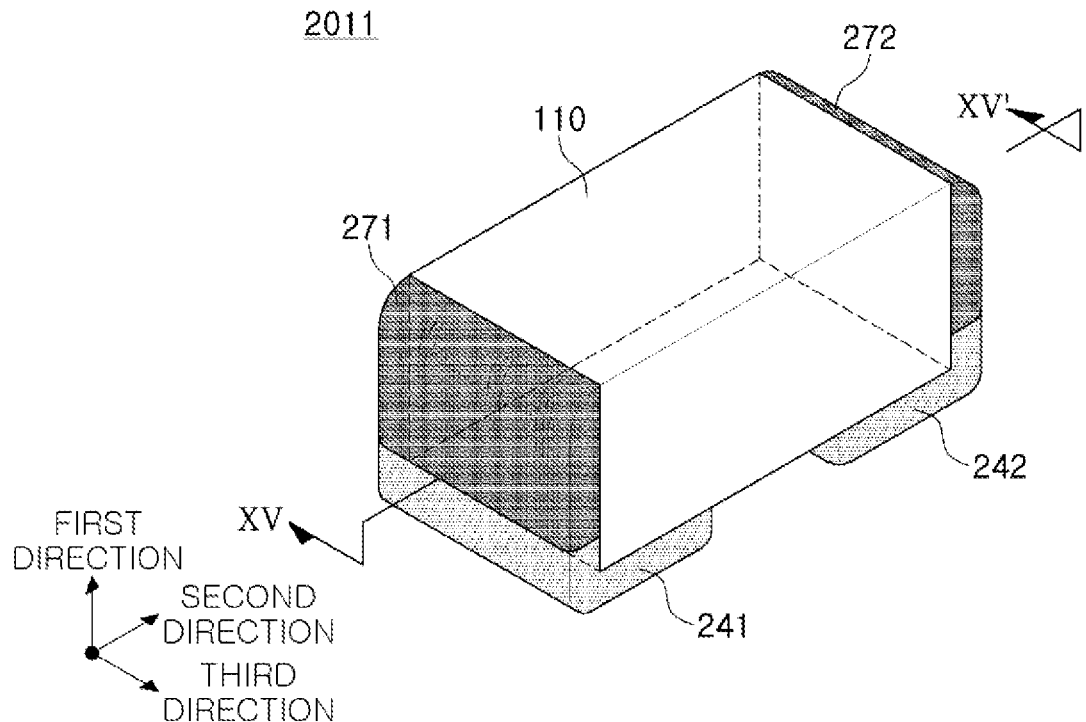
FIG. 38 is a schematic perspective view of a multilayer electronic component according to an embodiment.
Figure 39:
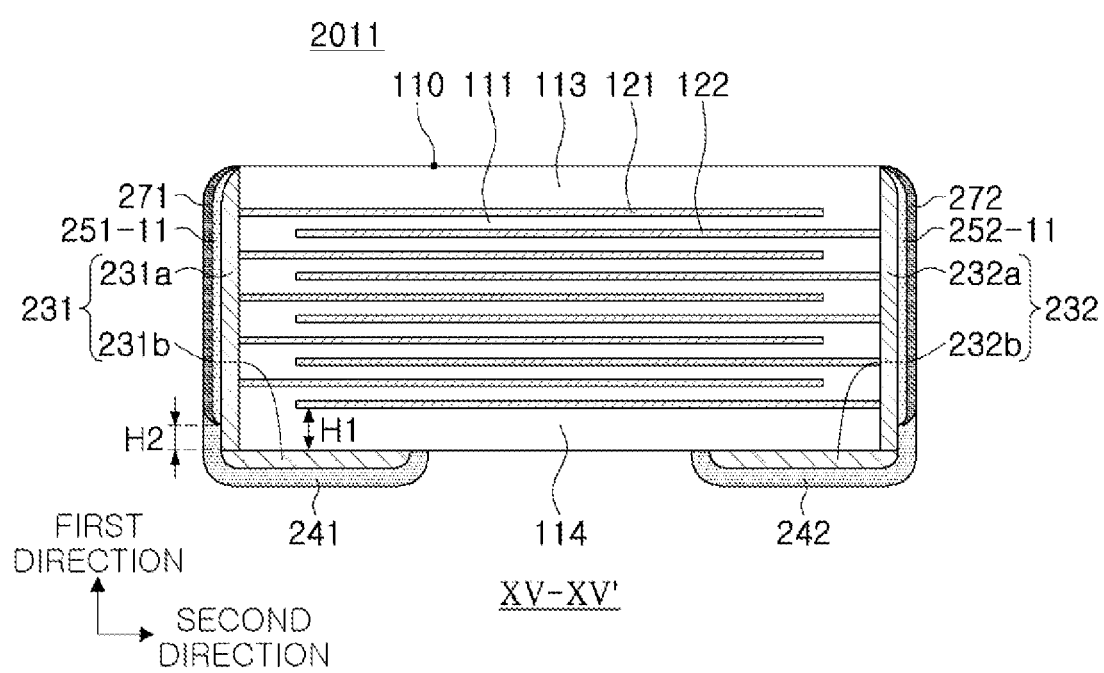
FIG. 39 is a cross-sectional view taken along line XV-XV' of FIG. 38.

FIG. 38 is a schematic perspective view of a multilayer electronic component 2011 according to an embodiment. FIG. 39 is a cross-sectional view taken along line XV-XV' of FIG. 38.

Referring to FIGS. 38 and 39, on first and second insulating layers 251-11 and 252-11 of the multilayer electronic component 2011 according to an embodiment, first and second cover layers 271 and 272 each including an insulating material may be disposed.

The first and second cover layers 271 and 272 including an oxide including aluminum (Al) are disposed on the first and second insulating layers 251-11 and 252-11 including an oxide including hafnium (Hf), and thus, even when the first and second external electrodes 231 and 232 include glass, the continuity of the first and second cover layers 271 and 272 may be prevented from being deteriorated, and excellent moisture-resistance reliability may be secured even in high-temperature environments. In addition, even in the case in which cracks occur in the first and second cover layers 271 and 272, the first and second insulating layers 251-11 and 252-11 may serve to prevent cracks from propagating into the first and second external electrodes 231 and 232 and the body 110, thereby suppressing occurrence of cracks.

In an embodiment, the oxide containing hafnium (Hf), included in the first and second insulating layers 251-11 and 252-11, may be $HfO_2$, and the oxide including aluminum (Al), included in the first and second cover layers 271 and 272, may be $Al_2O_3$.

In an embodiment, in the first and second insulating layers 251-11 and 252-11, the number of moles of hafnium (Hf) atoms relative to the total number of moles of elements other than oxygen atoms may be 0.95 or more, and in the first and second cover layers 271 and 272, the number of moles of aluminum (Al) atoms relative to the total number of moles of elements other than oxygen atoms may be 0.95 or more. For example, if elements detected as impurities are excluded, the first and second insulating layers 251-11 and 252-11 may be substantially formed of an oxide containing hafnium (Hf), and the first and second cover layers 271 and 272 may be substantially formed of aluminum (Al). Accordingly, the effect of suppressing cracks due to heat shrinkage, radiation cracks caused by metal diffusion, and the like and the effect of improving moisture resistance reliability may be further improved.

In this case, the components of the first and second cover layers 271 and 272 may be analyzed in the same manner as the above-described method of analyzing the components of the insulating layer.

Figure 41:
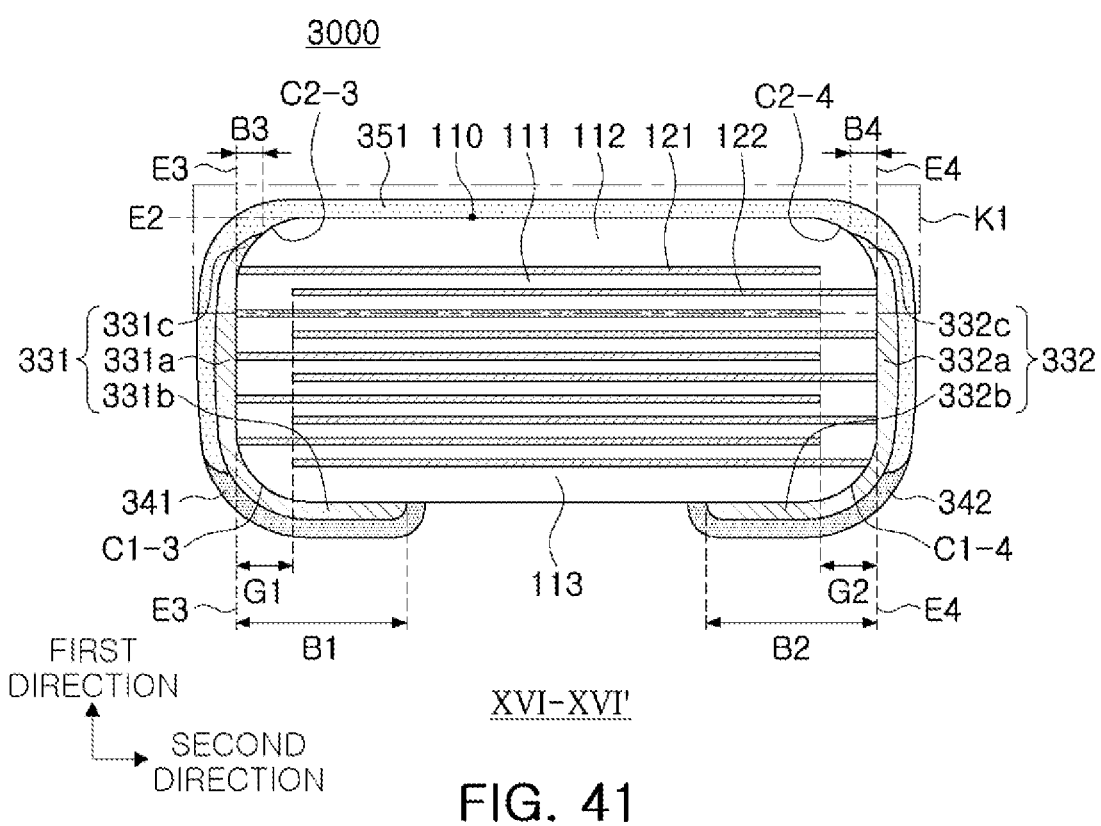
FIG. 41 is a cross-sectional view taken along line XVI-XVI' of FIG. 40.
Figure 42:
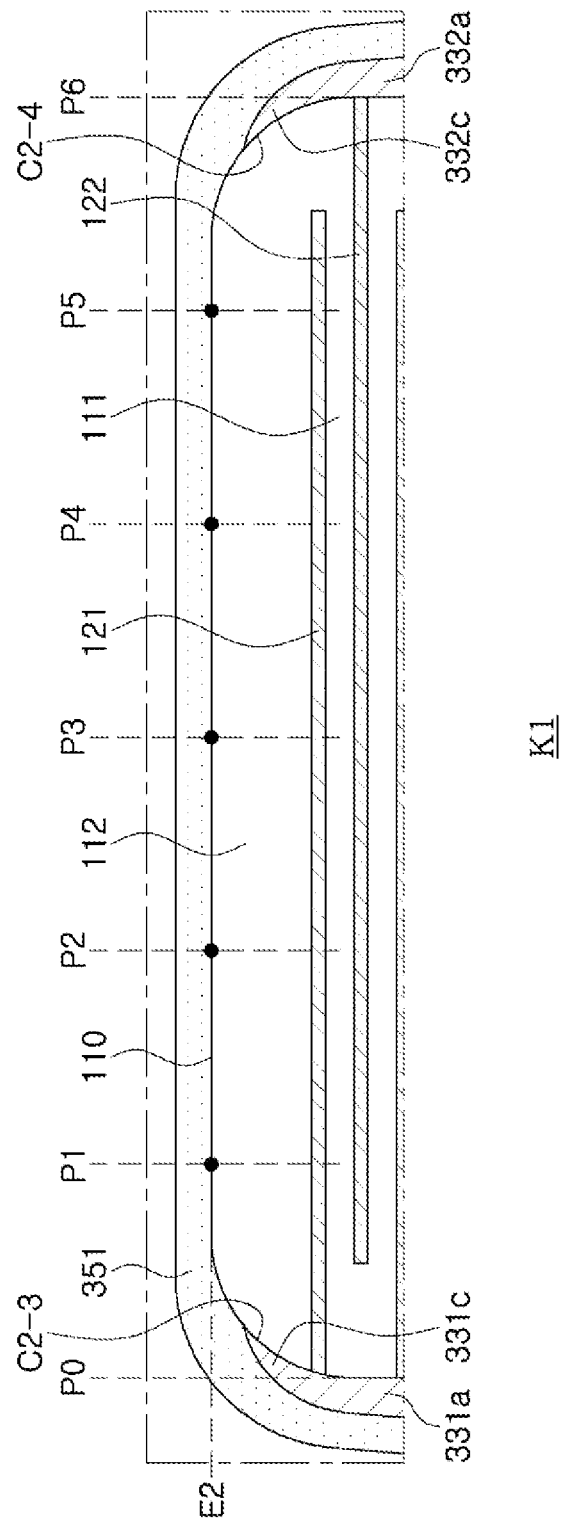
FIG. 42 is an enlarged view of an area K1 of FIG. 40.

FIG. 40 is a schematic diagram illustrating a perspective view of a multilayer electronic component 3000 according to an embodiment. FIG. 41 is a cross-sectional view taken along line XVI-XVI' of FIG. 40. FIG. 42 is an enlarged view of area K1 of FIG. 40.

Referring to FIGS. 40 to 42, the multilayer electronic component 3000 according to an embodiment includes a body 110 including a dielectric layer 111 and first and second internal electrodes 121 and 122 alternately disposed with the dielectric layer interposed therebetween, and having first and second surfaces opposing each other in a first direction, third and fourth surfaces connected to the first and second surfaces and opposing each other in the second direction, and fifth and sixth surfaces connected to the first to fourth surfaces and opposing each other in the third direction; a first external electrode 331 including a first connection portion 331a disposed on the third surface of the body, a first band portion 331b extending from the first connection portion onto a portion of the first surface, and a first edge portion 331c extending from the first connection portion to an edge connecting the second and third surfaces of the body; a second external electrode 332 including a second connection portion 332a disposed on the fourth surface of the body, a second band portion 332b extending from the second connection portion onto a portion of the first surface, and a second edge portion 332c extending from the second connection portion to an edge connecting the second and fourth surfaces of the body; an insulating layer 351 disposed on the first and second connection portions 331a and 332a and disposed to cover the second surface and the first and second edge portions; a first plating layer 341 disposed on the first band portion; and a second plating layer 342 disposed on the second band portion. The first and second insulating layers may include an oxide including hafnium (Hf).

In an embodiment, when the average distance in the second direction from the extension line of the third surface to the end of the first edge portion 331c is B3, the average distance in the second direction from the extension line of the fourth surface to the end of the second edge portion 332c is B4, the average size in the second direction of the region in which the third surface and the second internal electrode are spaced apart is G1, and the average size in the second direction of the region in which the fourth surface and the first internal electrode are spaced apart is G2; B3≤G1 and B4≤G2 may be satisfied. Accordingly, by significantly reducing the volume occupied by the external electrodes 331 and 332, the capacitance of the multilayer electronic component 3000 per unit volume may be increased.

In this case, when the average distance in the second direction from the extension line of the third surface to the end of the first band portion 331b is B1, and the average distance in the second direction from the extension line of the fourth surface to the end of the second band portion 332b is B2, B1≥G1 and B3≥G2 may be satisfied. Accordingly, by increasing the area in contact with the solder during mounting, the fixing strength may be improved.

The multilayer electronic component 3000 according to an embodiment may include a body 110 that includes a dielectric layer 111 and first and second internal electrodes 121 and 122 alternately disposed with the dielectric layer interposed therebetween and has first and second surfaces opposing each other in a first direction, third and fourth surfaces connected to the first and second surfaces and opposing each other in the second direction, and fifth and sixth surfaces connected to the first to fourth surfaces and opposing each other in the third direction. The body 110 of the multilayer electronic component 3000 may have the same configuration as the body 110 of the multilayer electronic component 1000 except that the end of the first or second surface of the body has a contracted shape, as will be described later.

The external electrodes 331 and 332 may be disposed on the third surface 3 and the fourth surface 4 of the body 110. The external electrodes 331 and 332 may include first and second external electrodes 331 and 332 respectively disposed on the third and fourth surfaces 3 and 4 of the body 110 and connected to the first and second internal electrodes 121 and 122, respectively.

The external electrodes 331 and 332 may include the first external electrode 331 including a first connection portion 331a disposed on the third surface, a first band portion 331b extending from the first connection portion onto a portion of the first surface, and a first edge portion 331c extending from the first connection portion to an edge connecting the second surface and the third surface; and the second external electrode 332 including a second connection portion 332a disposed on the fourth surface, a second band portion 332b extending from the second connection portion onto a portion of the first surface, and a second edge portion 332c extending from the second connection portion to an edge connecting the second surface and the fourth surface. The first connection portion 331a is connected to the first internal electrode 121 on the third surface, and the second connection portion 332a may be connected to the second internal electrode 122 on the fourth surface.

In an embodiment, the first and second connection portions 331a and 332a may be disposed to be spaced apart from the fifth and sixth surfaces. Accordingly, the region of the external electrodes 331 and 332 may be significantly reduced and the multilayer electronic component 3000 may be further miniaturized.

As a margin region in which the internal electrodes 121 and 122 are not disposed is overlapped on the dielectric layer 111, a step difference occurs due to the thickness of the internal electrodes 121 and 122, and the edge connecting the first surface and the third to fifth surfaces and/or the edge connecting the second surface and the third to the fifth surface may have a shape that is contracted toward the center of the body 110 in the first direction, when viewed from the first surface or the second surface. Alternatively, by the shrinkage behavior in the sintering process of the body, an edge connecting the first surface 1 and the third to sixth surfaces 3, 4, 5 and 6 and/or an edge connecting the second surface 2 and the third to sixth surfaces 3, 4, 5 and 6 may have a shape that is contracted toward the center of the body 110 in the first direction, when viewed from the first surface or the second surface. Alternatively, as the edges connecting respective surfaces of the body 110 are rounded by performing a separate process to prevent chipping defects and the like, an edge connecting the first surface and the third to sixth surfaces and/or an edge connecting the second surface and the third to sixth surfaces may have a rounded shape.

The edge may include a 1-3 edge (c1-3) connecting the first surface and the third surface, a 1-4 edge (c1-4) connecting the first and fourth surfaces, a 2-3 edge (c2-3) connecting the second surface and the third surface, and a 2-4 edge (c2-4) connecting the second surface and the fourth surface. Also, the edge may include a 1-5 edge connecting the first surface and the fifth surface, a 1-6 edge connecting the first surface and the sixth surface, a 2-5 edge connecting the second surface and the fifth surface, and a 2-6 edge connecting the second surface and the sixth surface. However, to suppress the step difference caused by the internal electrodes 121 and 122, after lamination, the internal electrodes are cut to be exposed to the fifth and sixth surfaces 5 and 6 of the body, and then a single dielectric layer or two or more dielectric layers are disposed on both sides of the capacitance formation portion Ac in the third direction (width direction). In the case of forming the margin portions 114 and 115 by laminating, a portion connecting the first surface and the fifth and sixth surfaces and a portion connecting the second surface and the fifth and sixth surfaces may not have a contracted shape.

On the other hand, the first to sixth surfaces of the body 110 may be substantially flat surfaces, and non-flat regions may be provided as edges. Also, a region disposed on an edge among the external electrodes 131 and 132 may be regarded as an edge portion.

In this regard, the first and second edge portions 331c and 332c may be disposed below an extension line E2 of the second surface, and the first and second edge portions 331c and 332c may be disposed to be spaced apart from the second surface. For example, as the external electrodes 331 and 332 are not disposed on the second surface, by further significantly reducing the volume occupied by the external electrodes 331 and 332, the capacitance of the multilayer electronic component 3000 per unit volume may be further increased. In addition, the first edge portion 331c may be disposed on a portion of the 2-3 edge C2-3 connecting the third surface and the second surface, and the second edge portion 332c may be disposed on a portion of the second edge C2-4 connecting the fourth surface and the second surface.

The extension line E2 of the second surface may be defined as follows.

In the length-thickness cross section (L-T cross-section) of the multilayer electronic component 3000 cut at the center in the width direction, by drawing 7 straight lines (P0, P1, P2, P3, P4, P5, P6, P7) in the thickness direction with equal intervals in the length direction from the third surface to the fourth surface, a straight line passing through the point where P2 and the second surface meet and the point where P4 and the second surface meet may be defined as the extension line E2 of the second surface.

On the other hand, the external electrodes 331 and 332 may be formed using any material as long as they have electrical conductivity, such as a metal, and a detailed material may be determined in consideration of electrical properties, structural stability, or the like. Furthermore, the external electrodes may have a multilayer structure.

The external electrodes 331 and 332 are firing electrodes including a conductive metal and glass, or may be a resin-based electrode including a conductive metal and a resin.

In addition, the external electrodes 331 and 332 may have a shape in which a firing electrode and a resin-based electrode are sequentially formed on a body.

In addition, the external electrodes 331 and 332 are formed by transferring a sheet including a conductive metal on the body, or may be formed by transferring a sheet including a conductive metal onto the firing electrode.

As the conductive metal included in the external electrodes 331 and 332, a material having excellent electrical conductivity may be used, and the material is not particularly limited. For example, the conductive metal may be at least one of Cu, Ni, Pd, Ag, Sn, Cr, and alloys thereof. In detail, the external electrodes 331 and 332 may include at least one of Ni and a Ni alloy, and accordingly, connectivity with the internal electrodes 121 and 122 including Ni may be further improved.

The insulating layer 351 may be disposed on the first and second connection portions 331a and 332a.

The first and second connection portions 331a and 332a are portions connected to the internal electrodes 121 and 122, in the plating process, and may thus be the path of penetration of the plating solution or moisture penetration during actual use. In the present disclosure, since the insulating layer 351 is disposed on the connection portions 331a and 332a, penetration of external moisture or a plating solution may be prevented.

The insulating layer 351 may be disposed to contact the first and second plating layers 341 and 342. In this case, the insulating layer 351 may contact to partially cover the ends of the first and second plating layers 341 and 342, or the first and second plating layers 341 and 342 may contact to partially cover the ends of the insulating layer 351.

The insulating layer is disposed on the first and second connection portions 331a and 332a and may be disposed to cover the second surface and the first and second edge portions 331c and 332c. In addition, the insulating layer 351 covers a region in which the ends of the first and second edge portions 331c and 332c and the body 110 come into contact with each other, to block the moisture permeation path, thereby further improving moisture resistance reliability.

The insulating layer 351 may be disposed on the second surface to extend to the first and second connection portions 331a and 332a. Also, when the external electrodes 331 and 332 are not disposed on the second surface, the insulating layer may be disposed to completely cover the second surface. On the other hand, the insulating layer 351 is not necessarily disposed on the second surface, and the insulating layer may not be disposed on a portion or the entirety of the second surface, and the insulating layer may be divided into two and disposed on the first and second connection portions 331a and 332a, respectively. However, even in this case, the insulating layer may be disposed to completely cover the first and second edge portions 331c and 332c. When the insulating layer is not disposed on the entirety of the second surface, the insulating layer may be disposed below an extension line of the second surface. In addition, although the insulating layer is not disposed on the second surface, the insulating layer may extend from the first and second connection portions 331a and 332a to the fifth and sixth surfaces to form one insulating layer.

In an embodiment, the insulating layer 351 may be disposed to partially cover the fifth and sixth surfaces to improve reliability. In this case, portions of the fifth and sixth surfaces that are not covered by the insulating layer may be exposed externally.

Furthermore, the insulating layer 351 may be disposed to cover the entirety of the fifth and sixth surfaces, and in this case, since the fifth and sixth surfaces are not exposed externally, the moisture resistance reliability may be further improved.

The insulating layer 351 may serve to prevent the plating layers 341 and 342 from being formed on the external electrodes 331 and 332 on which the insulating layer 351 is disposed, and may play a role in significantly reducing penetration of moisture or plating solution from the outside by improving the sealing characteristics. The component, composition and average thickness of the insulating layer 351, and the effects accordingly are the same as those of the insulating layers 151, 251, 252, and 253 included in the multilayer electronic components 1000 and 2000 and various embodiments thereof. Therefore, a description thereof will be omitted.

The first and second plating layers 341 and 342 may be disposed on the first and second band portions 331b and 332b, respectively. The plating layers 341 and 342 may serve to improve the mounting characteristics, and as the plating layers 341 and 342 are disposed on the band portions 331b and 332b, the mounting space may be significantly reduced, and reliability may be improved by significantly reducing penetration of the plating solution into the internal electrode. One end of the first and second plating layers 341 and 342 may contact the first surface, and the other end thereof may contact the insulating layer 351.

The type of the plating layers 341 and 342 is not particularly limited, and may be a plating layer including at least one of Cu, Ni, Sn, Ag, Au, Pd, and alloys thereof, and may be formed in a plurality of layers.

As a more detailed example of the plating layers 341 and 342, the plating layers 341 and 342 may be a Ni plating layer or a Sn plating layer, and the Ni plating layer and the Sn plating layer may be sequentially formed on the first and second band portions 331b and 332b.

In an embodiment, the first plating layer 341 is disposed to cover the end of the insulating layer 351 disposed on the first external electrode 331, and the second plating layer 342 may be disposed to cover an end of the insulating layer 351 disposed on the second external electrode 332. Accordingly, the reliability of the multilayer electronic component 3000 may be improved by strengthening the bonding force between the insulating layer 351 and the plating layers 341 and 342. In addition, by first forming the insulating layer 351 before forming the plating layers 341 and 342 on the external electrodes 331 and 332, penetration of the plating solution in the process of forming the plating layer may be more reliably suppressed. As the insulating layer is formed before the formation of the plating layer, the plating layers 341 and 342 may have a shape covering the ends of the insulating layer 351.

In an embodiment, the insulating layer 351 may be disposed to cover the end of the first plating layer 341 disposed on the first external electrode 331, and the insulating layer 351 may be disposed to cover an end of the second plating layer 342 disposed on the second external electrode 332. Accordingly, the reliability of the multilayer electronic component 3000 may be improved by strengthening the bonding force between the insulating layer 351 and the plating layers 341 and 342.

In an embodiment, the first and second plating layers 341 and 342 may be extended to partially cover the first and second connection portions 331a and 332a, respectively. When the average distance in the first direction up to the internal electrode disposed closest to the first surface 1 among the first and second internal electrodes 121 and 122 is referred to as H1, and the average distance in the first direction from the extension line of the first surface 1 to the ends of the first and second plating layers 141 and 142 disposed on the first and second connection portions 131a and 132a is referred to as H2; H1>H2 may be satisfied. Accordingly, the penetration of the plating solution into the internal electrode during the plating process may be suppressed, thereby improving reliability.

In an embodiment, when an average distance in the first direction from the first surface to the internal electrode disposed closest to the first surface among the first and second internal electrodes 121 and 122 is H1, and the average distance in the first direction from the extension line of the first surface to the ends of the plating layers 341 and 342 disposed on the first and second connection portions 331a and 332a is H2; H1<H2 may be satisfied. Accordingly, by increasing the area in contact with the solder during mounting, the fixing strength may be improved. In detail, when the average size of the body 110 in the first direction is T, H2<T/2 may be satisfied. For example, H1<H2<T/2 may be satisfied. If H2 is T/2 or more, there may be a possibility that the moisture-resistance reliability improvement effect by an insulating layer may decrease.

In an embodiment, the first and second plating layers 341 and 342 may be disposed below an extension line of the first surface. Accordingly, the height of the solder may be significantly reduced during mounting, and the mounting space may be significantly reduced. In addition, the insulating layer 351 may extend below the extension line of the first surface and be disposed to contact the first and second plating layers 341 and 342.

In an embodiment, when the average size of the body in the second direction is L, the average distance of the second direction from the extension line of the third surface to the end of the first band is B1, and the average distance in the second direction from the extension line of the fourth surface to the end of the second band portion is B2; $0.2 \leq B1/L \leq 0.4$ and $0.2 \leq B2/L \leq 0.4$ may be satisfied.

If B1/L and B2/L are less than 0.2, it may be difficult to secure sufficient fixing strength. On the other hand, if B2/L is greater than 0.4, there is a risk of leakage current between the first band portion 331b and the second band portion 332b under high-voltage current, and during the plating process, there is a concern that the first band portion 331b and the second band portion 332b may be electrically connected to each other due to plating spread or the like.

In an embodiment, an additional insulating layer disposed on the first surface and disposed between the first band portion 331b and the second band portion 332b may be further included. Accordingly, leakage current that may occur between the first band portion 331b and the second band portion 332b under a high voltage current may be prevented.

The type of the additional insulating layer does not need to be particularly limited. For example, the additional insulating layer may include an oxide including hafnium (Hf) like the insulating layer 351. However, it is not necessary to limit the additional insulating layer and the insulating layer 351 to the same material, and the additional insulating layer and the insulating layer 351 may also be formed to have different materials. For example, at least one selected from epoxy resin, acrylic resin, ethyl cellulose, and the like may be included, or glass may be included.

In an embodiment, when the average distance in the second direction from the extension line of the third surface to the end of the first band portion is B1, and the average distance in the second direction from the extension line of the fourth surface to the end of the second band portion is B2; B3<B1 and B4<B2 may be satisfied. An average length B1 of the first band portion 331b may be longer than an average length B3 of the first edge portion 331c, and the average length of the second band portion 332b may be longer than an average length B4 of the second edge portion 332c. Accordingly, by increasing the area in contact with the solder during mounting, the fixing strength may be improved.

In more detail, when the average distance in the second direction from the extension line of the third surface 3 to the end of the first band portion 331b is B1, the average distance of the second direction from the extension line of the fourth surface 4 to the end of the second band portion 332b is B2, the average distance in the second direction from the extension line of the third surface 3 to the end of the first edge portion 331c is B3, and the average distance in the second direction from the extension line of the fourth surface 4 to the end of the second edge portion 332c is B4; B3<B1 and B4<B2 may be satisfied.

In an embodiment, an average thickness of the first and second plating layers 341 and 342 may be less than an average thickness of the insulating layer 351.

The insulating layer 351 serves to prevent penetration of external moisture or penetration of the plating solution, but connectivity thereof with the plating layers 341 and 342 is relatively weak, which may cause delamination of the plating layer. In a case in which the plating layer is delaminated, the fixing strength with the substrate may be lowered. In this case, the delamination of the plating layer may indicate that the plating layer is partially separated or is physically separated from the external electrodes 331 and 332. Because the connection between the plating layer and the insulating layer is weak, there is a high possibility that the gap between the insulating layer and the plating layer will widen or foreign substances will penetrate. The possibility of delamination may increase as it becomes vulnerable to external shocks and the like.

According to an embodiment of the present disclosure, the average thickness of the plating layer is less than the average thickness of the insulating layer, and the contact area between the plating layer and the insulating layer may be reduced. Accordingly, the occurrence of delamination may be suppressed and the bonding strength of the multilayer electronic component 3000 may be improved.

The size of the multilayer electronic component 3000 does not need to be particularly limited.

However, to obtain miniaturization and high capacitance simultaneously, since the thickness of the dielectric layer and the internal electrode should be thinned to increase the number of layers, in the multilayer electronic component 3000 having a size of 1005 (length×width, 1.0 mm×0.5 mm) or less, the effect of improving reliability and capacitance per unit volume according to the present disclosure may become more significant.

Therefore, considering manufacturing errors and external electrode sizes, when the length of the multilayer electronic component 3000 is 1.1 mm or less and the width is 0.55 mm or less, the reliability improvement effect according to the present disclosure may be more significant. In this case, the length of the multilayer electronic component 3000 indicates a maximum size of the multilayer electronic component 3000 in the second direction, and the width of the multilayer electronic component 3000 may indicate a maximum size of the multilayer electronic component 3000 in the third direction.

As set forth above, according to an embodiment, reliability of a multilayer electronic component may be improved while improving capacitance of the multilayer electronic component per unit volume by disposing an insulating layer on the connection portion of the external electrode and a plating layer on the band portion of the external electrode.

In addition, the mounting space of the multilayer electronic component may be significantly reduced.

In addition, according to an embodiment, the insulating layer includes an oxide containing hafnium (Hf), thereby improving moisture resistance reliability and acid resistance to a plating solution, and suppressing crack generation and propagation.

In addition, according to an embodiment, the insulating layer contains an oxide containing hafnium (Hf), thereby suppressing diffusion from occurring in a portion in contact with the glass and thus suppressing deterioration of the continuity of the insulating layer.

Although the embodiment of the present disclosure has been described in detail above, the present disclosure is not limited by the above-described embodiment and the accompanying drawings, but is intended to be limited by the appended claims. Accordingly, various types of substitution, modification and change will be possible by those skilled in the art within the scope not departing from the technical spirit of the present disclosure described in the claims, and it is also said that it falls within the scope of the present disclosure.

In addition, the expression 'an/one embodiment' used in the present disclosure does not mean the same embodiment as each other, and is provided to emphasize and explain different unique features. However, one embodiment presented above is not excluded from being implemented in combination with the features of another embodiment. For example, even if a matter described in one specific embodiment is not described in another embodiment, it may be understood as a description related to another embodiment unless a description contradicts or contradicts the matter in another embodiment.

The terms used in the present disclosure are used to describe only one embodiment, and are not intended to limit the present disclosure. In this case, the singular expression includes the plural expression unless the context clearly indicates otherwise.

While embodiments have been shown and described above, it will be apparent to those skilled in the art that modifications and variations could be made without departing from the scope of the present disclosure as defined by the appended claims.

What is claimed is:

1. A multilayer electronic component comprising:
a body including a dielectric layer and a first internal electrode and a second internal electrode alternately disposed with the dielectric layer interposed therebetween, the body having a first surface and a second surface opposing each other in a first direction, a third surface and a fourth surface connected to the first and second surfaces and opposing each other in a second direction, and a fifth surface and a sixth surface connected to the first to fourth surfaces and opposing each other in a third direction;
a first external electrode including a first connection portion disposed on the third surface, and a first band portion extending from the first connection portion onto a portion of the first surface;
a second external electrode including a second connection portion disposed on the fourth surface, and a second band portion extending from the second connection portion onto a portion of the first surface;
an insulating layer including a first insulating layer disposed on the first connection portion and a second insulating layer disposed on the second connection portion;
a first plating layer disposed on the first band portion; and
a second plating layer disposed on the second band portion,
wherein the insulating layer includes an oxide containing hafnium (Hf).

2. The multilayer electronic component of claim 1, wherein the oxide containing hafnium (Hf) is $HfO_2$.

3. The multilayer electronic component of claim 1, wherein among elements constituting the insulating layer, a number of moles of hafnium (Hf) element relative to a total number of moles of elements other than oxygen is 0.95 or more.

4. The multilayer electronic component of claim 1, wherein an average thickness of the insulating layer is in a range from 15 nm to 1000 nm.

5. The multilayer electronic component of claim 1, wherein the first and second external electrodes include glass.

6. The multilayer electronic component of claim 1, further comprising a cover layer disposed on the insulating layer and including an oxide containing aluminum (Al).

7. The multilayer electronic component of claim 6, wherein the oxide containing hafnium (Hf) is $HfO_2$, and
the oxide containing aluminum (Al) is $Al_2O_3$.

8. The multilayer electronic component of claim 6, wherein among elements constituting the insulating layer, a number of moles of hafnium (Hf) element relative to a total number of moles of elements other than oxygen is 0.95 or more, and
among elements constituting the cover layer, a number of moles of aluminum (Al) element relative to a total number of moles of elements other than oxygen is 0.95 or more.

9. The multilayer electronic component of claim 1, wherein
H1>H2, where H1 is an average distance from the first surface to an internal electrode, disposed to be closest to the first surface, among the first and second internal electrodes, in the first direction, and H2 is an average distance from an extension line of the first surface to an end of the first plating layer disposed on the first connection portion or to an end of the second plating layer disposed on the second connection portion in the first direction.

10. The multilayer electronic component of claim 1, wherein
H1<H2, where H1 is an average distance from the first surface to an internal electrode, disposed to be closest to the first surface, among the first and second internal electrodes, in the first direction, and H2 is an average distance from an extension line of the first surface to an end of the first plating layer disposed on the first connection portion or to an end of the second plating layer disposed on the second connection portion in the first direction.

11. The multilayer electronic component of claim 10, wherein
H2<T/2, where T is an average size of the body in the first direction.

12. The multilayer electronic component of claim 1, wherein
the first and second plating layers are disposed on a level the same as or lower than a level of an extension line of the first surface.

13. The multilayer electronic component of claim 1, wherein
0.2≤B1/L≤0.4 and 0.2≤B2/L≤0.4, where L is an average size of the body in the second direction, B1 an average distance from an extension line of the third surface to a distal end of the first band portion in the second direction, and B2 is an average distance from an extension line of the fourth surface to a distal end of the second band portion in the second direction.

14. The multilayer electronic component of claim 1, further comprising:
an additional insulating layer disposed on the first surface and disposed between the first band portion and the second band portion.

15. The multilayer electronic component of claim 1, wherein
at least one of the dielectric layers has an average thickness of 0.35 μm or less.

16. The multilayer electronic component of claim 1, wherein
the first and second internal electrodes have an average thickness of 0.35 μm or less.

17. The multilayer electronic component of claim 1, wherein
the body includes a capacitance formation portion, including the first and second internal electrodes, alternately disposed with the dielectric layers interposed therebetween, and cover portions, respectively disposed on opposite end surfaces of the capacitance formation portion in the first direction, and
an average size of the cover portion in the first direction is 15 μm or less.

18. The multilayer electronic component of claim 1, wherein
an average thickness of at least one of the first and second plating layers is smaller than an average thickness of the insulating layer.

19. The multilayer electronic component of claim 1, wherein
the first plating layer is disposed to cover the end of the first insulating layer close to the first surface, and the second plating layer is disposed to cover the end of the second insulating layer close to the first surface.

20. The multilayer electronic component of claim 1, wherein
the first insulating layer is disposed to cover an end of the first plating layer disposed on the first external electrode, and the second insulating layer is disposed to cover an end of the second plating layer disposed on the second external electrode.

21. The multilayer electronic component of claim 1, wherein
the first external electrode includes a first side band portion extending from the first connection portion onto portions of the fifth and sixth surfaces,
the second external electrode includes a second side band portion extending from the second connection portion onto portions of the fifth and sixth surfaces, and
a size of each of the first and second band portions in the second direction is increased in a direction toward the first surface.

22. The multilayer electronic component of claim 1, wherein
the first and second external electrodes are disposed to be spaced apart from the fifth and sixth surfaces.

23. The multilayer electronic component of claim 1, wherein
the first and second external electrodes are disposed to be spaced apart from the second surface.

24. The multilayer electronic component of claim 1, wherein
the first and second insulating layers extend to the second surface to be connected to each other.

25. The multilayer electronic component of claim 1, wherein
the first and second insulating layers extend to the fifth and sixth surfaces to be connected to each other.

26. The multilayer electronic component of claim 1, wherein
the first and second insulating layers are not disposed on the second, fifth and sixth surfaces.

27. The multilayer electronic component of claim 1, wherein
the first external electrode further includes a third band portion extending from the first connection portion onto a portion of the second surface, and
the second external electrode further includes a fourth band portion extending from the second connection portion onto a portion of the second surface.

28. The multilayer electronic component of claim 1, wherein
the body has a 1-3-th corner connecting the first and third surfaces to each other, a 1-4-th corner connecting the first and fourth surfaces to each other, a 2-3-th corner connecting the second and third surfaces, and a 2-4-th corner connecting the second and fourth surfaces to each other,
the 1-3-th corner and the 2-3-th corner have a form contracted to a center of the body in the first direction, in a direction toward the third surface, and the 1-4-th corner and the 2-4-th corner are contracted to the center of the body in the first direction, in a direction toward the fourth surface, and the first external electrode includes a first corner portion disposed to extend upwardly of the 1-3-th corner and the 2-3-th corner, and the second external electrode includes a second corner portion disposed to extend upwardly of the 1-4-th corner and the 2-4-th corner.

29. The multilayer electronic component of claim 28, wherein

B3≤G1 and B4≤G2, where B3 is an average distance from an extension line of the third surface to a distal end of the first corner portion in the second direction, B4 is an average distance from an extension line of the fourth surface to a distal end of the second corner portion in the second direction, G1 is an average size of a region, in which the third surface and the second internal electrode are spaced apart from each other, in the second direction, and G2 is an average size of a region, in which the fourth surface and the first internal electrode are spaced apart from each other, in the second direction.

30. The multilayer electronic component of claim 1, wherein the first external electrode includes a first connection electrode, disposed on the third surface, and a first band electrode disposed on the first surface to be connected to the first connection electrode, and the second external electrode includes a second connection electrode, disposed on the fourth surface, and a second band electrode disposed on the first surface to be connected to the second connection electrode.

31. The multilayer electronic component of claim 30, wherein the first and second connection electrodes are disposed to be spaced apart from the fifth and sixth surfaces.

32. The multilayer electronic component of claim 30, wherein the first and second connection electrodes are disposed to be spaced apart from the second surface.

33. The multilayer electronic component of claim 30, wherein the first external electrode further includes a third band electrode disposed on the second surface to be connected to the first connection electrode, and the second external electrode further includes a fourth band electrode disposed on the second surface to be connected to the second connection electrode.

34. The multilayer electronic component of claim 30, wherein the first and second connection electrodes include the same metal as a metal included in the first and second internal electrodes.

35. The multilayer electronic component of claim 30, wherein each of the first and second band electrodes is a fired electrode including a conductive metal and glass.

36. The multilayer electronic component of claim 30, wherein each of the first and second connection electrodes is a fired electrode including a conductive metal and glass.

37. The multilayer electronic component of claim 30, wherein each of the first and second band electrodes is a plating layer.

38. The multilayer electronic component of claim 30, wherein each of the first and second connection electrodes is a plating layer.

* * * * *